US005378817A

United States Patent [19]

Bootz et al.

[11] Patent Number: 5,378,817

[45] Date of Patent: Jan. 3, 1995

[54] REACTIVE DYESTUFFS FOR DYEING AND PRINTING MATERIALS CONTAINING OH GROUPS OR AMIDE GROUPS

[75] Inventors: Konrad Bootz, Wetter; Karl-Josef Herd, Odenthal-Holz, both of Germany

[73] Assignee: Bayer Aktiengesellschaft, Leverkusen, Germany

[21] Appl. No.: 4,807

[22] Filed: Jan. 15, 1993

[30] Foreign Application Priority Data

Jan. 22, 1992 [DE] Germany ............................ 4201611

[51] Int. Cl.[6] .................... C09B 62/503; C09B 62/022; D06P 1/38

[52] U.S. Cl. .................................... 534/618; 534/617; 534/627; 534/632; 534/633; 534/635; 534/636; 534/637; 534/638; 540/125; 540/126; 544/75; 544/76; 544/77

[58] Field of Search ............... 534/617, 618, 627, 632, 534/633, 635, 636, 637, 638; 544/75-77; 540/126, 126

[56] References Cited

U.S. PATENT DOCUMENTS

| | | | |
|---|---|---|---|
| 3,687,673 | 8/1972 | Yoshida et al. | 534/637 X |
| 3,718,641 | 2/1973 | Muller et al. | 534/641 |
| 4,473,498 | 9/1984 | Schlafer et al. | 534/618 |
| 4,515,598 | 5/1985 | Meininger et al. | 8/549 |
| 4,649,193 | 3/1987 | Meininger et al. | 534/622 |
| 4,719,053 | 1/1988 | Schlafer et al. | 534/641 X |
| 4,746,732 | 5/1988 | Tzikas | 534/637 |
| 4,806,127 | 2/1989 | Schlafer et al. | 534/617 X |
| 4,861,344 | 8/1989 | Schlafer et al. | 8/532 |
| 4,898,933 | 2/1990 | Schlafer et al. | 534/605 |
| 4,935,501 | 6/1990 | Tzikas | 534/634 |
| 4,975,539 | 12/1990 | Schlafer et al. | 534/642 |
| 4,996,304 | 2/1991 | Tzikas | 534/637 |
| 5,175,263 | 12/1992 | Schlafer | 534/638 |
| 5,243,034 | 9/1993 | Tappe et al. | 534/637 |

FOREIGN PATENT DOCUMENTS

| | | | |
|---|---|---|---|
| 0167590 | 1/1986 | European Pat. Off. . | |
| 272532 | 6/1988 | European Pat. Off. | 534/632 |
| 0443165 | 12/1990 | Germany . | |
| 60-163972 | 8/1985 | Japan | 534/638 |
| 866256 | 3/1986 | Japan . | |
| 2239024 | 6/1991 | United Kingdom | 534/638 |

OTHER PUBLICATIONS

Derwent Publications, Week 9238, Textiles; Paper; Cellulose, p. 11, abstract of JP 4-214768 Aug. 5, 1992.

*Primary Examiner*—Mary G. Lee
*Assistant Examiner*—Fiona T. Powers
*Attorney, Agent, or Firm*—Sprung Horn Kramer & Woods

[57] ABSTRACT

Reactive dyestuffs of the formula

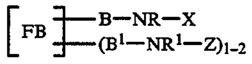

(1)

wherein Z=a heterocyclic reactive group and the remaining groups have the meaning given in the description, are outstandingly suitable for dyeing and printing materials containing hydroxyl groups or amide groups.

11 Claims, No Drawings

REACTIVE DYESTUFFS FOR DYEING AND PRINTING MATERIALS CONTAINING OH GROUPS OR AMIDE GROUPS

The invention relates new reactive dyestuffs, their preparation and their use.

Reactive dyestuffs are already known from numerous publications, see DE-A 30 19 960 (U.S. Pat. No. 4,515,598), DE-A-19 22 940 (U.S. Pat. No. 3,718,641), EP-A-167 490, EP-A-133 843 (U.S. Pat. Nos. 4,746,732, 4,935,501, 4,996,304) and EP-A-40 806 (U.S. Pat. No. 4,649,193).

The present invention is based on the object of providing improved reactive dyestuffs.

The invention relates to reactive dyestuffs of the formula

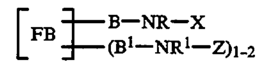

(1)

in particular dyestuffs of the formula

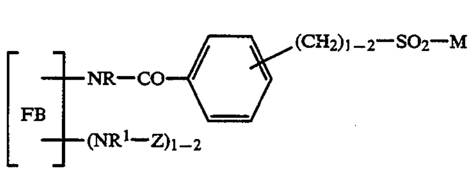

(1a)

where

X=

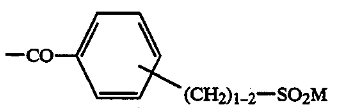

FB=the radical of a dyestuff preferably of the mono- or polyazo, metal complex azo, anthraquinone, phthalcyanine, formazan, azomethine, dioxaine, phenazine, stilbene, triphenyhethane, xanthene, thioxanthone, nitroaryl, naphthoquinone, pyrenquinone or perylenetetracarbide series, B and $B^1$=identically or differently, a direct bond or a bridge member to a ring C atom of an aromatic-carbocyclic or to a ring C or N atom of an aromatic-heterocyclic ring in FB, M=$CH{=}CH_2$ or $CH_2CH_2$—V, wherein V=OH or a radical which can be eliminated under alkaline conditions, for example $OSO_3H$, $SSO_3H$, $OCOCH_3$, $OPO_3H_2$, $OSO_2CH_3$, SCN, $NHSO_2CH_3$, Cl, Br, F, $OCOC_6H$, $OSO_2$-$C_8H_4$, $[N(CH_3)_3]^+$anion$^-$ or an optionally substituted pyridinium radical (substituents are, in particular, optionally substituted $C_1$–$C_4$-alkyl, COOH, $SO_3H$, CN or carboxamide), (anion=for example, Cl, $HSO_4$, $HCO_3$ and the like), Z=a heterocyclic fibre-reactive radical without a further chromophoric part and R and $R^1$=identically or differently, H or optionally substituted $C_1$–$C_6$-alkyl (preferred substituents: halogen, OH, COOH, $SO_3H$ and $OSO_3H$).

Suitable bridge members B and $B^1$ are, for example,

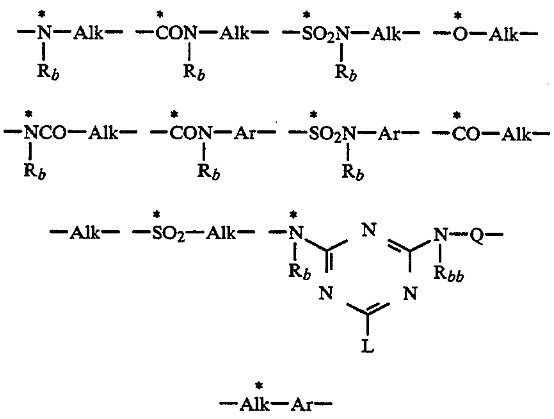

wherein the asterisk marks the linkage point with FB, $R_b$ and $R_{bb}$ independently of one another denote H or $C_1$–$C_6$-alkyl, which can be substituted, in particular by halogen, OH, COOH, $SO_3H$ or $OSO_3H$, Alk denotes straight-chain or branched $C_1$–$C_6$-alkylene which is optionally interrupted by hetero atoms or groupings containing hetero atoms, such as NR, O or S, Ar denotes optionally substituted phenylene or naphthylene or a radical of a diphenyl or stilbene, Q denotes Alk, Ar or -Alk-Ar-, wherein Alk or Ar can contain further substituents, for example F, Cl, Br, $C_1$–$C_4$-alkyl, $C_1$–$C_4$-alkoxy, carboxyl or sulpho and L denotes F, Cl, Br, optionally substituted amino, OH, $C_1$–$C_4$-alkoxy, optionally substituted phenoxy or $C_1$–$C_4$-alkylthio.

Suitable fibre-reactive radicals Z, i.e. those which react with the OH or NH groups of the fibres under dyeing conditions to form covalent bonds, are, in particular, those which contain at least one reactive substituent bonded to a 5- or 6-membered aromatic-heterocyclic ring, or to a monoazine, diazine or triazine ring, in particular a pyridine, pyrimidine, pyridazine, pyrazine, thiazine, oxazine or asymmetric or symmetric triazine ring, or to such a ring system which contains one or more fused-on aromatic-carbocyclic rings, or a quinoline, phthalazine, cinnoline, quinazoline, quinoxaline, acridine, phenazine or phenanthridine ring system, and which are not bonded to a further chromophore.

Examples which may be mentioned of the reactive substituents on the heterocyclic ring are halogen (Cl, Br or F), ammonium, including hydrazinium, pyridinium, picolinium, carboxypyridinium, sulphonium, sulphonyl, azido ($N_3$), thiocyanato, thiol-ether, oxyether, sulphinic acid and sulphonic acid.

The following examples may be mentioned specifically:

2,4-difluorotriazin-6-yl, 2,4-dichlorotriazin-6-yl and monohalogeno-sym.-triazinyl radicals, in particular monochloro and monofluorotriazinyl radicals which are substituted by alkyl, aryl, amino, monoalkylamino, dialkylamino, aralkylamino, arylamino, morpholino, piperidino, pyrrolidino, piperazino, alkoxy, aryloxy, alkylthio or arylthio, wherein alkyl preferably denotes optionally substituted $C_1$–$C_4$-alkyl, aralkyl preferably denotes optionally substituted phenyl-$C_1$–$C_4$-alkyl and aryl preferably denotes optionally substituted phenyl or naphthyl, and wherein preferred substituents for, alkyl are halogen, hydroxyl, cyano, vinylsulphonyl, substituted alkylsulphonyl, dialkylamino, morpholino, $C_1$–$C_4$-alkoxy, vinylsulphonyl-$C_2$–$C_4$-alkoxy, substituted alkylsulphonyl-$C_2$–$C_4$-alkoxy, carboxyl, sulpho or sulphato, and preferred substituents for phenyl and naphthyl are sulpho, $C_1$–$C_4$-alkyl, $C_1$–$C_4$-alkoxy, carboxyl, halogen, acylamino, vinylsulphonyl, substituted alkylsulphonyl, hydroxyl and amino;

2-amino-4-fluoro-triazin-6-yl, 2-methylamino-4-fluorotriazin-6-yl, 2-ethylamino-4-fluorotriazin-6-yl, 2-isopropylamino-4-fluoro-triazin-6-yl, 2-dimethylamino-4-fluorotriazin-6-yl, 2-diethylamino-4-fluoro-triazin-6-yl, 2-β-methoxy-ethylamino-4-fluoro-triazin-6-yl, 2-β-hydroxyethylamino-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl, 2-carboxymethylamino-4-fluorotriazin-6-yl, 2-di-(carboxymethylamino)-4-fluoro-triazin-6-yl, 2-sulphomethyl-methylamino-4-fluoro-triazin-6-yl, 2-β-cyanoethylamino-4-fluoro-triazin-6-yl, 2-benzylamino-4-fluoro-triazin-6-yl, 2-β-phenylethylamino-4-fluorotriazin-6-yl, 2-benzyl-methylamino-4-fluoro-triazin-6-yl, 2-(4′-sulphobenzyl)-amino-4-fluoro-triazin-6-yl, 2-cyclohexylamino-4-fluoro-triazin-6-yl, 2-(o-, m- or p-methylphenyl)-amino-4-fluoro-triazin-6-yl, 2-(o-, m- or p-sulphophenyl)-amino-4-fluoro-triazin-6-yl, 2-(2′, 5′-disulphophenyl)-amino-4-fluoro-triazin-6-yl, 2-(o-, m- or p-chlorophenyl)-amino-4-fluoro-triazin-6-yl, 2-o-, m- or p-methoxyphenyl)-amino-4-fluoro-triazin-6-yl, 2-(2′-methyl-4′-sulphophenyl)-amino-4-fluoro-triazin-6-yl, 2-(2′-methyl-5′-sulphophenyl)-amino-4-fluoro-triazin-6-yl, 2-(2′-chloro-4′-sulphophenyl)-amino-4-fluoro-triazin-6-yl, 2-(2′-chloro-5′-sulphophenyl)-amino-4-fluoro-triazin-6-yl, 2-(2′-methoxy-4′-sulphophenyl)-amino-4-fluoro-triazin6-yl, 2-(o-, m- or p-carboxyphenyl)-amino-4-fluoro-triazin-6-yl, 2-(2′,4′-disulphophenyl)-amino-4-fluoro-triazin-6-yl, 2-(3′,5′-disulphophenyl)-amino-4-fluoro-triazin-6-yl, 2-(2′-carboxy-4′-sulphophenyl)-amino-4-fluoro-triazin-6-yl, 2-(2′-carboxy-5′-sulphophenyl)-amino-4-fluoro-triazin-6-yl, 2-(6′-sulphonaphth-2′-yl)-amino-4-fluoro-triazin-6-yl, 2-(4′,8′-disulphonaphth-2′-yl)-amino-4-fluoro-triazin-6-yl, 2-(6′,8′-disulphonaphth-2′-yl)-amino-4-fluoro-triazin-6-yl, 2-(N-methyl-N-phenyl)-amino-4-fluoro-triazin-6-yl, 2-(N-ethyl-N-phenyl)-amino-4-fluoro-triazin-6-yl, 2-(N-β-hydroxyethyl-N-phenyl)-amino-4-fluoro-triazin-6-yl, 2-(N-isopropyl-N-phenyl)-amino-4-fluoro-triazin-6-yl, 2-morpholino-4-fluoro-triazin-6-yl, 2-piperidino-4-fluoro-triazin-6-yl, 2-(4′,6′,8′-trisulphonaphth-2′-yl)-amino-4-fluoro-triazin-6-yl, 2-(3′,6′,8′-trisulphonaphth-2′-yl)-amino-4-fluoro-triazin-6-yl, 2-(3′,6′-disulphonaphth-1′-yl)-amino-4-fluoro-triazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl-or N-ethyl-N-(2,4-dichlorotriazin-6-yl)-aminoacetyl, 2-methoxy-4-fluoro-triazin-6-yl, 2-ethoxy-4-fluoro-triazin-6-yl, 2-phenoxy-4-fluoro-triazin-6-yl, 2-(o-, m- or p-sulphophenoxy)-4-fluoro-triazin-6-yl, 2-(o-, m- or p-methyl- or -methoxy-phenoxy)-4-fluoro-triazin-6-yl, 2-β-hydroxyethylmercapto-4-fluoro-triazin-6-yl, 2-phenylmercapto-4-fluoro-triazin-6-yl, 2-(4′-methylphenyl)mercapto-4-fluorotriazin-6-yl, 2-(2′,4′-dinitrophenyl)mercapto-4-fluoro-triazin-6-yl, 2-methyl-4-fluoro-triazin-6-yl, 2-phenyl-4-fluoro-triazin-6-yl and the corresponding 4-chloro- and 4-bromotriazinyl radicals, and the corresponding radicals obtainable by halogen exchange with tertiary bases, such as trimethylamine, triethylamine, dimethyl-β-hydroxyethylamine, triethanolamine, N,N-dimethylhydrazine, pyridine, α-, β- or γ-picoline, nicotinic acid or isonicotinic acid, sulphinates, in particular benzenesulphinic acid, or hydrogen sulphite.

The halogenotriazinyl radicals can also be linked to a second halogenotriazinyl radical or a halogenodiazinyl radical or one or more vinylsulphonyl or sulphatoethylsulphonyl radicals, or via a bridge member

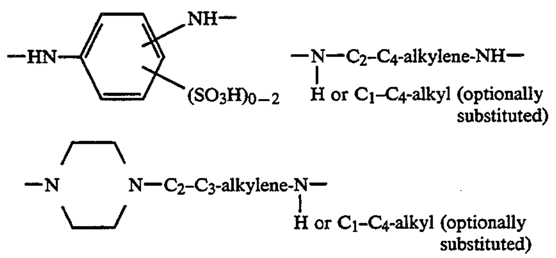

or in the case of the sulphatoethylsulphonyl or vinylsulphonyl group, via a bridge member

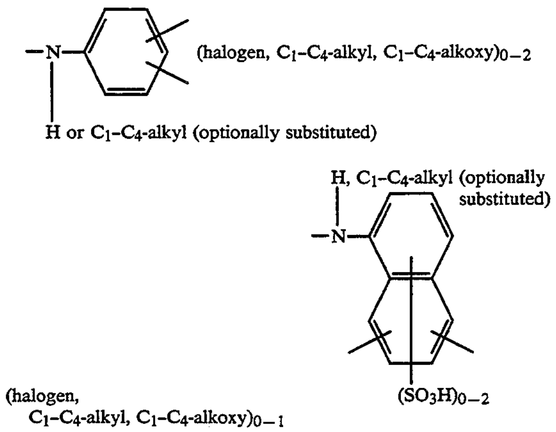

Examples of radicals linked in this way are:

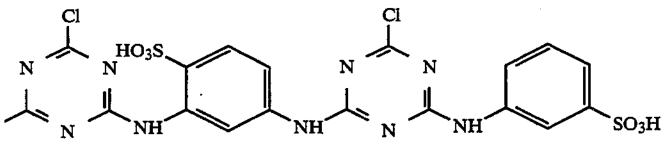

-continued
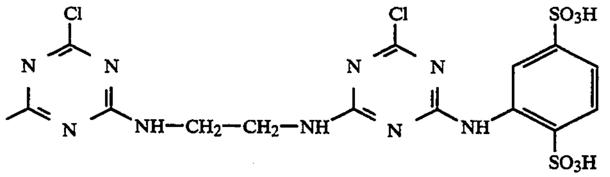
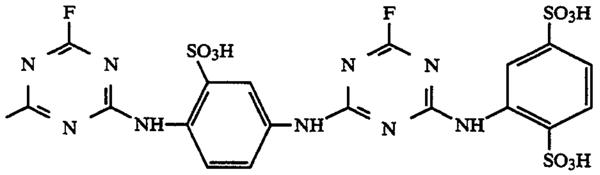
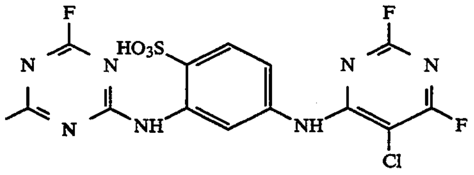
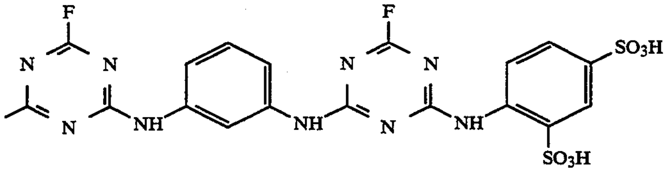
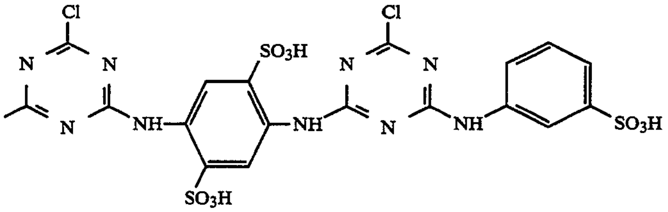
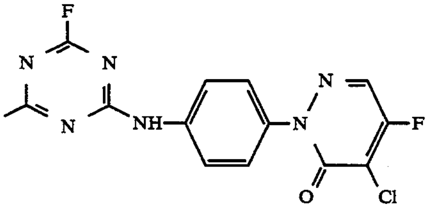
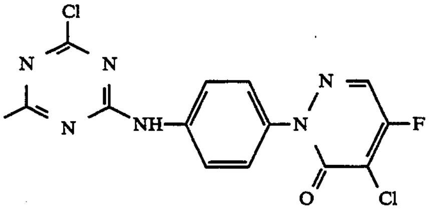
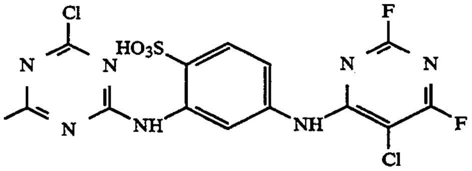

-continued

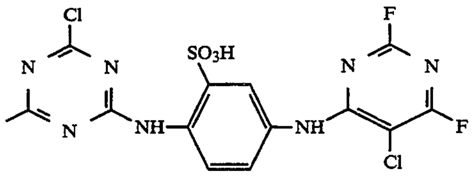

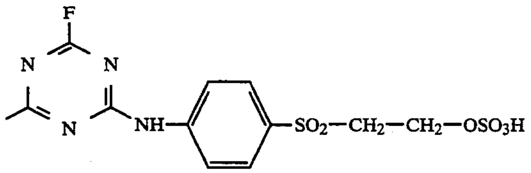

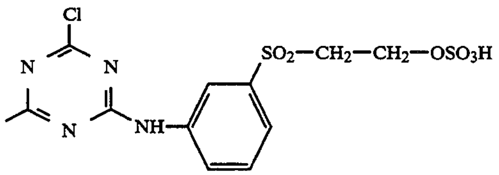

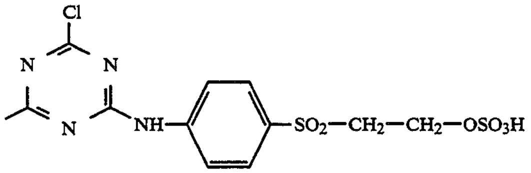

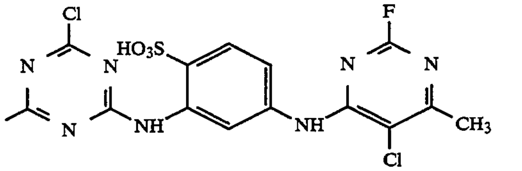

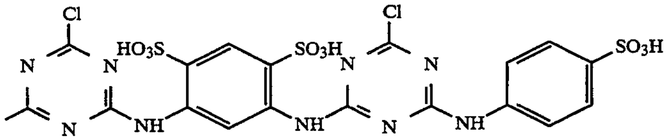

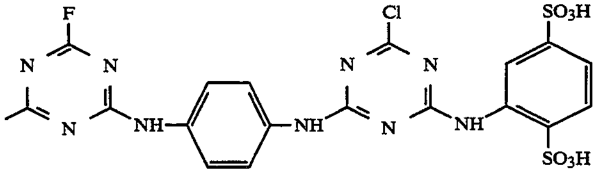

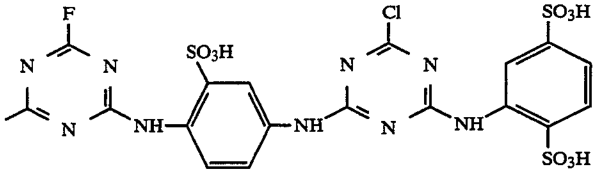

Mono-, di- or trihalogenopyrimidinyl radicals, such as 2,4-dichloropyrimidin-6-yl-, 2,4,5-trichloropyrimidin-6-yl-, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carbalkoxy-pyrimidin-6-yl-, 2,6-dichloropyrimidine-4-carbonyl-, 2,4-dichloropyrimidine-5-carbonyl-, 2-chloro-4-methyl-pyrimidine-5-carbonyl-, 2-methyl-4-chloropyrimidine-5-carbonyl-, 2-methylthio-4-fluoropyrimidine-5-carbonyl-, 6-methyl-2,4-dichloropyrimidine-5-carbonyl-, 2,4,6-trichloropyrimidine-5-carbonyl-, 2,4-dichloropyrimidine-5-sulphonyl-, 2-chloro-quinoxaline-3-carbonyl-, 2- or 3-monochloroquinoxaline-6-carbonyl-, 2- or 3-monochloroquinoxaline-6-sulphonyl-,2,3-dichloroquinoxaline-5- or -6-carbonyl-, 2,3-dichloroquinoxaline-5- or -6-sulphonyl-, 1,4-dichlorophthalazine-6-sulphonyl-or -6-carbonyl-, 2,4-dichloroquinazoline-7- or -6-sulphonyl- or -carbonyl-, 2- or 3- or 4-(4',5'-dichloropyridaz- 6'-on-1'-yl)-phenylsulphonyl- or -carbonyl-, β-(4',5'-dichloropyridaz-6'-on-1'-yl)ethylcarbonyl, N-methyl-N-(2,3-dichloroquinoxaline-6-sulphonyl)-aminoacetyl-, N-methyl-N-(2,3-dichloroquinoxaline-6-carbonyl)-aminoacetyl- and the corresponding bromine and fluorine derivatives of the above-mentioned chlorine-substituted heterocyclic radicals, and amongst these, for example, 2-fluoro-4-pyrimidinyl-, 2,6-difluoro-4-pyrimidinyl-, 2,6-difluoro-5-chloro-4-pyrimidinyl-, 2-fluoro-5,6-dichloro-4-pyrimidinyl-, 2,6-difluoro-5-methyl-4-pyrimidinyl-, 2-fluoro-5-methyl-6-chloro-4-pyrimidinyl-, 2-fluoro-5-nitro-6-chloro-4-pyrimidinyl-, 5-bromo-2-fluoro-4-pyrimidinyl-, 2-fluoro-5-cyano-4-pyrimidinyl-, 2-fluoro-5-methyl-4-pyrimidinyl-, 2,5,6-trifluoro-4-pyrimidinyl-, 5-chloro-6-chloromethyl-2-fluoro-4-pyrimidinyl-, 5-chloro-6-dichloromethyl-2-fluoro-4-pyrimidinyl-, 5-chloro-6-trichloromethyl-2-fluoro-4-pyrimidinyl-, 5-chloro-2-chloromethyl-6-fluoro-4-pyrimidinyl-, 5-chloro-2-dichloromethyl-6-fluoro-4-pyrimidinyl-, 5-chloro-2-trichloromethyl-6-fluoro-4-pyrimidinyl-, 5-chloro-2-fluorodichloromethyl-6-fluoro-4-pyrimidinyl-, 2,6-difluoro-5-bromo-4-pyrimidinyl-, 2-fluoro-5-bromo-6-methyl-4-pyrimidinyl-, 2-fluoro-5-bromo6-chloromethyl-4-pyrimidinyl-, 2,6-difluoro-5-chloromethyl-4-pyrimidinyl-, 2,6-difluoro-5-nitro-4-pyrimidinyl-, 2-fluoro-6-methyl-4-pyrimidinyl-, 2-fluoro-5-chloro-6-methyl-4-pyrimidinyl-, 2-fluoro-5-chloro-4-pyrimidinyl-, 2-fluoro-6-chloro-4-pyrimidinyl-, 6-trifluoromethyl-5-chloro-2-fluoro-4-pyrimidinyl-, 6-trifluoromethyl-2-fluoro-4-pyrimidinyl-, 2-fluoro-5-nitro-4-pyrimidinyl-, 2-fluoro-5-trifluoromethyl-4-pyrimidinyl-, 2-fluoro-5-phenyl- or -5-methylsulphonyl-4-pyrimidinyl-, 2-fluoro-5-carboxamido-4-pyrimidinyl-, 2-fluoro-5-carbomethoxy-4-pyrimidinyl-, 2-fluoro-5-bromo-6-trifluoromethyl-4-pyrimidinyl-, 2-fluoro-6-carboxamido-4-pyrimidinyl-, 2-fluoro-6-carbomethoxy-4-pyrimidinyl-, 2-fluoro-6-phenyl-4-pyrimidinyl-, 2-fluoro-6-cyano-4-pyrimidinyl-, 5-chloro-6-fluoro-2-methyl-4-pyrimidinyl-, 5,6-difluoro-2-trifluoromethyl-4-pyrimidinyl-, 5-chloro-6-fluoro-2-dichlorofluoromethyl-4-pyrimidinyl-, 2-fluoro-5-chloropyrimidin-4-yl-, 2-methyl-4-fluoro-5-methylsulphonylpyrimidin-6-yl-, 2,6-difluoro-5-methylsulphonyl-4-pyrimidinyl-, 2,6-dichloro-5-methylsulphonyl-4-pyrimidinyl-, 2-fluoro-5-sulphonamido-4-pyrimidinyl-, 2-fluoro-5-chloro-6-carbomethoxy-4-pyrimidinyl- and 2,6-difluoro-5-trifluoromethyl-4-pyrimidinyl-; triazine radicals containing sulphonyl groups, such as 2,4-bis-(phenylsulphonyl)-triazin-6-yl-, 2-(3'-carboxyphenyl)-sulphonyl-4-chlorotriazin-6-yl-, 2-(3'-sulphophenyl)sulphonyl-4-chlorotriazin-6-yl- and 2,4-bis-(3'-carboxyphenylsulphonyl)-triazin-6-yl-; pyrimidine rings containing sulphonyl groups, such as 2-carboxymethylsulphonylpyrimidin-4-yl-, 2-methylsulphonyl-6-methyl-pyrimidin-4- yl-,2-methylsulphonyl-6-ethyl-pyrimidin-4-yl-, 2-phenylsulphonyl-5-chloro-6-methyl-pyrimidin-4-yl-, 2,6-bis-methylsulphonyl-pyrimidin-4-yl-, 2,6-bis-methylsulphonyl-5-chloro-pyrimidin-4-yl-, 2,4-bis-methylsulphonyl-pyrimidine-5-sulphonyl-, 2-methylsulphonyl-pyrimidin-4-yl-, 2-phenylsulphonyl-pyrimidin-4-yl-, 2-trichloromethyl-sulphonyl-6-methyl-pyrimidin-4-yl-, 2-methyl-sulphonyl-5-chloro-6-methyl-pyrimidin-4-yl-, 2-methylsulphonyl-5-bromo-6-methyl-pyrimidin-4-yl-, 2-methylsulphonyl-5-chloro-6-ethyl-pyrimidin-4-yl-, 2-methylsulphonyl-5-chloro-6-chloromethyl-pyrimidin-4-yl-, 2-methylsulphonyl-4-chloro-6-methyl-pyrimidine-5-sulphonyl-, 2-methylsulphonyl-5-nitro-6-methylpyrimidin-4-yl-, 2,5,6-trismethylsulphonyl-pyrimidin-4-yl-, 2-methylsulphonyl-5,6-dimethyl-pyrimidin-4-yl-, 2-ethylsulphonyl-5-chloro-6-methyl-pyrimidin-4-yl-, 2-methylsulphonyl-6-chloropyrimidin-4-yl-, 2,6-bis-methylsulphonyl-5-chloro-pyrimidin-4-yl-, 2-methylsulphonyl-6-carboxypyrimidin-4-yl-, 2-methylsulphonyl-5-sulpho-pyrimidin-4-yl-, 2-methylsulphonyl-6-carbomethoxy-pyrimidin-4-yl-, 2-methylsulphonyl-5-carboxy-pyrimidin-4-yl-, 2-methylsulphonyl-5-cyano-6-methoxy-pyrimidin-4-yl-, 2-methylsulphonyl-5-chloro-pyrimidin-4-yl-, 2-β-sulphoethylsulphonyl-6-methylpyrimidin-4-yl-, 2-methylsulphonyl-5-bromo-pyrimidin-4-yl-, 2-phenylsulphonyl-5-chloro-pyrimidin-4-yl-, 2-carboxymethylsulphonyl-5-chloro-6-methyl-pyrimidin-4-yl-, 2-methylsulphonyl-6-chloropyrimidine-4- or -5-carbonyl, 2,6-bis-(methylsulphonyl)-pyrimidine-4- or -5-carbonyl, 2-ethylsulphonyl-6-chloropyrimidine-5-carbonyl-, 2,4-bis-(methylsulphonyl)-pyrimidine-5-sulphonyl- and 2-methylsulphonyl-4-chloro-6-methylpyrimidine-5-sulphonyl- or -carbonyl-; 2-chlorobenzothiazole-5- or -6-carbonyl- or -5- or -6-sulphonyl-, 2-arylsulphonyl- or -alkylsulphonyl-benzothiazole-5- or -6-carbonyl- or -5- or -6-sulphonyl-, such as 2-methylsulphonyl- or 2-ethylsulphonyl-benzothiazole-5- or -6-sulphonyl- or -carbonyl-, 2-phenylsulphonylbenzothiazole-5- or -6-sulphonyl- or -carbonyl- and the corresponding 2-sulphonylbenzothiazole-5- or -6-carbonyl or -sulphonyl derivatives containing sulpho groups in the fused-on benzene ring, 2-chlorobenzoxazole-5- or -6-carbonyl- or -sulphonyl-, 2-chlorobenzimidazole-5- or -6-carbonyl- or -sulphonyl, 2-chloro-1-methylbenzimidazole-5- or -6-carbonyl- or -sulphonyl-, 2-chloro-4-methyl-1,3-thiazole-5-carbonyl- or -4- or -5-sulphonyl- and the N-oxide of 4-chloro- or 4-nitroquinoline-5-carbonyl.

Preferred reactive dyestuffs of the formula (1) are those wherein FB is the radical of a mono- or disazo dyestuff or of a metal complex azo dyestuff.

In this case, the radicals —B—N(R)—X and —B$^1$-N(R$^1$)—Z are bonded to different or identical radicals of starting components, that is to say diazo and coupling components. The radicals —B—N(R)—X and —B'—N(R')—Z are preferably bonded in each case to one component, that is to say diazo component or coupling component. The reactive dyestuffs then have, for example, the formula $$X-\underset{R}{N}-B-[D]-N=N-[K]-B^1-\underset{R^1}{N}-Z \qquad (1b)$$

$$Z-\underset{R^1}{N}-B^1-[D]-N=N-[K]-B-\underset{R}{N}-X \qquad (1c)$$

$$X-\underset{R}{N}-B-D_1-N=N-[K]-N=N-D_2-B^1-\underset{R^1}{N}-Z \qquad (1d)$$

$$Z-\underset{R^1}{N}-B^1-D_1-N=N-[K]-N=N-D_2-B-\underset{R}{N}-X \qquad (1e)$$

wherein —K— in formulae (1d) and (1e) represents the radical of a coupling component with two coupling points.

If the two radicals —B—N(R)—X and —B$^1$—N(R$^1$)—Z are bonded to the same radical of a starting component D or K, this is, in particular, the radical of the coupling component K. The reactive dyestuffs then correspond to the formula

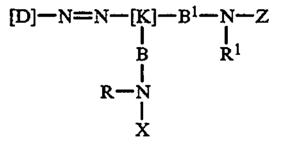
(1f)

wherein

D, $D_1$ and $D_2$ = the radical of a diazo component of the benzene or naphthalene series and K = the radical of a coupling component of the benzene, naphthalene, acetoacetic acid arylide or heterocyclic series; in the heterocyclic series, preferably a pyrazolone or pyridone radical.

The radicals D, $D_1$, $D_2$ and K can be substituted here by further azo groups or by radicals containing azo groups. X, Z, B, $B^1$, R and $R^1$ have the above-mentioned meanings.

Examples of D, $D_1$ and $D_2$ are, preferably, phenyl or phenylene which is optionally substituted by $SO_3H$, chlorine, $C_1$–$C_4$-alkoxy, $C_1$–$C_4$-alkyl, carbalkoxy or sulphonamido, naphthyl or naphthylene which is optionally substituted by $SO_3H$, chlorine, $C_1$–$C_4$-alkoxy or $C_1$–$C_4$-alkyl, 4-(phenylazo)phenyl which is optionally substituted by $SO_3H$, and biphenylene which is optionally substituted by $SO_3H$.

K represents, for example, the radical of a coupling component from the hydroxybenzene, hydroxynaphthalene, aminobenzene, aminonaphthalene or aminohydroxynaphthalene series, or represents a 5-hydroxy-3-methyl(or carboxy)pyrazolone a 6-hydroxy-2-pyridone or an acetoacetic acid arylide radical, optionally ring-substituted by $C_1$–$C_4$-alkyl or $C_1$–$C_4$-alkoxy.

K can contain the customary constituents, in particular sulphonic acid groups.

Reactive dyestuffs which are furthermore possible are those of the formulae (1b) to (1f), wherein the radicals D, $D_1$, $D_2$ and K can also contain a further reactive radical. This therefore also includes tri- and tetrafunctionally fibre-reactive dyestuffs.

The additional reactive radicals included in D or K can be bonded to D or K, like Z and X, via amino groups, or in another manner, for example by a direct bond. The above explanations also apply in the general sense to the metal complexes of the mono- and disazo dyestuffs (1b -1f).

Particularly preferred reactive dyestuffs according to the invention are those of the formula (1) or (1a)-(1f) wherein Z is a fibre-reactive fluorine-containing 4-pyrimidyl radical or a radical of the formula

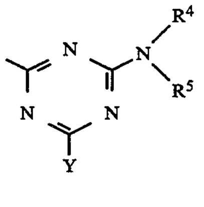
(II)

wherein $R^4$ and $R^5$ independently of one another are hydrogen, $C_{1-4}$-alkyl, which is optionally substituted by halogen, cyano, $C_{1-4}$-alkoxy, hydroxyl, carboxyl, sulpho or sulphato, benzyl, phenethyl, cyclohexyl, phenyl or $-NHCH_2CH_2OCH_2CH_2-SO_2M$ (M = $-CH{=}CH_2$ or $-CH_2CH_2-V$, where V = a radical which can be eliminated under alkaline conditions), phenyl, which is optionally substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or sulpho, or naphthyl, which is optionally substituted by halogen, nitro, $C_{1-4}$-alkoxy, $C_{1-4}$-alkanoylamino, hydroxyl, carboxyl or sulpho, or wherein $R^4$ and $R^5$ together with the amino nitrogen atom, form a morpholino, piperidino or piperazino radical, and wherein Y is Cl, F or an optionally substituted pyridinium radical.

Dyestuffs of the formula (1) which are furthermore preferred are those in which Z represents

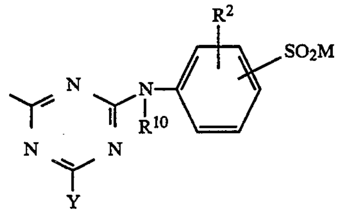
(III)

wherein

Y = Cl, F or an optionally substituted pyridinium radical,

M = $CH{=}CH_2$ or $CH_2CH_2-V$, wherein

V = a radical which can be eliminated under alkaline conditions, for example $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2$-$C_6H_4$, $[N(CH_3)_3]^+$anion$^-$ or an optionally substituted pyridinium radical (substituents are, in particular, optionally substituted $C_1$–$C_4$-alkyl, COOH, $SO_3H$, CN and carboxamide), $R^2$ = H, Cl, Br, $C_1$–$C_4$-alkyl, $C_1$–$C_4$-alkoxy, $CO_2H$ or $SO_3H$ and $R^{10}$ = H or optionally substituted $C_1$–$C_6$-alkyl.

Preferred substituents of $R^{10}$ are halogen, OH, $CO_2H$, $SO_3H$ and $OSO_3H$.

Preferred reactive dyestuffs are those of the formula (2)

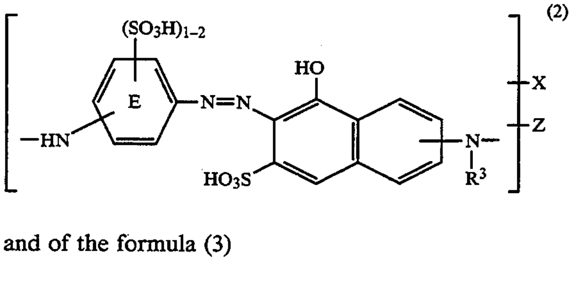
(2)

and of the formula (3)

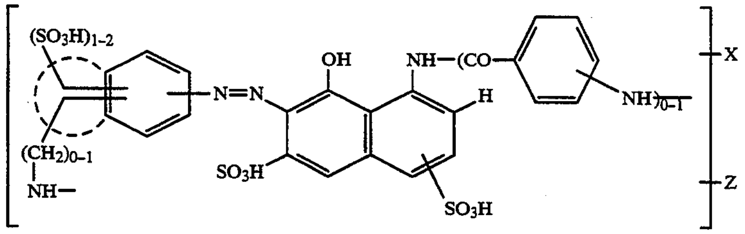

(3)

wherein $R^3$=hydrogen, methyl or ethyl, and the benzene ring E is optionally further substituted.

Substituents in E are, for example: $CH_3$, $C_2H_5$, $CH_3O$, $C_2H_5O$, halogen or $CO_2H$.

Particularly preferred reactive dyestuffs are those of the formula (2) wherein the benzene ring E is not further substituted, and reactive dyestuffs of the formula (3) wherein the benzene ring E is not further substituted.

Reactive dyestuffs which are furthermore preferred are those of the formula (4)

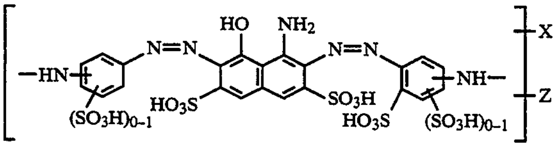

(4)

In addition to the reactive dyestuffs of the formulae (2), (3) and (4) described above, the reactive dyestuffs of the following formulae may be mentioned as further 10 useful representatives:

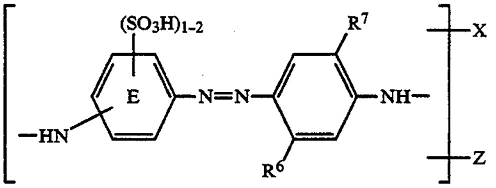

(5)

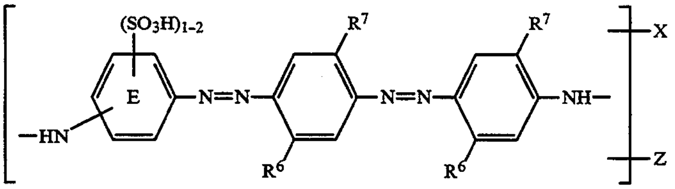

(6)

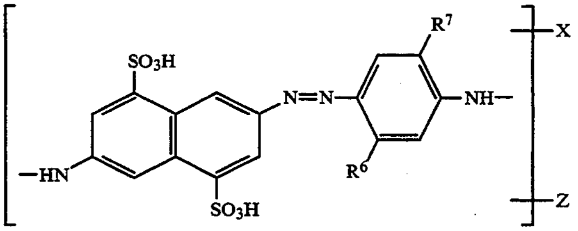

(7)

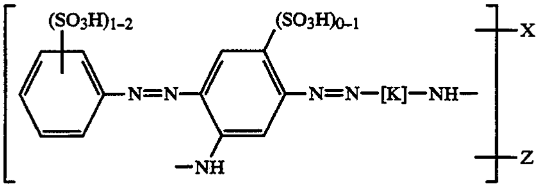

(8)

-continued
(9)
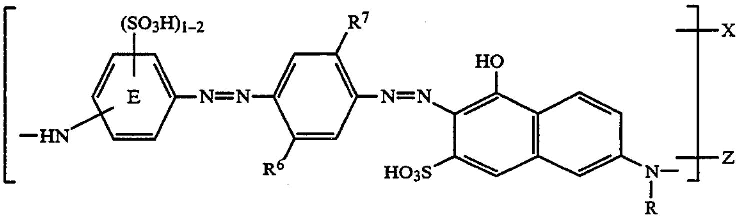
(10)
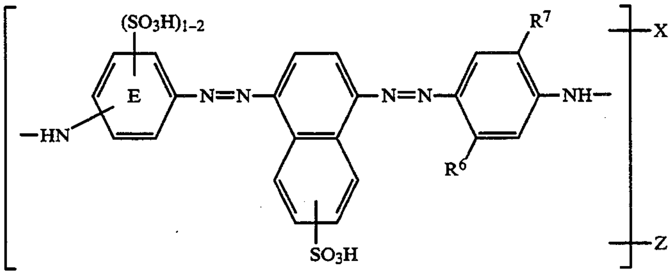
(11)
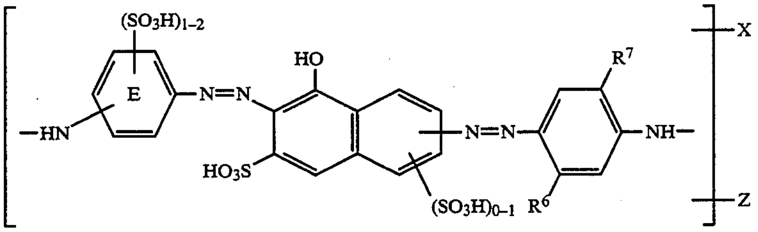
(12)
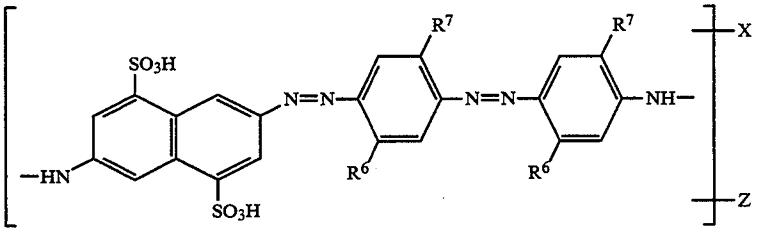
(13)
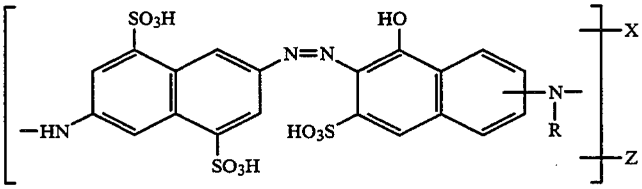
(14)
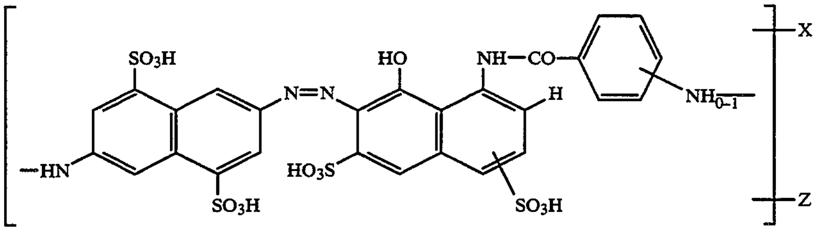
(15)
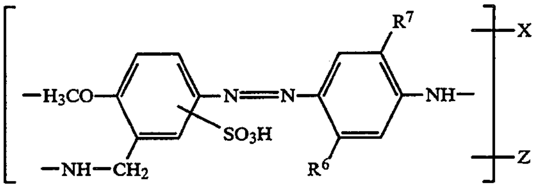

-continued
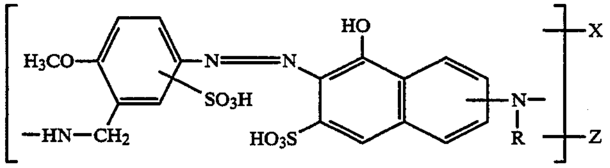
(16)
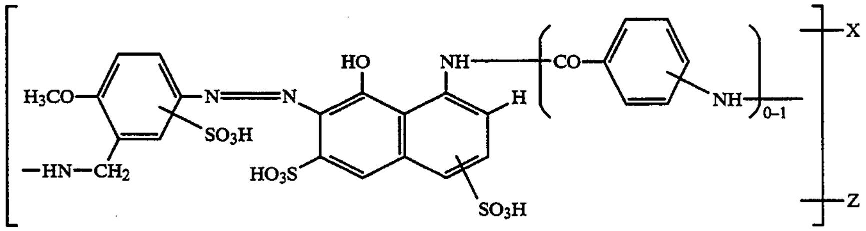
(17)
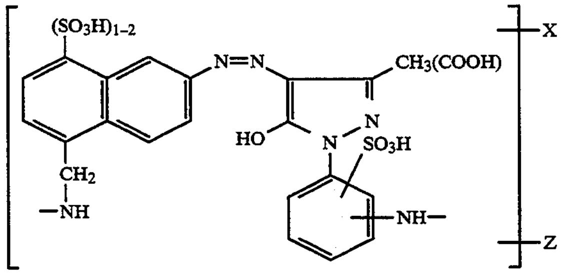
(18)
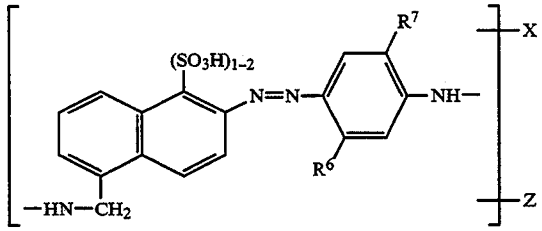
(19)
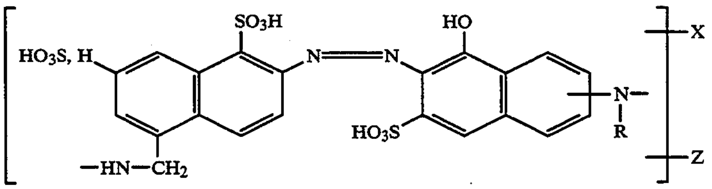
(20)
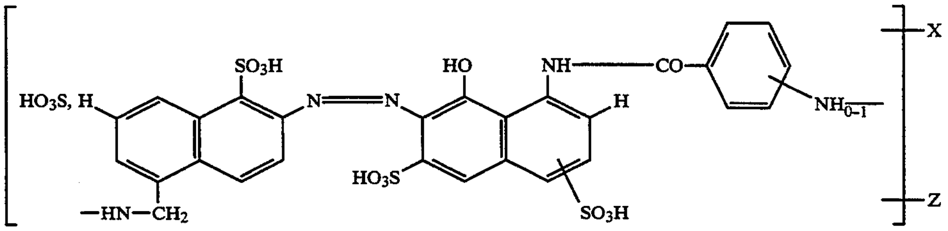
(21)

-continued
(22)
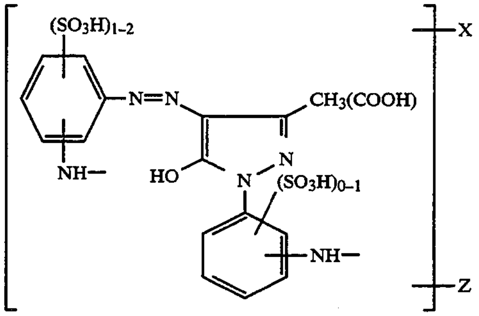
(23)
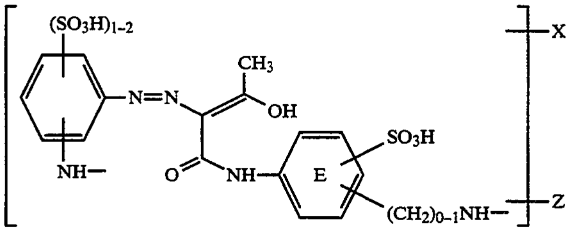
(24)
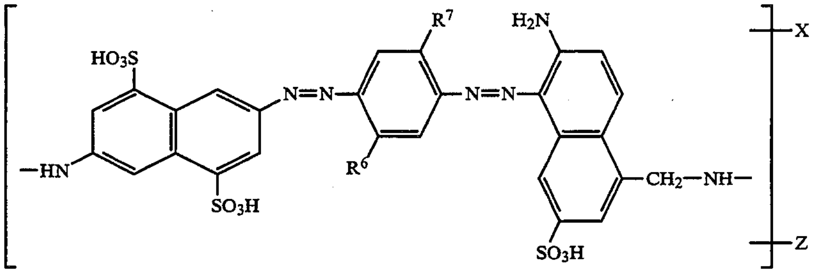
(25)
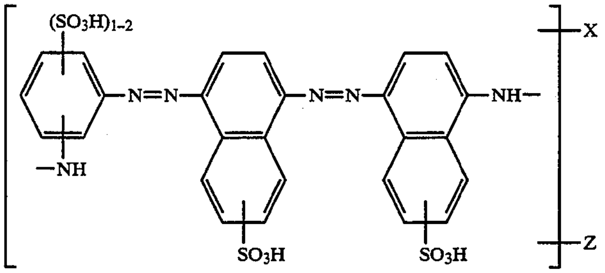
(26)
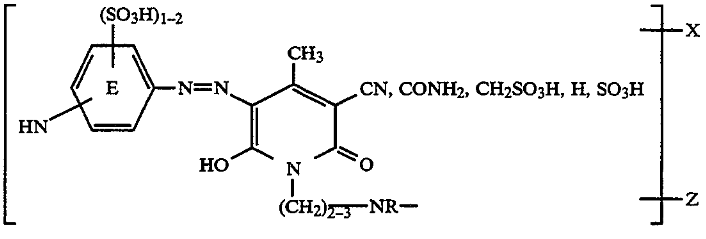
(27)
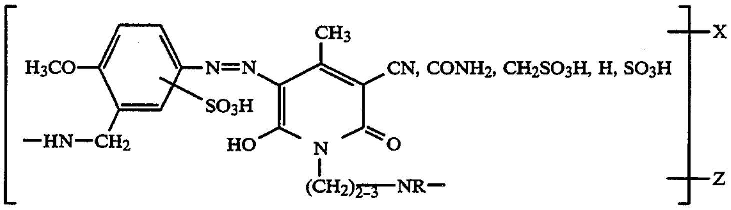

-continued
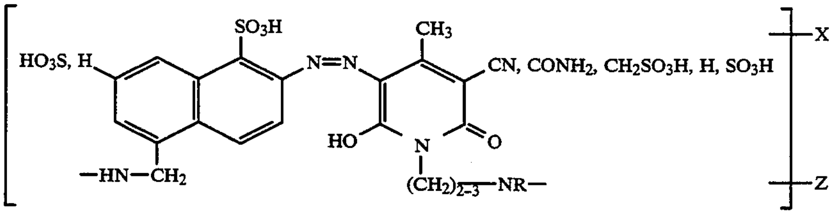
(28)
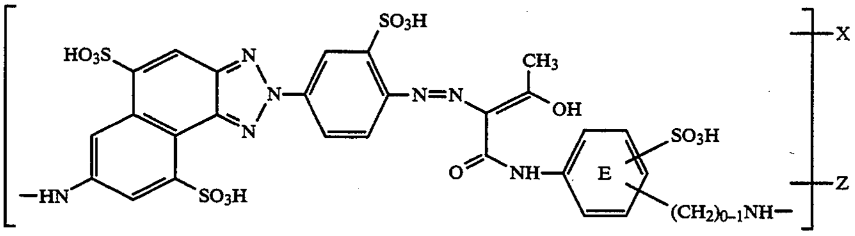
(29)
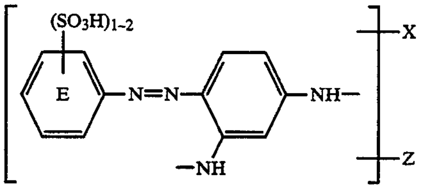
(30)
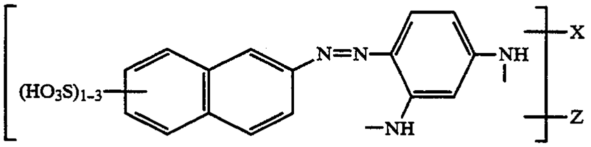
(31)
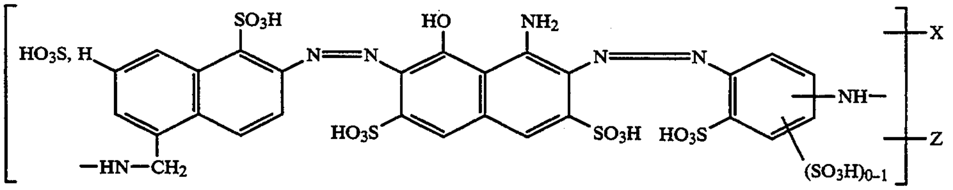
(32)
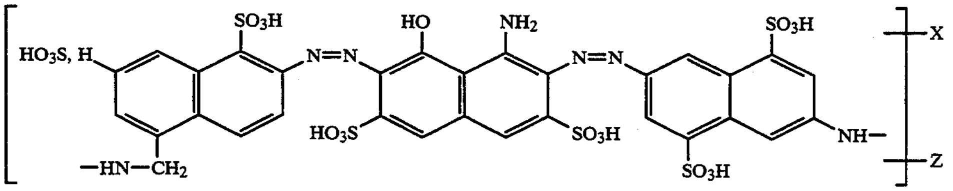
(33)
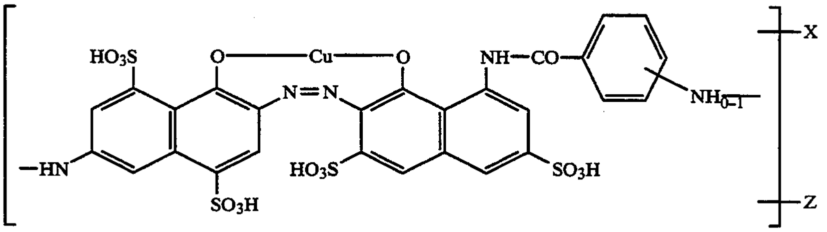
(34)

-continued
(35)
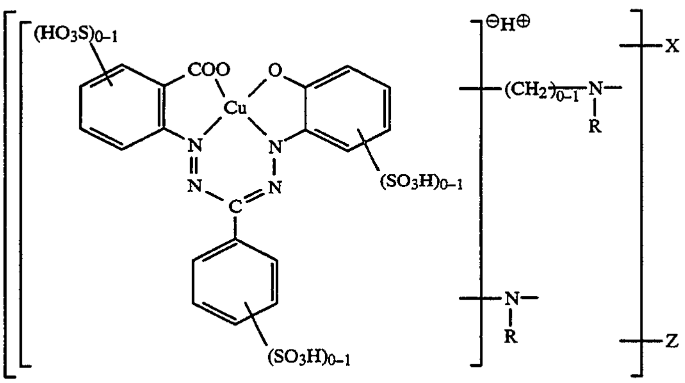
(36)
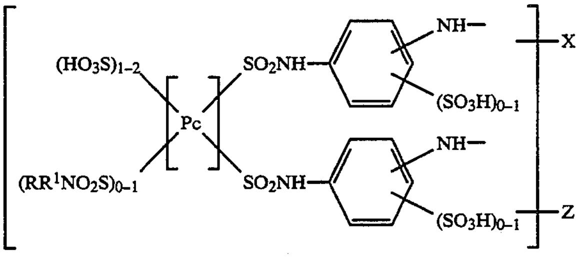
(37)
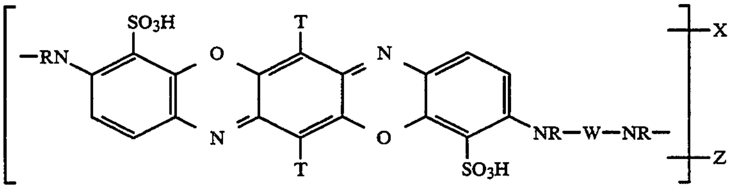
(38)
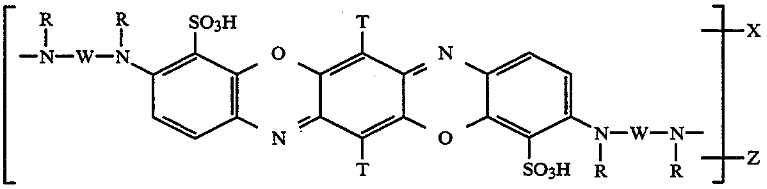
(39)
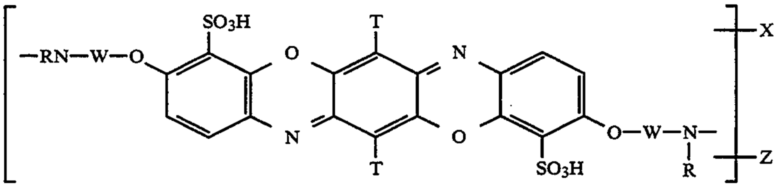
(40)
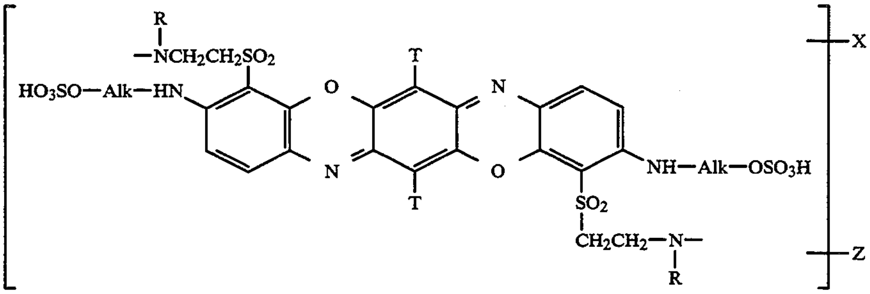
wherein Pc represents a Cu or Ni phthalocyanine radical and the total number of substituents on the Pc skeleton is not more than 4; R and $R^1$ have the abovementioned meaning, and wherein T=Cl, Br or $OCH_3$, and Z, X, K and Alk have the abovementioned meanings, $R^6$=H, $C_1$-$C_4$-alkyl, $C_1$-$C_4$-alkoxy, acylamino, in particular $C_1$-$C_4$-alkylcarbonylamino, $C_1$-$C_4$-alkylsulphonylamino, aminocarbonylamino, optionally substituted phenylcarbonylamino, Cl or Br, $R^7$=H, $C_1$-$C_4$-alkyl, $C_1$-$C_4$-alkoxy, OH or $SO_3H$ and W=an aliphatic bridge member, in particular $C_2$-$C_4$-alkylene.

In the preferred reactive dyestuffs of the formulae (5), (6), (9), (10), (11) and (30), the benzene rings E are preferably likewise not further substituted; diazo components which are used in this case are, above all, 1,3-phenylenediamine-4-sulphonic acid, 1,4-phenylenediamine-2-sulphonic acid, 1,4-phenylenediamine-2,5-disulphonic acid or 1,3-phenylenediamine-4,6-disulphonic acid. The radical R in formulae (9) to (40) is, in particular, hydrogen, methyl or ethyl.

In a preferred embodiment,

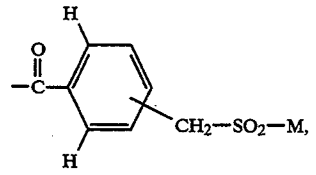

where

M=vinyl or $CH_2CH_2Cl$.

Preferred reactive dyestuffs are, above all, those of the formulae (2) to (40) wherein Z is an unsubstituted or substituted aminofluoro-s-triazine radical, and wherein —$NR_4R_5$ preferably represents: —$NH_2$, morpholino, N-β-hydroxyethylamino, N,N-di-β-hydroxyethylamino, β-sulphoethylamino, phenylamino, which is optionally substituted in the phenyl nucleus by chlorine, methyl, ethyl, methoxy, ethoxy, acetylamino, hydroxyl, carboxyl, sulphomethyl or sulpho, N-$C_{1-4}$-alkyl-phenylamino, which is optionally substituted in the phenyl nucleus by chlorine, methyl or ethyl, N-(sulpho-$C_{1-4}$-alkyl)-phenylamino, which is optionally substituted in the phenyl nucleus by chlorine, methyl or ethyl, N-(hydroxy-$C_{1-4}$-alkyl)phenylamino amino or sulphonaphthylamino, and the second reactive radical X represents the (2-chloroethylsulphonyl-methyl)benzoyl radical, such as, for example, dyestuffs of the formula (41)

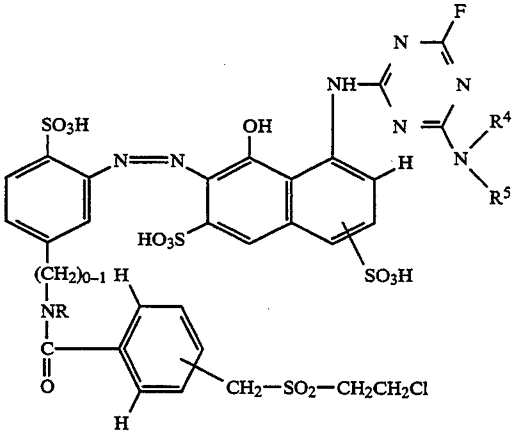

(41)

Preferred reactive dyestuffs are those of the formula (42), wherein Z is a fibre-reactive halogen-containing pyrimidyl radical, for example

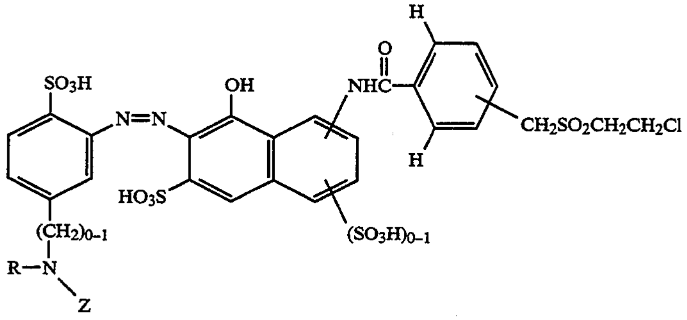

(42)

where R=H, $CH_3$ or $C_2H_5$.

Preferred dyestuffs (2) to (40) are those in which

X = 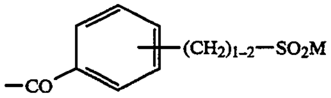 and (III)

Z = 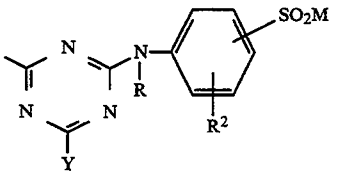

One process for the preparation of the dyestuffs (1) comprises a procedure in which dyestuffs

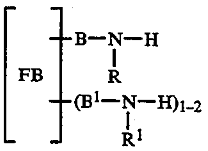

(IV)

or the corresponding dyestuff precursors, are reacted with a reactive component

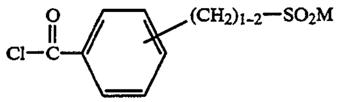

(V)

and then with a reactive component

Z—Hal (VI)

wherein Hal=Cl, Br or F, and in the case where precursors are used, these are then converted into the desired end dyestuffs, and if appropriate further modification reactions are then carried out.

In the preparation of the preferred azo dyestuffs, the diazo components and the coupling components together must contain two amino groups —N(R)H and —N($R^1$)H, and if appropriate further acylatable amino groups. If appropriate, corresponding acetylamino or nitro compounds are used, in which case the acetylamino or nitro group is converted into the $NH_2$ group by hydrolysis or reduction before the condensation with a halogenotriazine, halogenopyrimidine or the like. The reactive radicals X and Z are introduced by condensation of dyestuffs or dyestuff precursors which contain acylatable amino groups with fibre-reactive halogenated acylating agents. The preparation of the end dyestuffs from precursors is usually by coupling reactions which lead to azo dyestuffs.

Since the individual process steps mentioned above can be carried out in different sequences, various process variants are possible. In general, the reactions are carried out stepwise in succession, the sequence of the simple reactions between the individual reaction components advantageously depending on the particular conditions. Since hydrolysis of a halogenotriazine, (2-chloroethylsulphonyl-methyl)-benzoyl or halogenopyrimidine radical etc. occurs under certain conditions, an intermediate product which contains acetylamino groups must be hydrolysed for the purpose of splitting off the acetyl groups before it is subjected to condensation with an aminodifluorotriazine or trifluorotriazine and the like. A further possible modification reaction is, for example, subsequent reaction of a dihalogenotriazinyl radical with an amine. The reaction during preparation of a secondary condensation product of amine $HNR_4R_5$, 2,4,6-trihalogeno-s-triazine and diaminobenzenesulphonic acid which is advantageously carried out first, that of the trihalogenotriazine with the amine or with the diaminobenzenesulphonic acid, varies from case to case and depends above all on the solubility of the amino compounds participating and the basicity of the amino groups to be acylated. The most important process variants are described in the embodiment examples.

Suitable starting compounds for the preparation of mono-or polyazo dyestuffs (1) are, for example:

Diazo components (D, $D_1$ and $D_2$)

1,3-Diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4′-diaminostilbene, 4,4′-diaminodiphenylmethane, 4,4′-diaminobiphenyl(benzidine), 3,3′-dimethylbenzidine, 3,3′-dimethoxybenzidine, 3,3′-dichlorobenzidine, 3,3′-dicarboxybenzidine, 3,3′-dicarboxymethoxybenzidine, 2,2′-dimethylbenzidine, 4,2′-diaminodiphenyl (diphenyline), 2,6-diaminonaphthalene-4,8disulphonic acid, 1,4-diaminobenzene-2-sulphonic acid, 1,4-diaminobenzene-2,5-disulphonic acid, 1,4-diaminobenzene-2,6-disulphonic acid, 1,3-diaminobenzene-4-sulphonic acid, 1,3-diaminobenzene-4,6-disulphonic acid, 1,4-diamino-2-chlorobenzene-5-sulphonic acid, 1,4-diamino-2-methylbenzene-5-sulphonic acid, 1,5-diamino-6-methylbenzene-3-sulphonic acid, 1,3-diamino-6-methylbenzene-4-sulphonic acid, 3-(3′- or 4′-aminobenzoylamino)-1-aminobenzene-6-sulphonic acid, 1-(4′-aminobenzoylamino)-4-aminobenzene-2,5-disulphonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4′-diaminodiphenyl oxide, 4,4′-diaminodiphenylurea-2,2′-disulphonic acid, 4,4′-diaminodiphenyloxyethane-2,2′-disulphonic acid, 4,4′-diaminostilbene-2,2′-disulphonic acid, 4,4′-diaminodiphenylethane-2,2′-disulphonic acid, 2-amino-5-aminomethylnaphthalene-1-sulphonic acid, 2-amino-5-aminomethylnaphthalene-1,7-disulphonic acid and 1-amino-4-methoxy-5-aminomethylbenzene-6-sulphonic acid.

If an aminoacetylamino compound from which the acetyl group is split off again subsequently by hydrolysis is to be used instead of a diamine as the diazo component, as is described above in the explanations of the process variants, the monoacetyl compounds of the abovementioned diazo components are possible, for example 1-acetylamino-3-aminobenzene-4-sulphonic acid or 1-acetylamino-4-aminobenzene-3-sulphonic acid.

If the two radicals —B—N(R)—X and —$B^1$—N($R^1$)—Z in formula (1) are bonded to the same component, for example the coupling component, as is described above, diazo components which can also be used are those which contain no acylatable amino group in addition to the amino group to be diazotised, such as, for example, aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulphonamide, 1-aminobenzene-2-, -3- or -4-sulphonic acid, 1-aminobenzene-2,4- and -2,5-disulphonic acid, 1-amino-4-methylbenzene-2-sulphonic acid, 1-amino-3-methylbenzene-6-sulphonic acid, 1-amino-6-methylbenzene-3- or -4-sulphonic acid, 1-aminonaphthalene, 2-aminonaphthalene, 1-aminonaphthalene-2-, -4-, -5-, -6-, -7- or -8-sulphonic acid, 2-aminonaphthalene-1-, -3-, -4-, -5-, -6-, -7- or -8-sulphonic acid, 1-aminonaphthalene-3,6- or -5,7-disulphonic acid, 2-aminonaphthalene-1,5-, -1,7-, -3,6-, -5,7-, -4,8- or -6,8-disulphonic acid, 1-aminonaphthalene-2,5,7-trisulphonic acid, 2-aminonaphthalene-1,5,7-, -3,6,8- or -4,6,8-trisulphonic acid, 4-aminoazobenzene-3,4′-disulphonic acid, 3-methoxy-4-amino-6-methylazobenzene-2',4'-disulphonic acid or 3-methoxy-4-amino-6-methylazobenzene-2',5'-disulphonic acid Coupling components (K)

1-Amino-3-methylbenzene, 1-amino-2-methoxy-5-methylbenzene, 1-amino-2,5-dimethylbenzene, 3-amino-phenylurea, 1-amino-3-acetylaminobenzene, 1-amino-3-hydroxyacetylaminobenzene, 1,3-diaminobenzene-4-sulphonic acid, 1-aminonaphthalene-6- or -8-sulphonic acid, 1-amino-2-methoxynaphthalene-6-sulphonic acid, 2-aminonaphthalene-5,7-disulphonic acid, 1-amino-8-hydroxynaphthalene-6-sulphonic acid, 1-amino-8-hydroxynaphthalene-2,4-disulphonic acid, 2-hydroxy-3-aminonaphthalene-5,7-disulphonic acid, 1-amino-8-hydroxynaphthalene-2,4,6-trisulphonic acid, 1-hydroxy-8-acetylaminonaphthalene-3sulphonic acid, 1-benzoylamino-8-hydroxynaphthalene-3,6- or -4,6-disulphonic acid, 2-benzoylamino-5-hydroxynaphthalene-7-sulphonic acid, 2-amino-5-hydroxynaphthalene-7-sulphonic acid, 2-methyl- or 2-ethylamino-5-hydroxynaphthalene-7-sulphonic acid, 2-(N-acetyl-N-methylamino)-5-hydroxynaphthalene-7-sulphonic acid, 2-acetylamino-5-hydroxynaphthalene-7-sulphonic acid, 2-amino-5-hydroxynaphthalene-1,7-disulphonic acid, 2-amino-8-hydroxynaphthalene-6-sulphonic acid, 2-methyl- or 2-ethylamino-8-hydroxynaphthalene-6-sulphonic acid, 2-(N-acetyl-N-methylamino)-8-hydroxynaphthalene-6-sulphonic acid, 2-acetylamino-8-hydroxynaphthalene-6-sulphonic acid, 2-amino-8-hydroxynaphthalene-3,6-disulphonic acid, 2-acetylamino-8-hydroxynaphthalene-3,6-disulphonic acid, 1-amino-5-hydroxynaphthalene-7-sulphonic acid, 1-amino-8-hydroxynaphthalene-3,6- or -4,6-disulphonic acid, 1-acetylamino-8-hydroxynaphthalene-3,6- or -4,6-disulphonic acid, 1-(4'-aminobenzoylamino)-8-hydroxynaphthalene-3,6-or -4,6-disulphonic acid, 1-(4'-nitrobenzoylamino)-8-hydroxynaphthalene-3,6- or -4,6-disulphonic acid, 1-(3'-aminobenzoylamino)-8-hydroxynaphthalene-3,6- or -4,6-disulphonic acid, 1-(3'-nitrobenzoylamino)-8-hydroxynaphthalene-3,6- or -4,6-disulphonic acid, 2-(4'-amino-3'-sulphophenylamino)-5-hydroxynaphthalene-7-sulphonic acid, 1-amino-8-hydroxynaphthalene-4-sulphonic acid, 2,4,6-triamino-3-cyanopyridine, 1-β-aminoethyl-3-cyano-4-methyl-6-hydroxypyrid-2-one, 1γ-aminopropyl-3-sulphomethyl-4-methyl-6-hydroxypyrid-2-one and 1,3-diaminobenzene.

The diazotisation of the diazo components or of the intermediate products containing a diazotisable amino group is as a rule carried out by the action of nitrous acid in aqueous-mineral acid solution at a low temperature. The coupling to the coupling components is carried out at strongly acid, neutral to weakly alkaline pH values.

The condensation of the reactive components with the diazo components and the coupling components and with the amines or with acylatable monoazo or disazo intermediate products or with the dyestuffs containing amino groups is preferably carried out in aqueous solution or suspension, at a low temperature and at a weakly acid, neutral to weakly alkaline pH value. The hydrogen halide liberated during the condensation is advantageously neutralised continuously by addition of aqueous alkali metal hydroxides, carbonates or bicarbonates.

The formulae shown are those of the free acids. The salts, in particular the alkali metal salts, such as sodium, potassium or lithium salts, are in general obtained during the preparation. The charge resulting from quaternisation with pyridines is compensated by a counter-ion, for example chloride, fluoride or sulphate, depending on the isolation conditions; or the dyestuffs form inner salts with sulpho or carboxyl groups. The dyestuffs can also be employed as concentrated solutions.

The dyestuffs according to the invention are outstandingly suitable for dyeing and printing naturally occurring and synthetic materials containing OH groups or amide groups, in particular those of cellulose and polyamides. They are particularly suitable for dyeing cellulose materials by the exhaustion and cold pad-batch process, and for printing cotton and viscose staple.

Dyeings having good general fastness properties, in particular wet fastness properties, are obtained, with a good build-up capacity and high fixing yields.

Dyeing Instructions

The dyeings mentioned in the following examples were carried out under the following conditions:

Dyeing instructions 1

2 parts of the dyestuff are dissolved in 100 ml of water. The solution is added to 1900 parts of cold water, 60 parts of sodium chloride are added, and 100 parts of a cotton fabric are introduced into this dyebath.

The temperature is increased to 50° C. 40 parts of calcined sodium carbonate and a further 60 parts of sodium chloride being added after 30 minutes. The temperature is kept at 50° C. for 30 minutes, the fabric is rinsed and the dyeing is then soaped for 15 minutes in a 0.3% strength boiling solution of an ion-free detergent, rinsed and dried.

Dyeing instructions 2

4 parts of the reactive dyestuff are dissolved in 50 parts of water. 50 parts of a solution which contains 5 g of sodium hydroxide and 10 g of calcined sodium carbonate per litre are added. A cotton fabric is padded with the resulting solution such that it increases by 70% of its weight, and is then wound up onto a beam. The cotton fabric is stored thus at room temperature for 3 to 12 hours. The dyed goods are then rinsed, soaped at the boil with a nonionic detergent for a quarter of an hour, rinsed again and dried.

Example 1 a) 0.2 mol of 1-amino-8-hydroxynaphthalene-3,6-disulphonic acid is dissolved in 350 ml of water at pH 6.5, and the solution is cooled to 0° C. with 350 g of ice. 0.21 mol of 2,4,6-trifluoro-1,3,5-triazine (cyanuric fluoride) is added, and the pH is kept at between 3.5 and 4 with $Na_2CO_3$ solution. After 5 minutes, 0.2 mol of morpholine is added, and the pH is then brought to 7 with sodium carbonate solution. During this procedure, the temperature rises to about 10° C.

b) 0.2 mol of 3-[4'-(β-chloroethylsulphonyl-methyl)-benzoylamino]-aniline-4-sulphonic acid (prepared from 2,4-diaminobenzenesulphonic acid and 4-(β-chloroethylsulphonyl-methyl)-benzoyl chloride) is suspended in water, and 65 ml of 30% strength hydrochloric acid and 300 g of ice are added. 46 ml of 30% strength sodium nitrite solution are then added, and the mixture is stirred at 0° C. for 1 hour. Excess sodium nitrite is destroyed with amido-sulphonic acid, and the diazotisation mixture thus obtained is added to the solution of the coupling component a). A pH of 6–7 is established with sodium carbonate solution.

When the coupling has ended, the dyestuff is salted out, isolated, dried and ground. The dyestuff of the formula

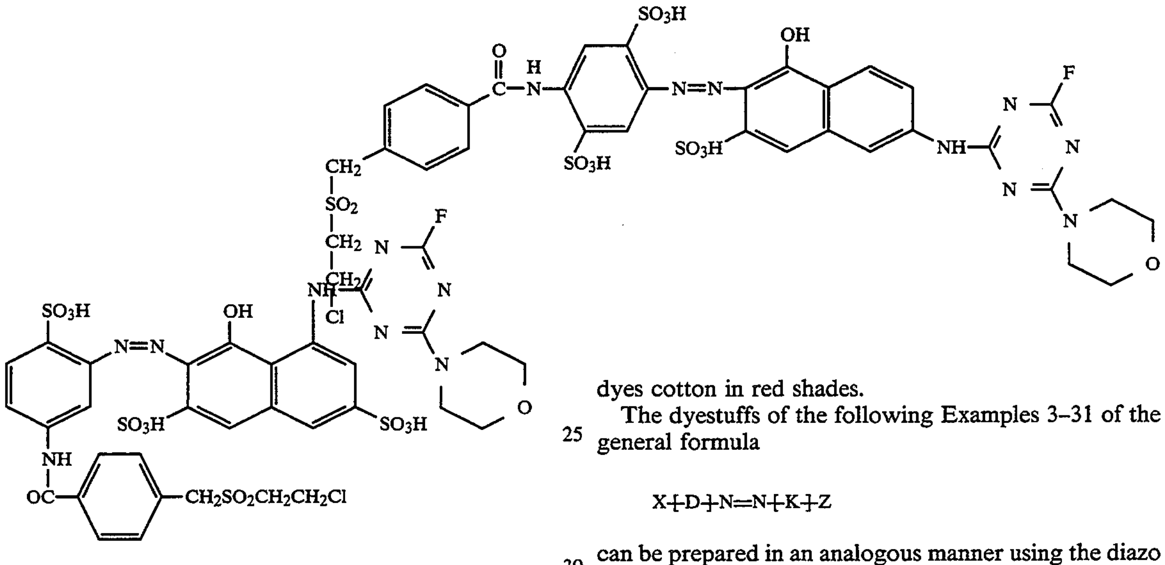

$\lambda_{max}$ = 515 and 532 nm ($H_2O$)

thus obtained dyes cotton in clear red shades.

EXAMPLE 2 a) 0.2 mol of 1,4-diaminobenzene-2,5-disulphonic acid is dissolved in 500 ml of water with concentrated sodium hydroxide solution to give a neutral solution The solution is heated to 50° C. and 0.3 mol of 3-(β-chloroethylsulphonyl-methyl)-benzoyl chloride is added. A pH of 7 is maintained by simultaneous addition of sodium carbonate solution (20 g/100 ml). The reaction has ended after 3 hours. The mixture is cooled to 0° C., and 55 ml of 30% strength HCl are added. 47 ml of sodium nitrite solution (30 g/100 ml) are added dropwise at 0° C.-5° C. in the course of 30 minutes. The diazotisation mixture is stirred at 0°-5° C., for 30 minutes. Excess nitrite is then destroyed with amidosulphonic acid.

b) 0.2 mol of 6-amino-1-naphthol-3-sulphonic acid is dissolved in 600 ml of water at pH 7-7.5, with addition of 38 ml of 11% strength lithium hydroxide solution. 0.21 mol of cyanuric fluoride is added dropwise in the course of 30 minutes. During this procedure, a pH of 3.7-4.1 is maintained by simultaneous dropwise addition of 11% strength lithium hydroxide solution. The mixture is subsequently stirred for 5 minutes, and 0.2 mol of morpholine is added. A pH of 7 is established with sodium carbonate solution (20 g/100 ml). The temperature is 5°-8° C. The mixture is subsequently stirred for 15 minutes, and the above diazotisation mixture a) is added dropwise in the course of 1 hour. A pH of 5.5-6.5 is maintained with 1 molar sodium bicarbonate solution. When the coupling has ended, the dyestuff is salted out with NaCl, isolated and dried. The dyestuff of the formula dyes cotton in red shades.

The dyestuffs of the following Examples 3-31 of the general formula

X+D+N=N+K+Z can be prepared in an analogous manner using the diazo and coupling components and amines listed. They dye cotton in the colour shades listed.

In the following examples, X represents the following particular radicals:

$X^1$ = 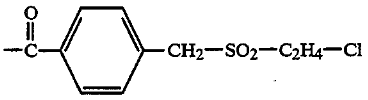

$X^2$ = 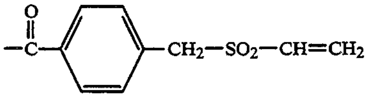

$X^3$ = 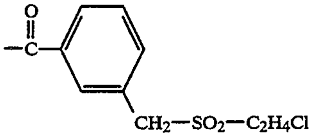

$X^4$ = 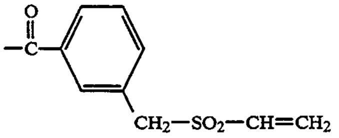

| | Diazo component | Coupling component | Z | Colour shade |
|---|---|---|---|---|
| 3 | 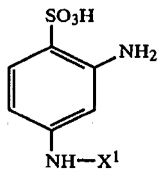 | 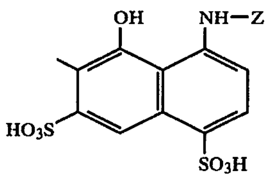 | 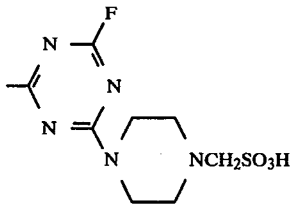 | Red |
| 4 | 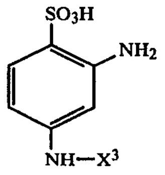 | " | 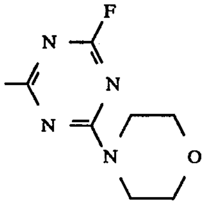 | Red |
| 5 | 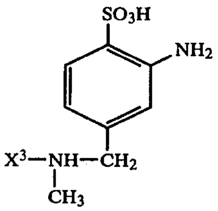 | " | " | Red |
| 6 | 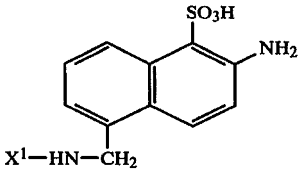 | " | 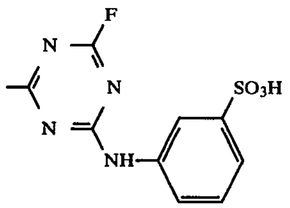 | Red |

-continued
| | Diazo component | Coupling component | Z | Colour shade |
|---|---|---|---|---|
| 7 | 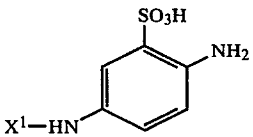 | 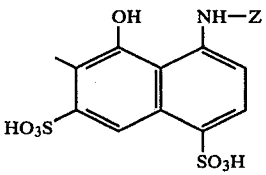 | 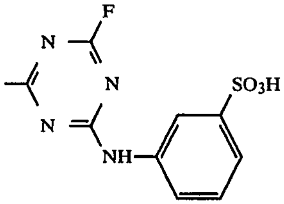 | Bluish-tinged red |
| 8 | 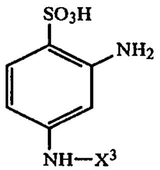 | 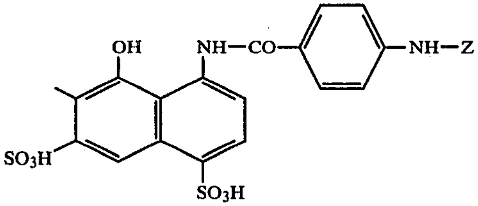 | " | Red |
| 9 | 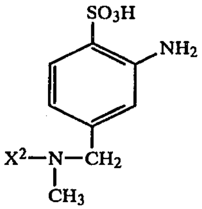 | " | " | Yellowish-tinged red |
| 10 | 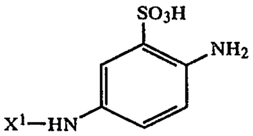 | 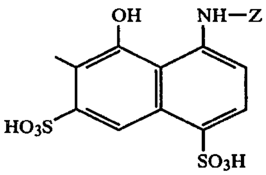 | 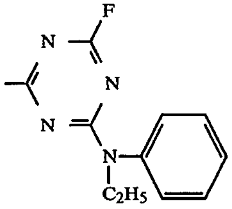 | Bluish-tinged red |

-continued
| | Diazo component | Coupling component | Z | Colour shade |
|---|---|---|---|---|
| 11 | 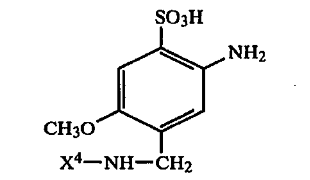 | " | 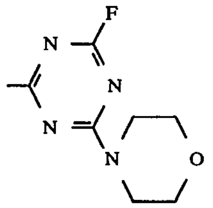 | Red |
| 12 | 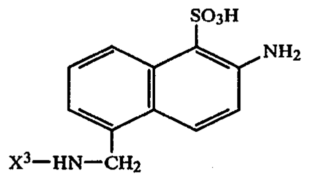 | " | 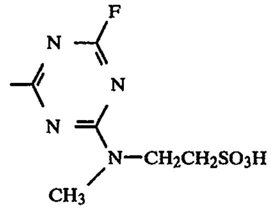 | Red |
| 13 | 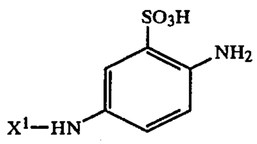 | 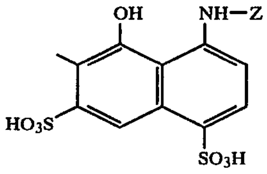 | 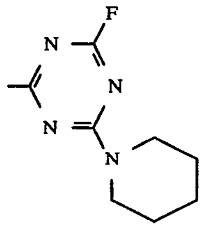 | Red-violet |
| 14 | 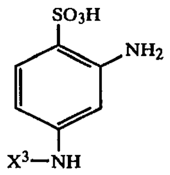 | " | 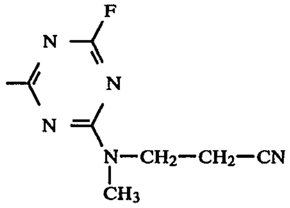 | Red |

-continued
| | Diazo component | Coupling component | Z | Colour shade |
|---|---|---|---|---|
| 15 | " | 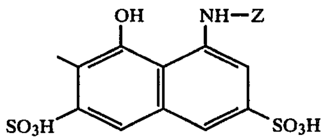 | 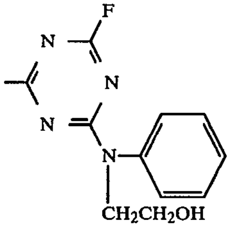 | Red<br>$\lambda_{max}$ = 514 nm,<br>Sh 530 nm |
| 16 | 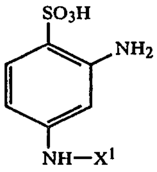 | 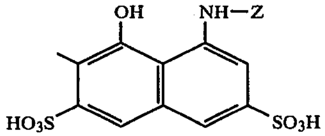 | 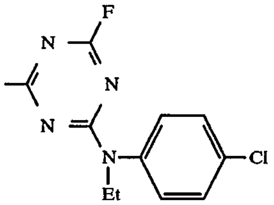 | Red |
| 17 | 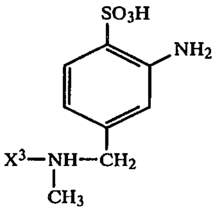 | " | 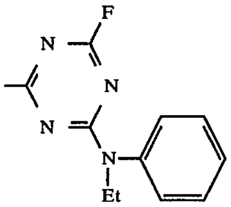 | Red<br>$\lambda_{max}$ = 512 nm,<br>534 nm |
| 18 | 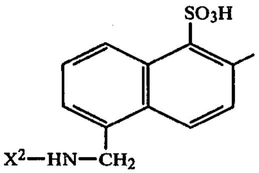 | " | 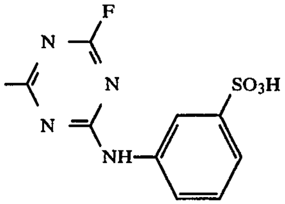 | Bluish-tinged red |

-continued
| | Diazo component | Coupling component | Z | Colour shade |
|---|---|---|---|---|
| 19 | 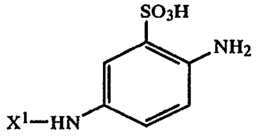 | 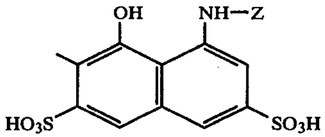 | 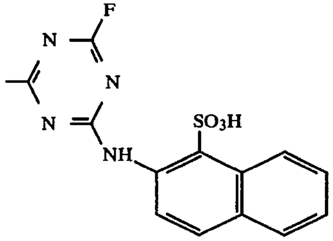 | Red-violet |
| 20 | 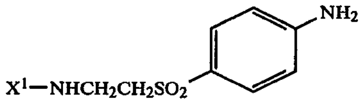 | " | 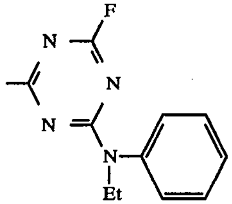 | Red |
| 21 | 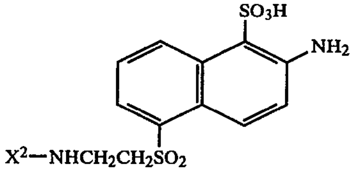 | " | 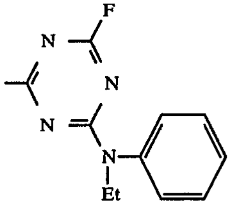 | Red |
| 22 | 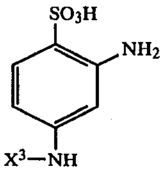 | 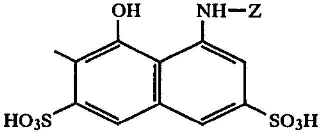 | 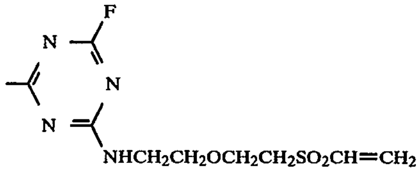 | Red $\lambda_{max}$ = 514, 532 nm |

-continued
| | Diazo component | Coupling component | Z | Colour shade |
|---|---|---|---|---|
| 23 | 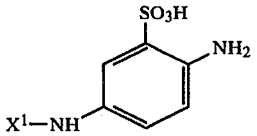 | " | 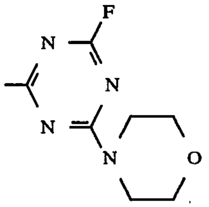 | Red-violet |
| 24 | 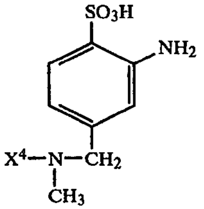 | " | " | Red $\lambda_{max}$ = 514, 533 nm |
| 25 | 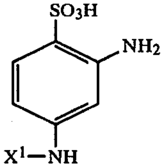 | 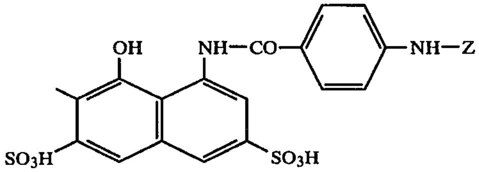 | 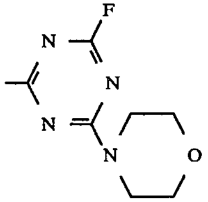 | Red |
| 26 | 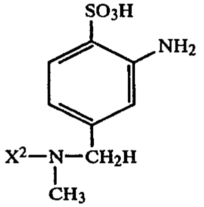 | " | 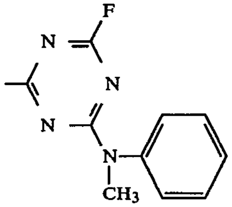 | Red $\lambda_{max}$ 512 nm, 535 nm |

-continued
| | Diazo component | Coupling component | Z | Colour shade |
|---|---|---|---|---|
| 27 | 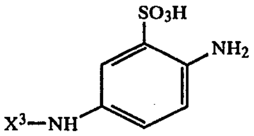 | 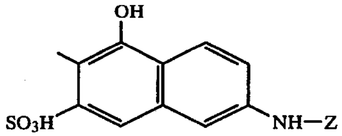 | 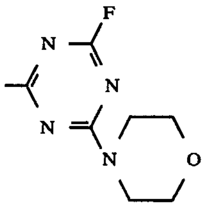 | Scarlet |
| 28 | 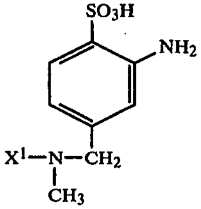 | 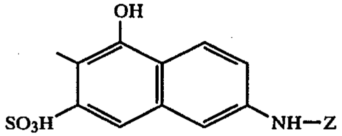 | 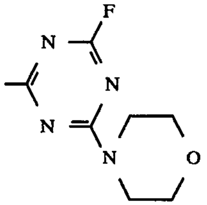 | Orange |
| 29 | 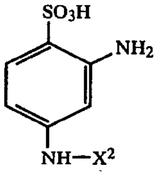 | " | 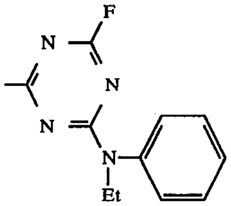 | Orange |
| 30 | 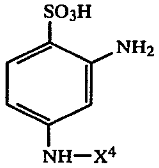 | 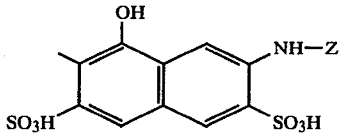 | " | Scarlet-red $\lambda_{max}$ = 506 nm |
| 31 | 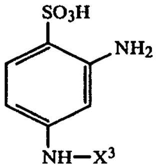 | 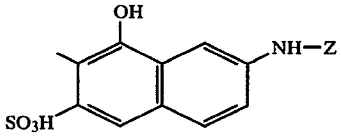 | 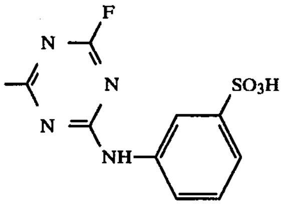 | Orange |

EXAMPLE 32

0.2 mol of 1-amino-8-hydroxynaphthalene-3,6-disulphonic acid is dissolved in 450 ml of water at pH 8–9 with sodium hydroxide solution, and 0.22 mol of 2,4,6-trifluoropyrimidine is added. The condensation is carried out at 35°–40° C., the pH being maintained with sodium carbonate solution.

If the product is coupled with the diazotisation mixture described in Example 1, under the same conditions, salting out, isolation and drying give the dyestuff of the formula

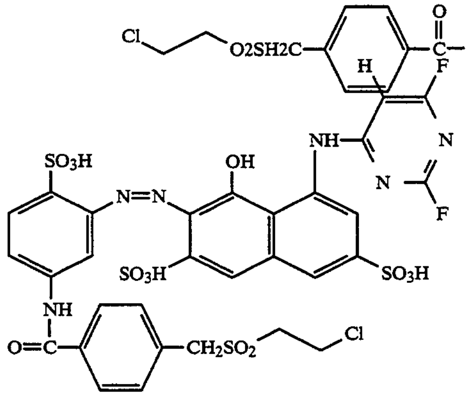

which dyes cotton in red shades.

EXAMPLE 33

0.2 mol of 8-(4'-amino-benzoylamino)-1-naphthol-3,6-disulphonic acid is dissolved in 800 ml of water at a pH of 7 with sodium carbonate solution (20 g/100 ml). A pH of 4.5 is established with 10% strength CHl solution. 0.2 mol of 2,4,6-trifluoropyrimidine is added, and the mixture is heated up to 30° C. A pH of 4.5–6 is maintained with sodium carbonate solution (20 g/100 ml). The reaction has ended after 4 hours.

0.2 mol of the diazonium salt from Example 1 is now added, and a pH of 7.5–8 is maintained at the same time by dropwise addition of sodium carbonate solution (20 g/100 ml). When the coupling has ended, the dyestuff is salted out with NaCl, isolated and dried. The dyestuff of the formula

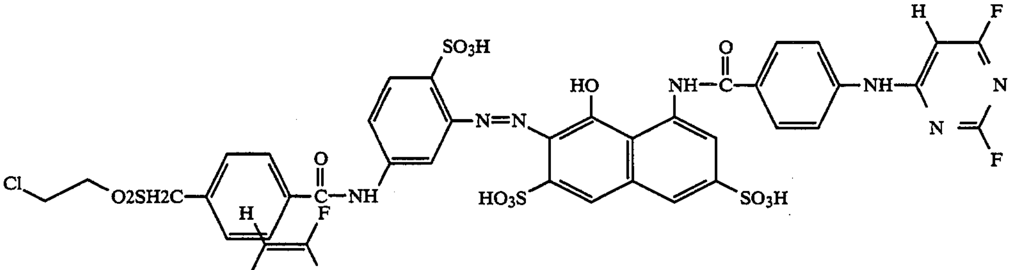

dyes cotton in red shades.

EXAMPLES 34–68

Examples 34–68 of the formula

X+D+N=N+K+Z can be prepared as described in Example 32 or 33 if the corresponding intermediate products are employed. They dye cotton in the colour shades shown. X is represented by $X^1$ to $X^4$ with the abovementioned meanings.

| | Diazo component | Coupling component | Z | Colour shade |
|---|---|---|---|---|
| 34 | 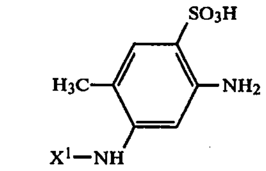 | 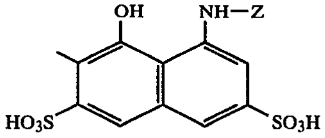 | 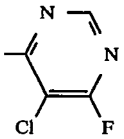 | Red |
| 35 | 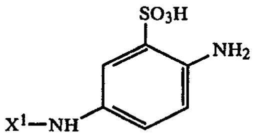 | 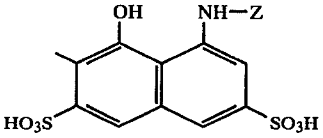 | 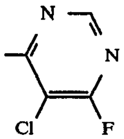 | Red-violet |
| 36 | 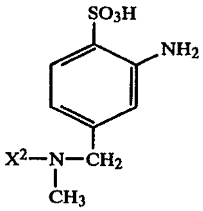 | " | " | Red |
| 37 | 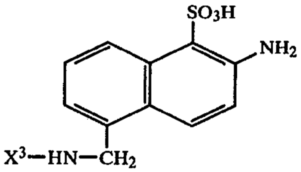 | " | " | Bluish-tinged red |
| 38 | 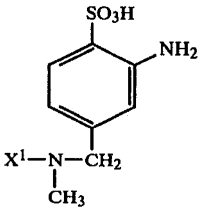 | 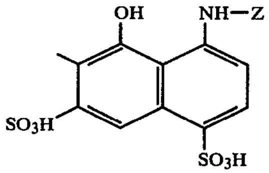 | 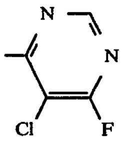 | Red |

-continued
| | Diazo component | Coupling component | Z | Colour shade |
|---|---|---|---|---|
| 39 | 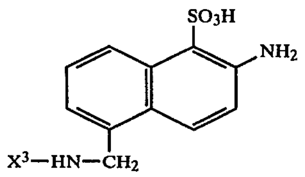 | " | " | Red |
| 40 | 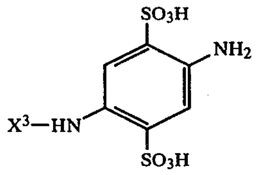 | " | " | Bluish-tinged red |
| 41 | 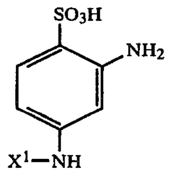 | 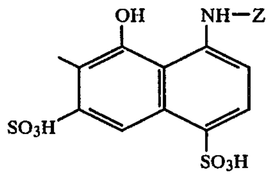 | 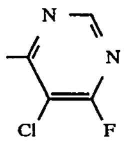 | Red |
| 42 | 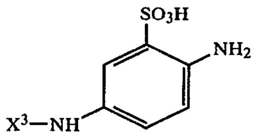 | 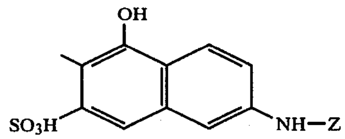 | " | Scarlet |
| 43 | 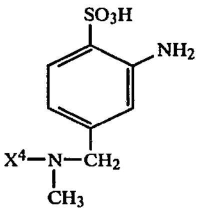 | " | " | Orange |

-continued
| | Diazo component | Coupling component | Z | Colour shade |
|---|---|---|---|---|
| 44 | 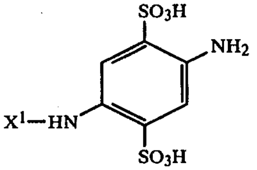 | 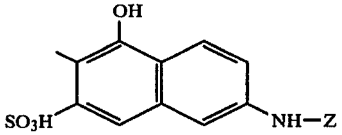 | 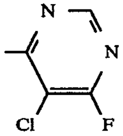 | Red |
| 45 | 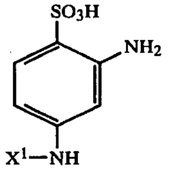 | 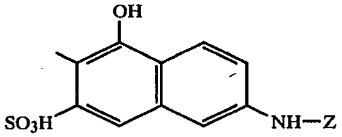 | " | Orange |
| 46 | 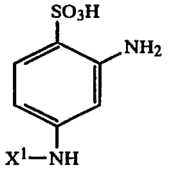 | 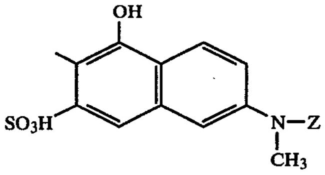 | 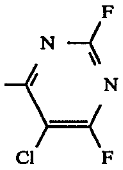 | Orange |
| 47 | 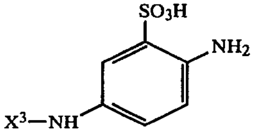 | 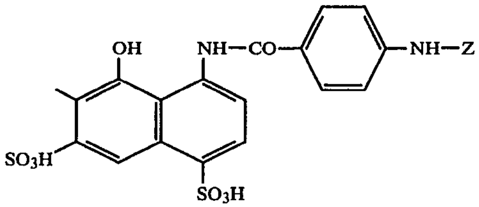 | 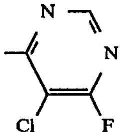 | Bluish-tinged red |
| 48 | 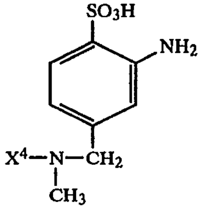 | " | " | Red |

-continued
| | Diazo component | Coupling component | Z | Colour shade |
|---|---|---|---|---|
| 49 | 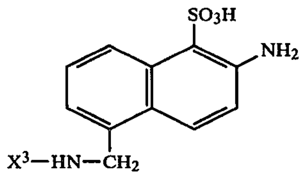 | " | 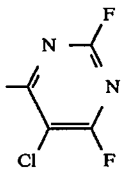 | Red |
| 50 | 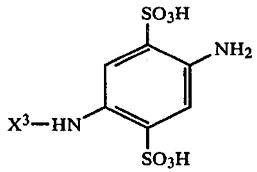 | 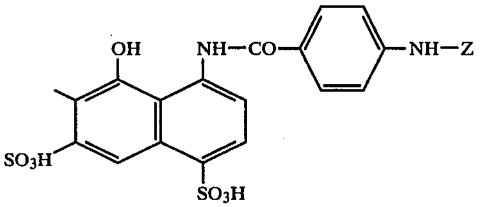 | 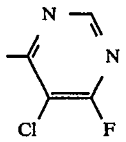 | Bluish-tinged red |
| 51 | 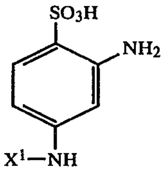 | 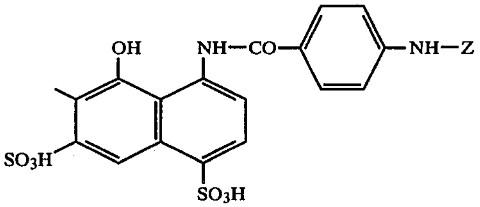 | " | Red |
| 52 | 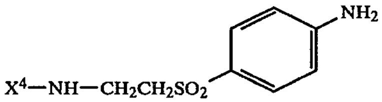 | 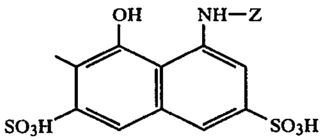 | " | Red |
| 53 | 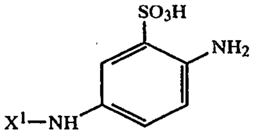 | 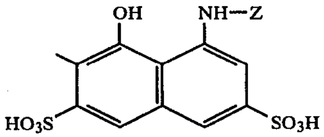 | 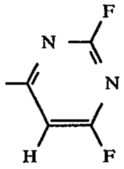 | Red-violet |

-continued
| | Diazo component | Coupling component | Z | Colour shade |
|---|---|---|---|---|
| 54 | 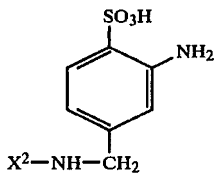 | " | " | Red |
| 55 | 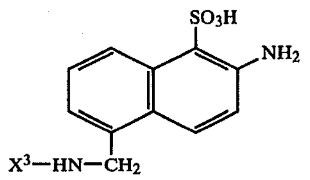 | " | " | Bluish-tinged red |
| 56 | 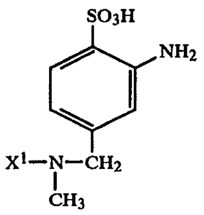 | 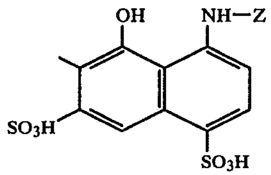 | 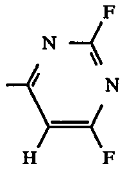 | Red |
| 57 | 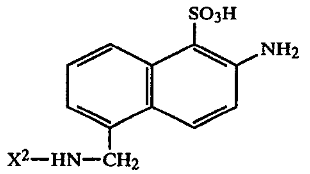 | " | " | Red |
| 58 | 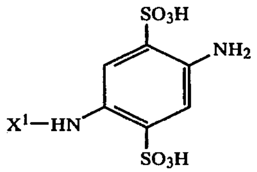 | " | " | Bluish-tinged red |

-continued
| | Diazo component | Coupling component | Z | Colour shade |
|---|---|---|---|---|
| 59 | 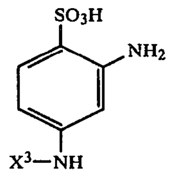 | 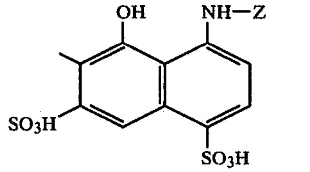 | 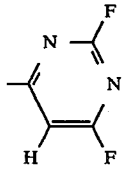 | Red |
| 60 | 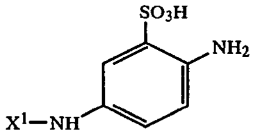 | 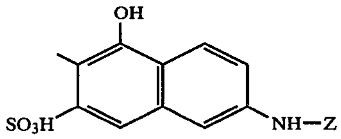 | " | Scarlet |
| 61 | 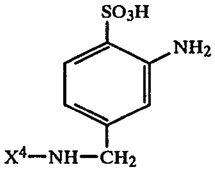 | " | " | Orange |
| 62 | 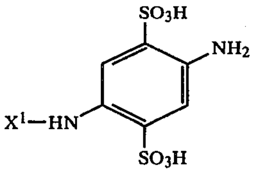 | 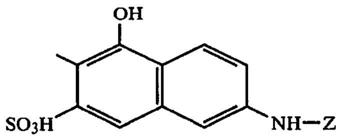 | 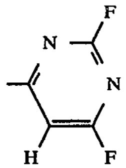 | Red |
| 63 | 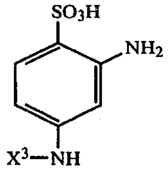 | 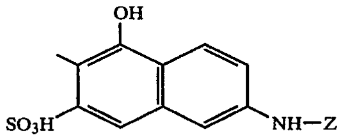 | " | Orange |

-continued
| | Diazo component | Coupling component | Z | Colour shade |
|---|---|---|---|---|
| 64 | 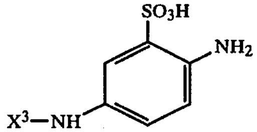 | 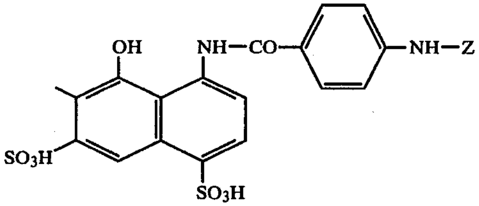 | 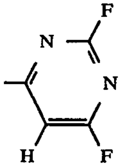 | Bluish-tinged red |
| 65 | 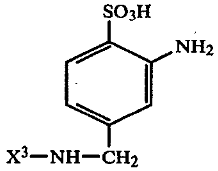 | " | " | Red |
| 66 | 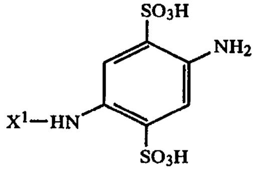 | 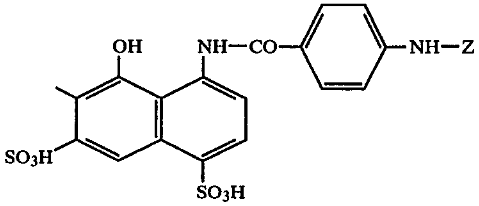 | 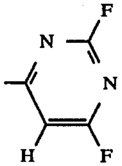 | Bluish-tinged red |
| 67 | 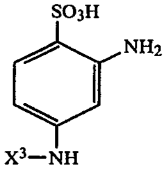 | 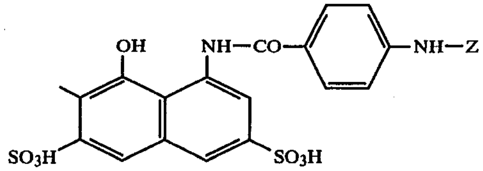 | " | Red |
| 68 | 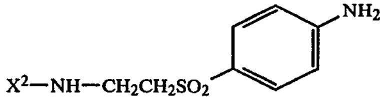 | 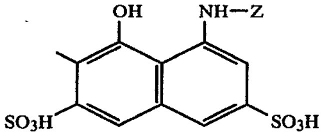 | " | Red |

EXAMPLE 69

0.2 mol of 1-amino-8-hydroxynaphthalene-3,6-disulphonic acid is dissolved in 650 ml of water at pH 6.5 with sodium hydroxide solution, and the solution is heated to 35° C. 0.21 mol of 2,3-dichloroquinoxaline-6-carbonyl chloride is added to this solution, the pH is brought to 6–7 with sodium carbonate solution and the condensation reaction is carried out at 35° C. for about 6 hours.

Coupling is then carried out with a 3-[4-(β-chloroethylsulphonyl-methyl)-benzoylamino]-aniline-4-sulphonic acid diazotisation mixture analogously to Example 1.

The dyestuff is salted out, isolated, dried and ground. It has the following formula

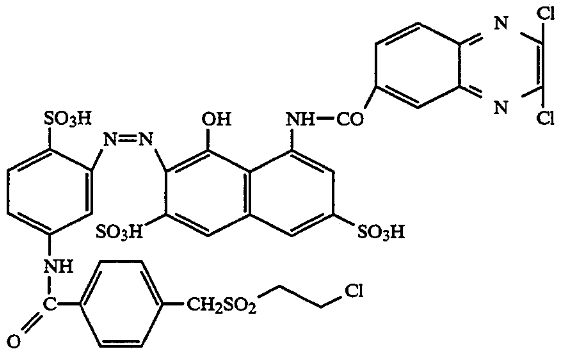

and dyes cotton in red shades.

As described above, the dyestuffs of Examples 70–80 of the formula

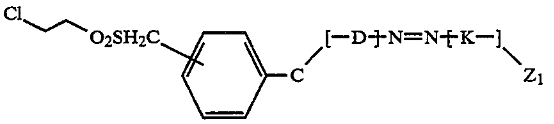

can be prepared using the diazo and coupling components (K) shown, wherein

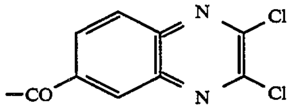

and $X = X^1$ to $X^4$ has the abovementioned meaning.

| Ex. | Diazo component | K | Colour shade |
|---|---|---|---|
| 70 | 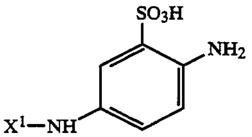 | 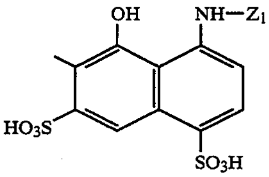 | bluish-tinged red |
| 71 | 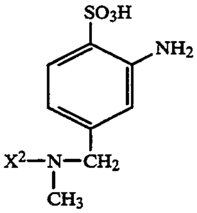 | " | red |
| 72 | 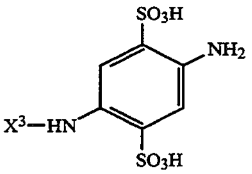 | " | bluish-tinged red |
| 73 | 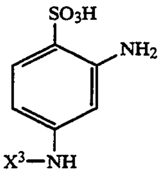 | " | red |

-continued

| Ex. | Diazo component | K | Colour shade |
|---|---|---|---|
| 74 | 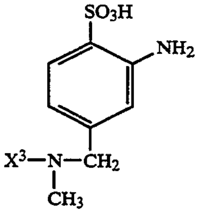 | 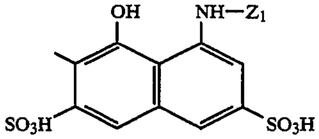 | red |
| 75 | 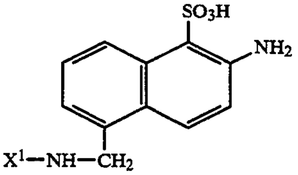 | 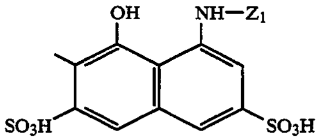 | bluish-tinged red |
| 76 | 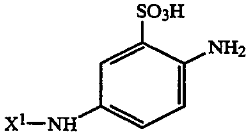 | 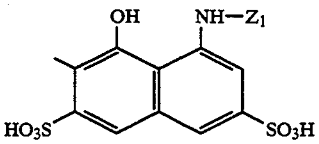 | red-violet |
| 77 | 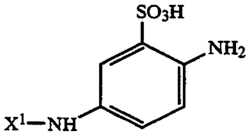 | 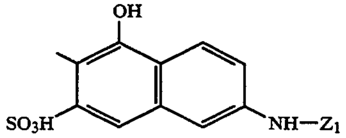 | scarlet |
| 78 | 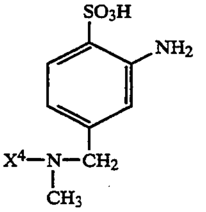 | " | orange |
| 79 | 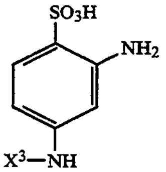 | " | orange |
| 80 | 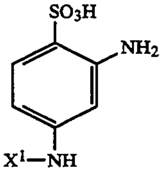 | 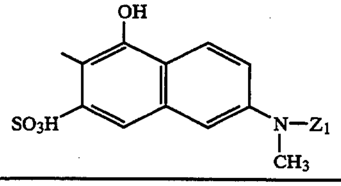 | orange |

EXAMPLE 81

0.26 mol of 3-(2-sulphatoethyl)sulphonyl-aniline is dissolved in 250 ml of water with 1 molar sodium bicarbonate solution to give a neutral solution. 250 g of ice are added, and 0.27 mol of cyanuric fluoride is added dropwise. A pH of 4–5 is maintained with 1 molar sodium bicarbonate solution.

The mixture is subsequently stirred for 10 minutes.

0.2 mol of 8-(4'-amino-benzoylamino)-1-naphthol-3,6-disulphonic acid is stirred in 300 ml of water, and dissolved with 11% strength lithium hydroxide solution to give a neutral solution. This solution is added to the above condensation solution. A pH of 6.5–7 is maintained with sodium carbonate solution, and the temperature rises to about 10° C. When the reaction has ended, 0.2 mol of the diazonium salt from Example 1 is added, and a pH of 7.5–8 is maintained at the same time by dropwise addition of sodium carbonate solution (20 g/100 ml). After 3 hours, the dyestuff is salted out with NaCl, isolated and dried. The resulting dyestuff of the formula

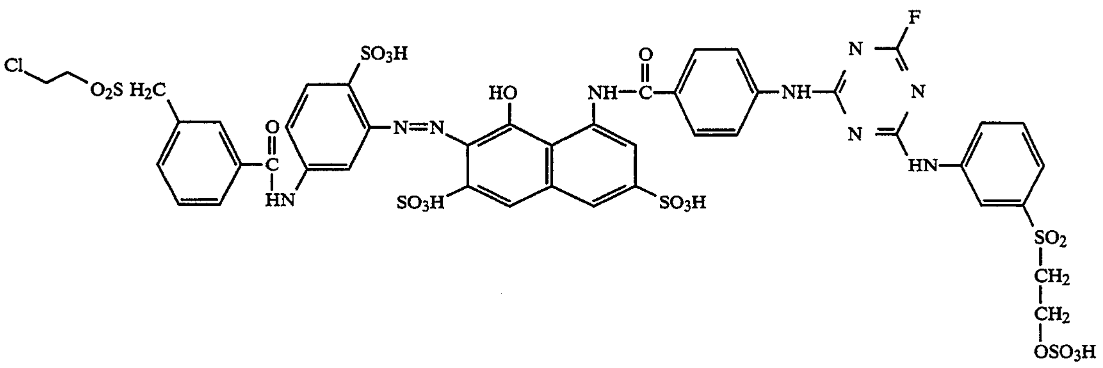
dyes cotton in red shades.
The dyestuff of Examples 81–90 are obtained analogously using the corresponding diazo components, coupling components and amines. They have the general formula
$$X-D-N=N-K-Z$$
wherein $X=X^1$ to $X^4$ with the abovementioned meaning.

| Ex. | Diazo component | Coupling component | Z | Colour shade |
|---|---|---|---|---|
| 81a | 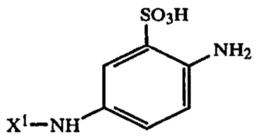 | 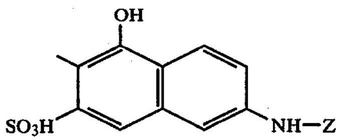 | 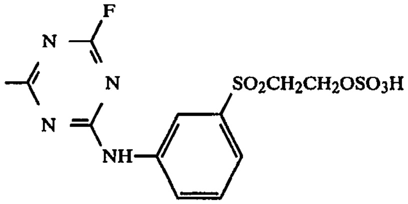 | Scarlet |
| 82 | 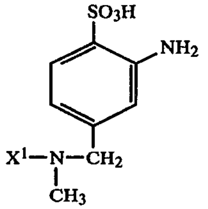 | " | " | Orange |
| 83 | 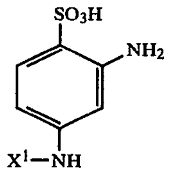 | 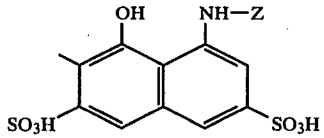 | 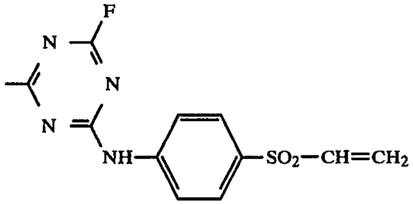 | Red $\lambda_{max}$ = 515 nm, SH 535 nm |
| 84 | 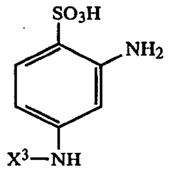 | 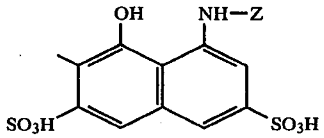 | 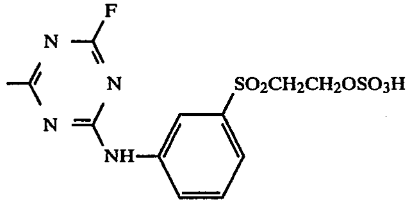 | Red |

-continued
| Ex. | Diazo component | Coupling component | Z | Colour shade |
|---|---|---|---|---|
| 85 | 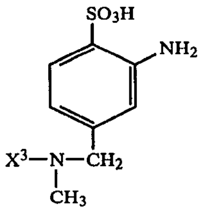 | " | " | Red |
| 86 | 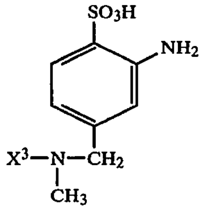 | 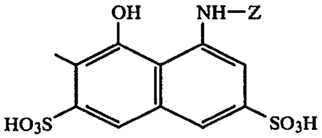 | 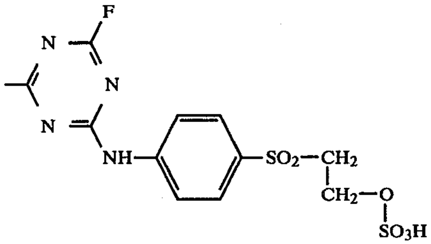 | Red |
| 87 | 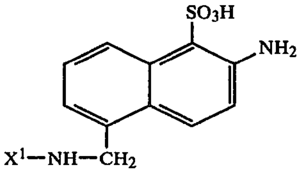 | 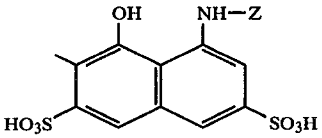 | 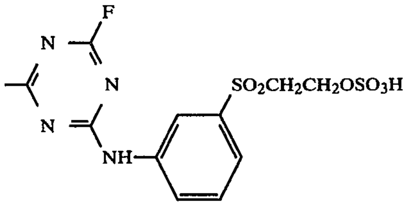 | Red |
| 88 | 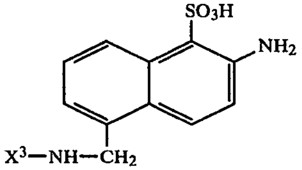 | " | 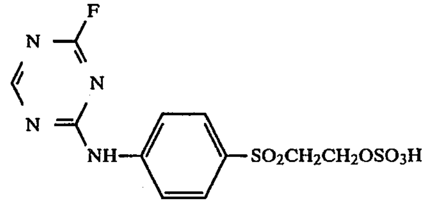 | Bluish-tinged red |

-continued
| Ex. | Diazo component | Coupling component | Z | Colour shade |
|---|---|---|---|---|
| 89 | 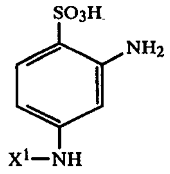 | 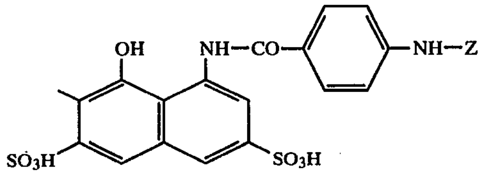 | " | Red |
| 90 | 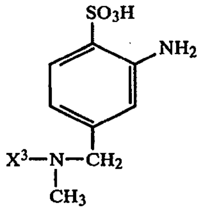 | 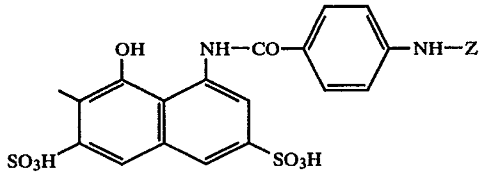 | 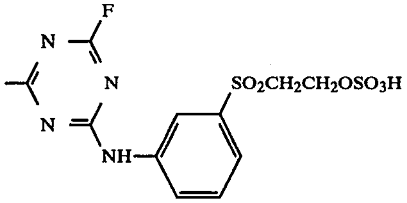 | Red |

EXAMPLE 91 a) 0.2 mol of 2-amino-4-(aminomethyl)-benzenesulphonic acid is dissolved in 500 ml of water at a pH of 8 with concentrated sodium hydroxide solution. 0.25 mol of 3-(β-chloroethylsulphonyl-methyl)benzoyl chloride is added. A pH of 7–7.5 is maintained by simultaneous addition of 11% strength lithium hydroxide solution. The temperature is 30° C.–40° C. The mixture is cooled to 0° C. and 56 ml of 30% strength hydrochloric acid are added.

47 ml of sodium nitrite solution (30 g/100 ml) are added dropwise at 0°–5° C. in the course of 1 hour. The diazotisation mixture is subsequently stirred at 0°–5° C. for 1 hour. Excess nitrite is then destroyed by addition of amidosulphonic acid.

b) 0.2 mol of 1-amino-8-hydroxynaphthalene-4,6-disulphonic acid is dissolved in 300 ml of water at pH=5–7 by addition of concentrated sodium hydroxide solution. 300 g of ice are added, and 0.21 mol of cyanuric chloride is sprinkled in. A pH of 4–4.5 is maintained at 0° C. with sodium carbonate solution (20 g/100 ml). When the condensation has ended, 0.2 mol of a neutral solution of 4-chloroaniline in about 200 ml of water is added. The mixture is heated up to 20°–30° C. and the pH is maintained at 6–7 with sodium carbonate solution (20 g/100 ml). After about 1 hour, the mixture is cooled to 10° C., and the above diazotisation mixture a) is added.

At the same time, a pH of 7–7.5 is maintained with sodium carbonate solution (20 g/100 ml).

When the coupling has ended, the dyestuff is salted out with NaCl, isolated and dried. The resulting dyestuff of the formula

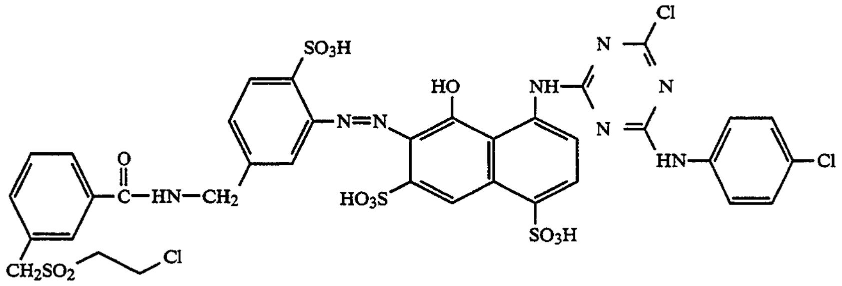

dyes cotton in red shades.

The dyestuffs of the following Examples 92–111 of the general formula $$X \text{+} D \text{+} N{=}N \text{+} K \text{+} Z$$

are obtained by varying the diazo components, coupling components and amines. They dye cotton in the shades shown.

$X^1$ and $X^3$ have the abovementioned meaning.

| Ex. | Diazo component | Coupling component | Z | Colour shade |
|---|---|---|---|---|
| 92 | 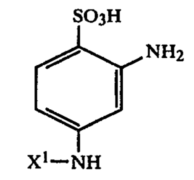 | 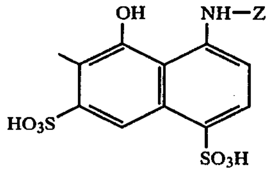 | 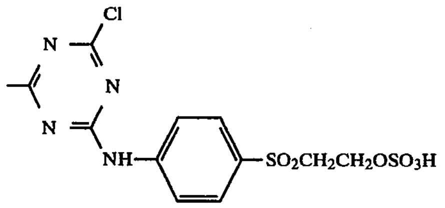 | Yellowish-tinged red |
| 93 | 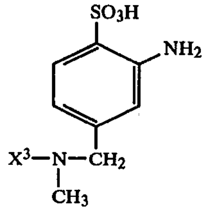 | 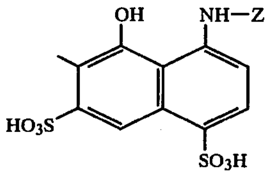 | 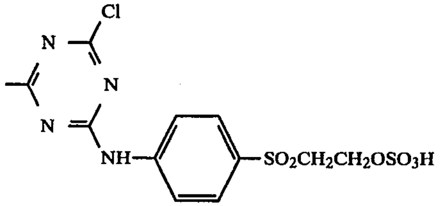 | Yellowish-tinged red |
| 94 | 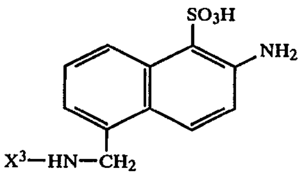 | 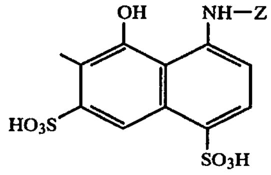 | 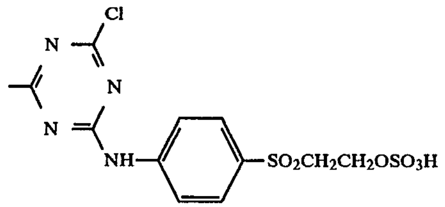 | Red |
| 95 | 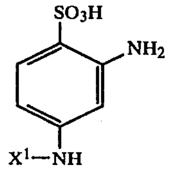 | 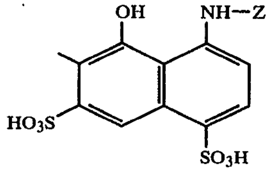 | 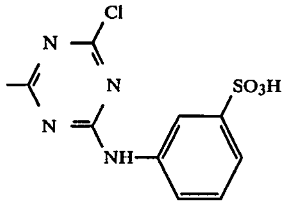 | Yellowish-tinged red |

-continued
| Ex. | Diazo component | Coupling component | Z | Colour shade |
|---|---|---|---|---|
| 96 | 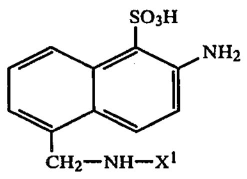 | 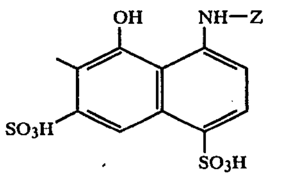 | 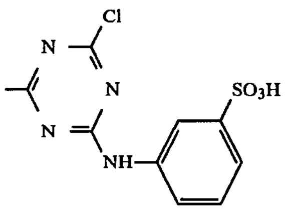 | Red |
| 97 | 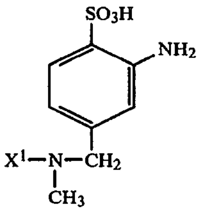 | " | 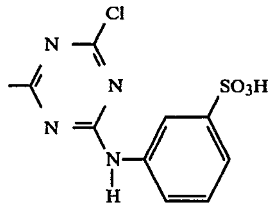 | Yellowish-tinged red |
| 98 | 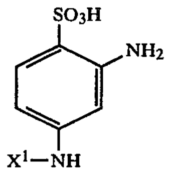 | 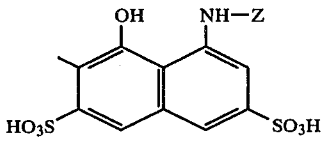 | 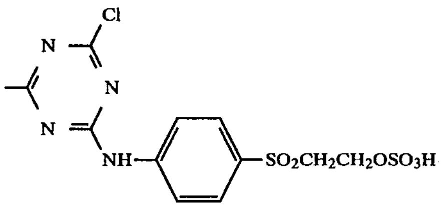 | Red |
| 99 | 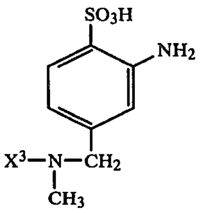 | 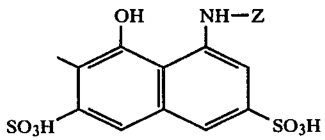 | " | Red |

-continued
| Ex. | Diazo component | Coupling component | Z | Colour shade |
| --- | --- | --- | --- | --- |
| 100 | 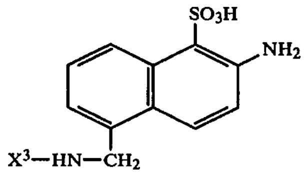 | " | 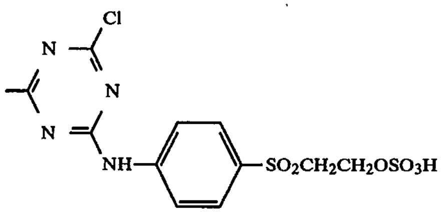 | Bluish-tinged red |
| 101 | 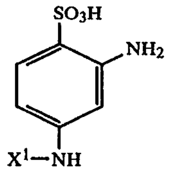 | 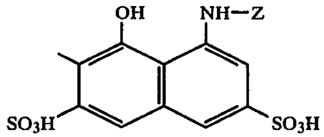 | 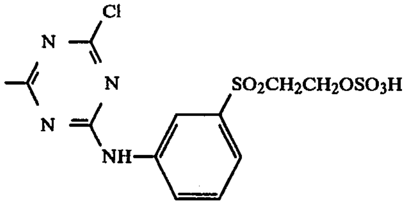 | Red |
| 102 | 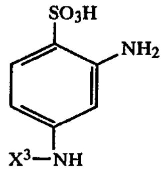 | 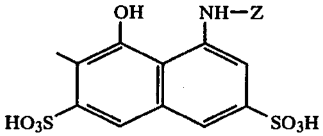 | 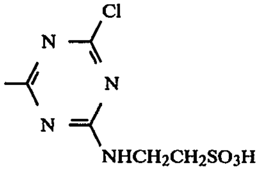 | Red |
| 103 | 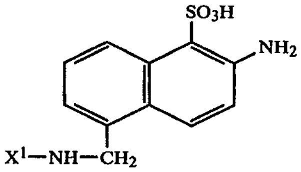 | " | 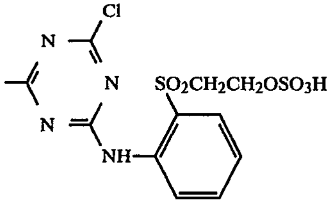 | Red |

-continued
| Ex. | Diazo component | Coupling component | Z | Colour shade |
|---|---|---|---|---|
| 104 | 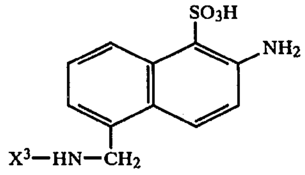 | 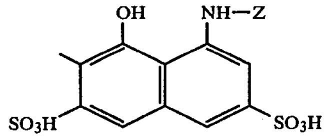 | 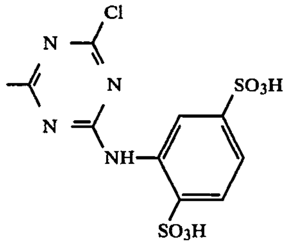 | Bluish-tinged red |
| 105 | 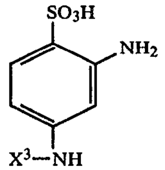 | 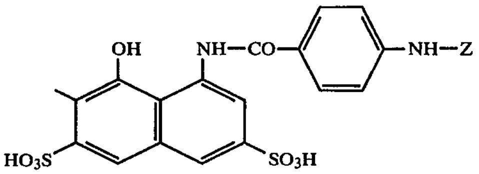 | 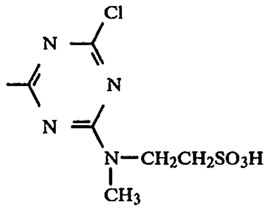 | Red |
| 106 | 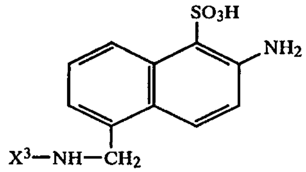 | " | 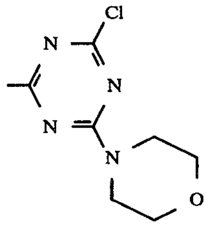 | Red |
| 107 | 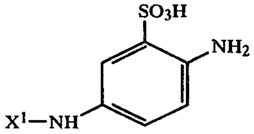 | 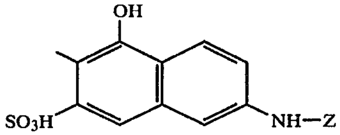 | 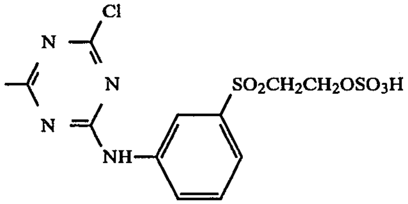 | Scarlet |

-continued
| Ex. | Diazo component | Coupling component | Z | Colour shade |
|---|---|---|---|---|
| 108 | 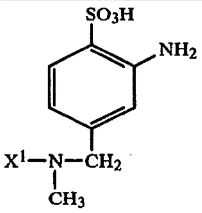 | " | " | Orange |
| 109 | 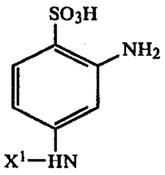 | " | 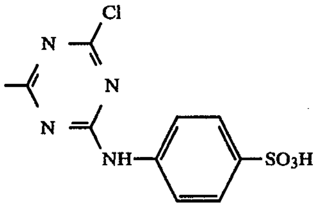 | Orange |
| 110 | 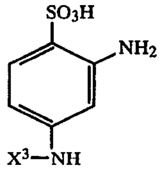 | 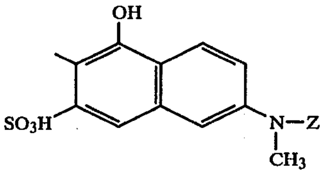 | 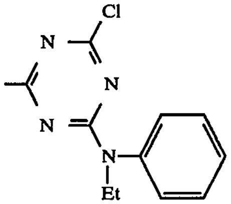 | Orange |
| 111 | 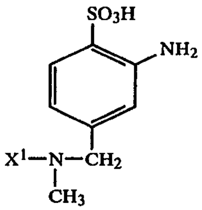 | " | 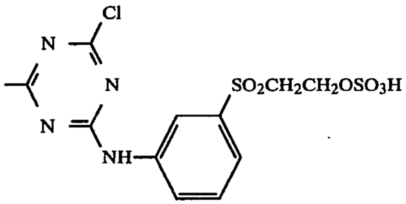 | Orange |

EXAMPLE 112

0.2 mol of 2-aminonaphthalenesulphonic acid is dissolved in 280 ml of water at pH 7 with lithium hydroxide, and 250 g of ice are added. 0.21 mol of cyanuric fluoride is then added, and the pH is kept at about 4 with sodium carbonate solution. A neutral solution of 2,4-diaminobenzenesulphonic acid is added to the suspension thus formed, and the pH is raised to 7–7.5. The reaction temperature is raised to 20° C., and the mixture is stirred for about 1 hour. The reaction mixture is cooled to 0° C., and diazotisation is carried out with HCl and sodium nitrite solution at pH 2–2.2. After the excess nitrite has been destroyed with amidosulphonic acid, the product is coupled to. 1-[4'-(β-chloroethylsulphonyl-methyl)benzoylamino]-8-naphthol-3,6-disulphonic acid, prepared from 4-(β-chloroethylsulphonyl-methyl)-benzoyl chloride and 1-amino-8-hydroxynaphthalene-3,6-disulphonic acid, at pH 5–6 and 10°–15° C. Salting out, isolation and drying give the dyestuff of the formula

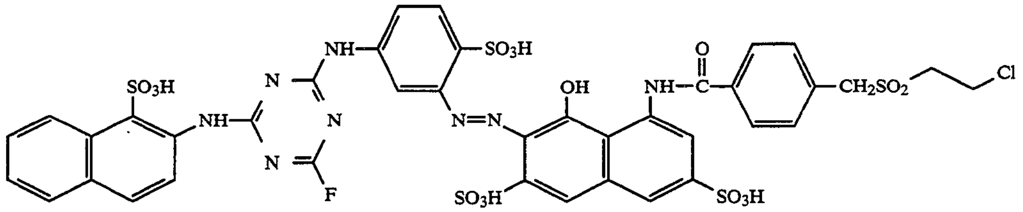

which dyes cotton in red shades.

The dyestuffs of Examples 113–124 of the general formula $$Z{+}D{+}N{=}N{+}K{+}X$$

where $X^1$ and $X^3$ have the abovementioned meaning, can be prepared in an analogous manner using the diazo and coupling components shown.

In some cases, however, it is more favourable first to synthesise the azo chromophore and then to condense on the reactive components or one of them (Z). They dye cotton in the colour shades shown.

| Ex. | Diazo component | Coupling component | Z | Colour shade |
| --- | --- | --- | --- | --- |
| 113 | 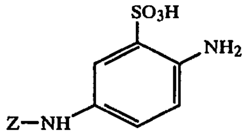 | 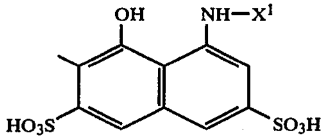 | 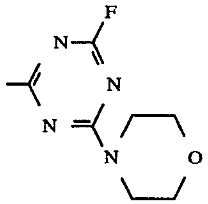 | Red-violet |
| 114 | 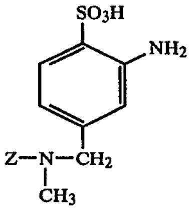 | " | " | Red |
| 115 | 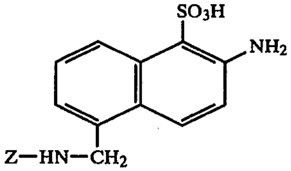 | " | 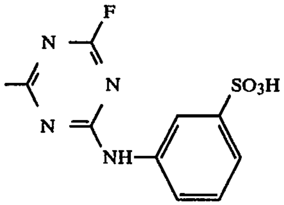 | Bluish-tinged red |
| 116 | 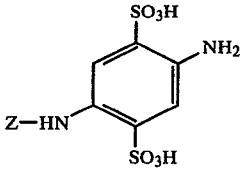 | 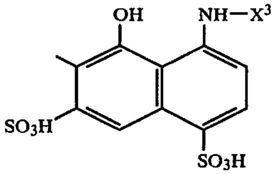 | 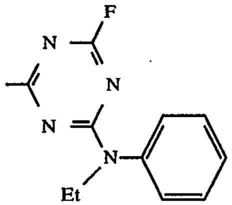 | Bluish-tinged red |
| 117 | 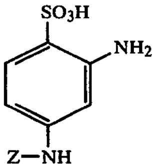 | 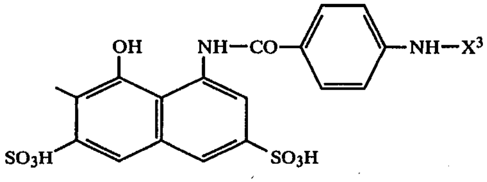 | " | Red |

-continued
| Ex. | Diazo component | Coupling component | Z | Colour shade |
|---|---|---|---|---|
| 118 | 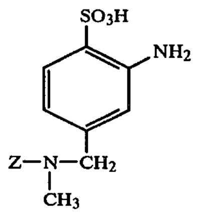 | " | 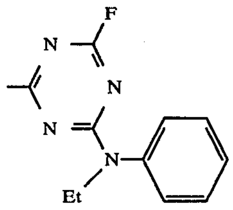 | Red |
| 119 | 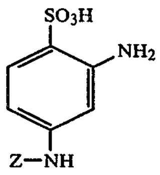 | 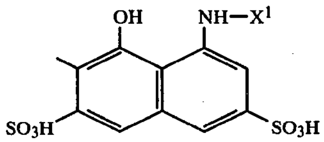 | 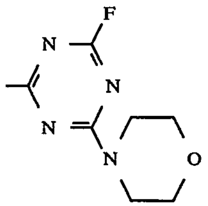 | Red |
| 120 | 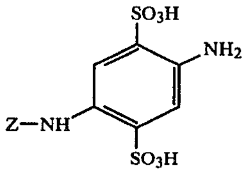 | 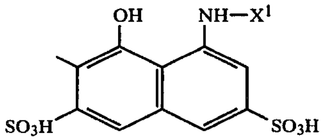 | 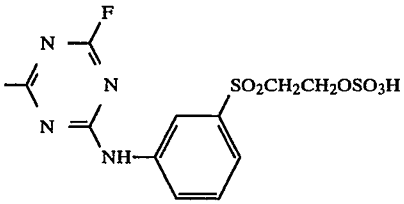 | Red-violet |
| 121 | 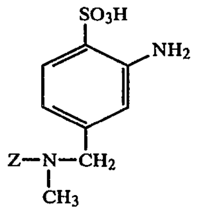 | " | | Red |

-continued
| Ex. | Diazo component | Coupling component | Z | Colour shade |
|---|---|---|---|---|
| 122 | 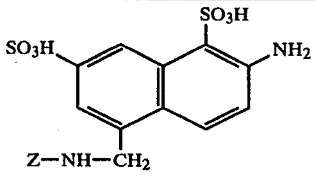 | 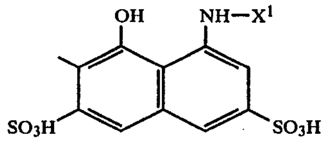 | 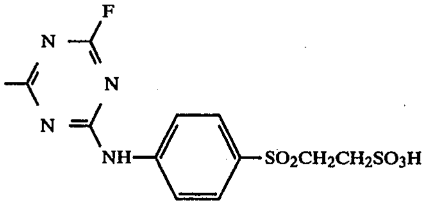 | Bluish-tinged red |
| 123 | 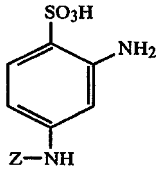 | 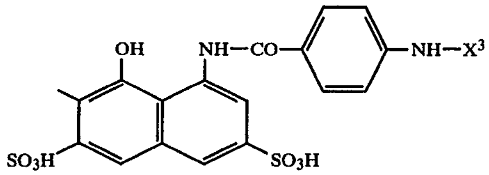 | " | Red |
| 124 | 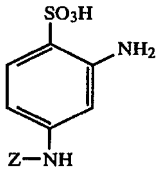 | 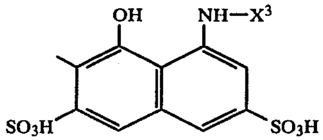 | 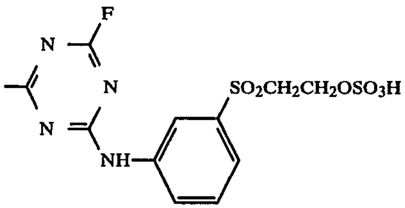 | Red |

EXAMPLE 125

0.22 mol of N-ethylaniline is dissolved in 200 ml of water at pH 7. 200 g of ice are added, and 0.24 mol of cyanuric chloride is sprinkled in. A pH of 6–7 is maintained with sodium carbonate solution (20 g/100 ml). The condensation has ended after about 1 hour at 0° C. 0.2 mol of 2,4-diamino-benzenesulphonic acid is dissolved in 250 ml of water by addition of concentrated sodium hydroxide solution, and the solution is added to the first stage of the condensation. A pH of 6–7 is maintained with sodium carbonate solution (20 g/100 ml). The mixture is heated up to 25°–35° C. When the condensation has ended, the mixture is cooled to 0° C. 56 ml of 30% strength hydrochloric acid are added. 47 ml of sodium nitrite solution (30 g/100 ml) are added dropwise, and the mixture is stirred at 0° C. for 1 hour. The sodium nitrite is destroyed with amidosulphonic acid, and the diazotisation mixture thus obtained is added to the coupling component from Example 112. A pH of 7–8 is maintained with sodium carbonate solution (20 g/100 ml). The temperature is 10°–15° C. When the coupling has ended, the dyestuff is salted out with NaCl, isolated and dried. The resulting dyestuff of the formula

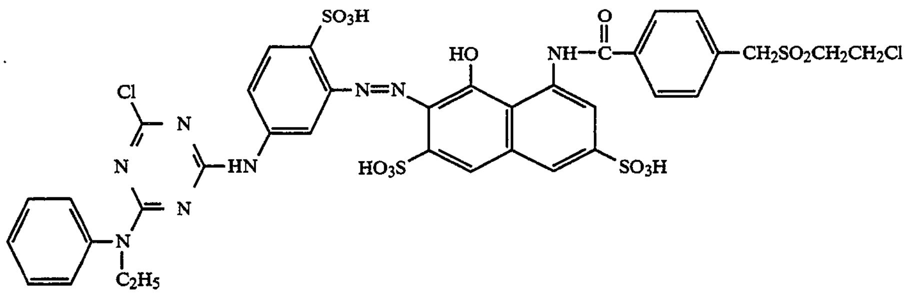

dyes cotton in red shades.

The dyestuffs of Examples 126–131 of the general formula $$Z \text{-}[D]\text{-} N{=}N \text{-}[K]\text{-} X,$$

wherein $X = X^1$ or $X^3$, with the abovementioned meaning, can be prepared analogously, using the corresponding diazo and coupling components and amines. In some cases, it is more advantageous to carry out the condensation with cyanuric chloride and the amine at the end of the synthesis sequence.

| Ex. | Diazo component | Coupling component | Z | Colour shade |
|---|---|---|---|---|
| 126 | 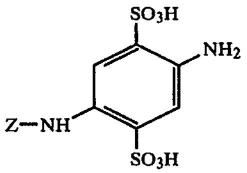 | 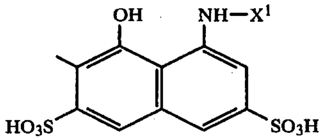 | 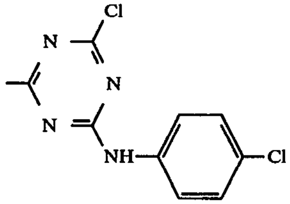 | Red-violet |
| 127 | 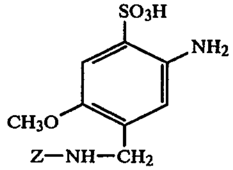 | " | 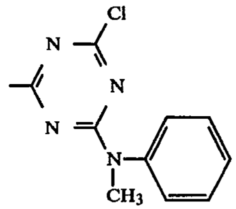 | Bluish-tinged red |
| 128 | 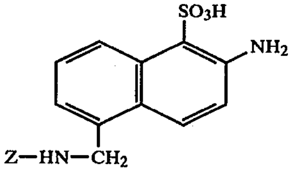 | " | 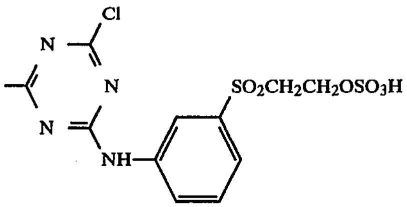 | Bluish-tinged red |
| 129 | 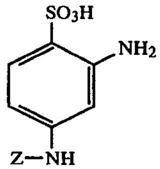 | 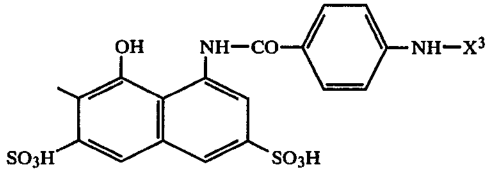 | 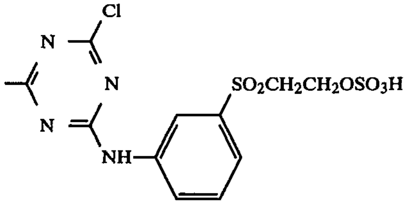 | Red |

-continued
| Ex. | Diazo component | Coupling component | Z | Colour shade |
| --- | --- | --- | --- | --- |
| 130 | 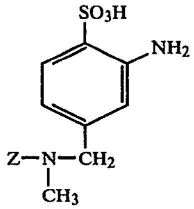 | " | 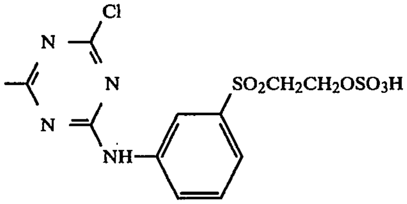 | Red |
| 131 | 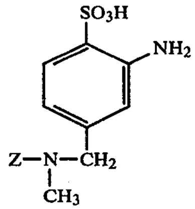 | 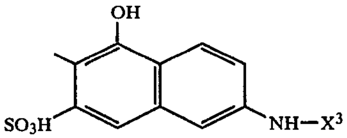 | 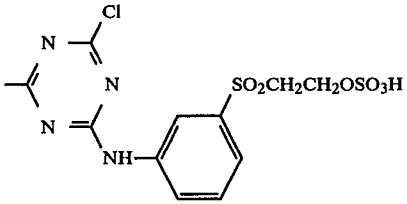 | Orange |

EXAMPLE 132

0.2 mol of 6-fluoro-5-chloro-4-(3'-amino-4'-sulphophenyl)-amino-pyrimidine (prepared from 2,4-diaminobenzenesulphonic acid and 4,6-difluoro-5-chloropyrimidine) are suspended in water, and 65 ml of 30% strength hydrochloric acid and 300 g of ice are added. 46 ml of 30% strength sodium nitrite solution are then added, and the mixture is stirred at 0° C. for 1 hour. Excess sodium nitrite is destroyed with amidosulphonic acid, and the diazotisation mixture thus obtained is added to the solution of the coupling component from Example 112. A pH of 7–8 is maintained with sodium carbonate solution (20 g/100 ml). The temperature is 10°–15° C. When the coupling has ended, the dyestuff is salted out with NaCl, isolated and dried. The resulting dyestuff of the formula

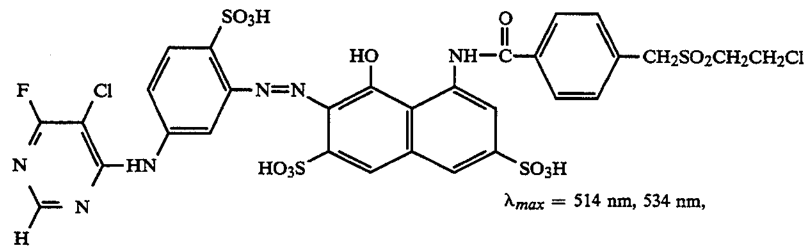

$\lambda_{max}$ = 514 nm, 534 nm, dyes cotton in red shades.

The dyestuffs of Examples 133–151 of the general formula $$Z+D+N=N+K+X,$$

wherein $X=X^1$ or $X^3$ with the abovementioned meaning, can be prepared analogously, using the corresponding diazo and coupling components and amines.

| Ex. | Diazo component | Coupling component | Z | Colour shade |
|---|---|---|---|---|
| 133 | 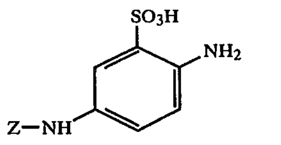 | 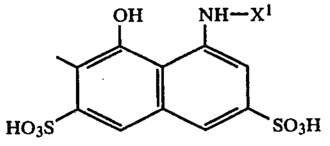 | 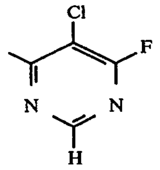 | Red-violet |
| 134 | 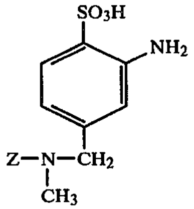 | " | " | Red |
| 135 | 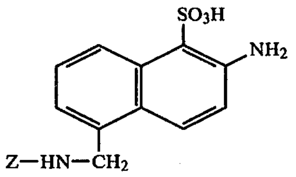 | 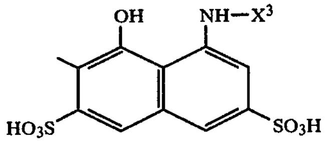 | " | Bluish-tinged red |
| 136 | 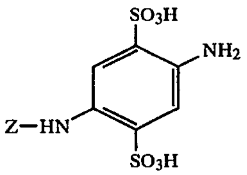 | 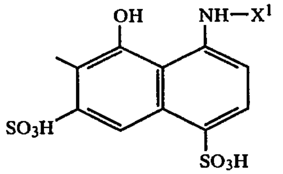 | 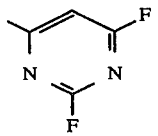 | Bluish-tinged red |
| 137 | 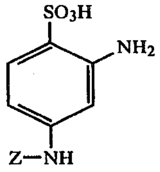 | 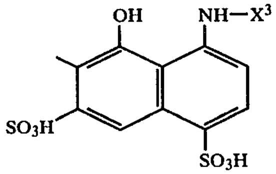 | " | Red |

-continued
| Ex. | Diazo component | Coupling component | Z | Colour shade |
| --- | --- | --- | --- | --- |
| 138 | 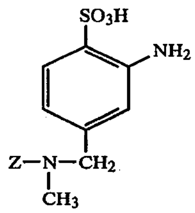 | ″ | 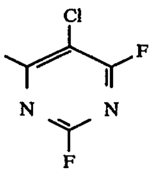 | Red |
| 139 | 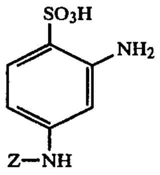 | 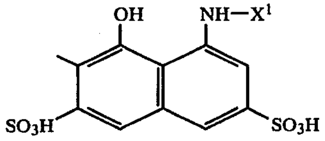 | 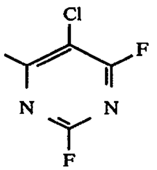 | Red |
| 140 | 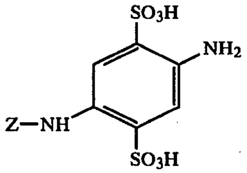 | 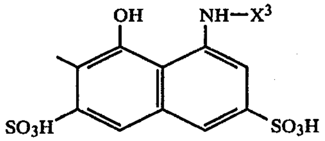 | ″ | Red-violet |
| 141 | 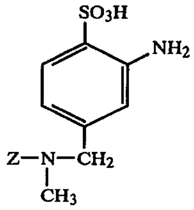 | ″ | ″ | Red |
| 142 | 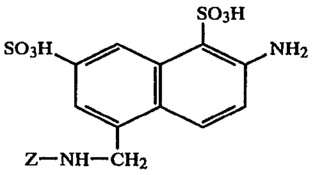 | 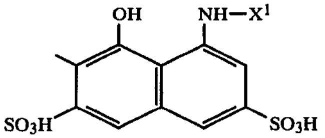 | 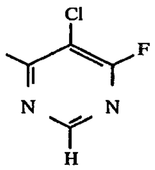 | Bluish-tinged red |

-continued
| Ex. | Diazo component | Coupling component | Z | Colour shade |
| --- | --- | --- | --- | --- |
| 143 | 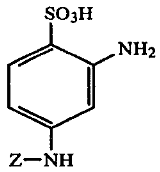 | 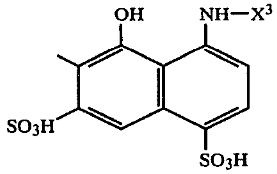 | " | Red |
| 144 | 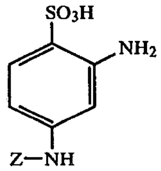 | 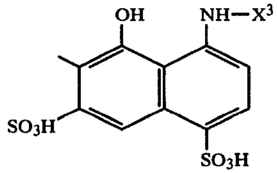 | " | Red |
| 146 | 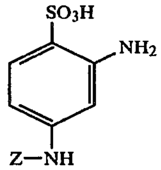 | 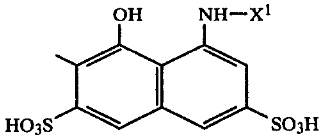 | 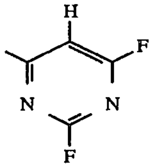 | Red-violet<br>$\lambda_{max}$ = 514 nm,<br>535 nm |
| 147 | 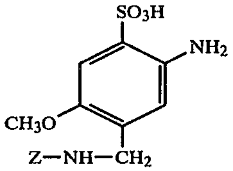 | " | " | Bluish-tinged red |
| 148 | 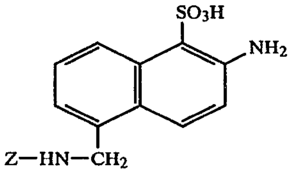 | 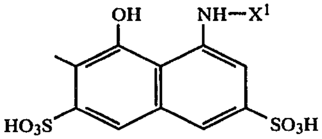 | 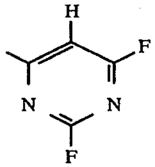 | Bluish-tinged red |

-continued
| Ex. | Diazo component | Coupling component | Z | Colour shade |
| --- | --- | --- | --- | --- |
| 149 | 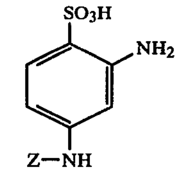 | 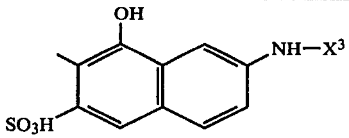 | 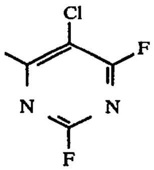 | Red |
| 150 | 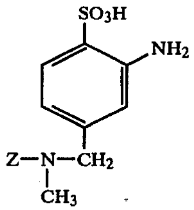 | 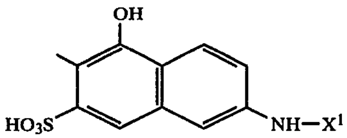 | 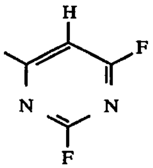 | Red |
| 151 | 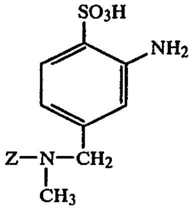 | 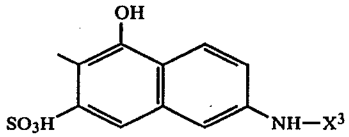 | 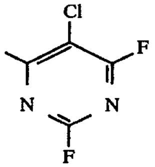 | Orange |

Other useful dyestuffs of the formulae
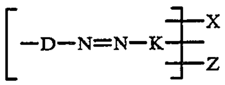
and
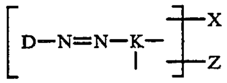
are those in Examples 152–163, which can be prepared by known methods, as described, for example, above, and dye cotton in the shades shown.

| Ex. | X | Diazo component | K | Z | Colour shade |
|---|---|---|---|---|---|
| 152 | 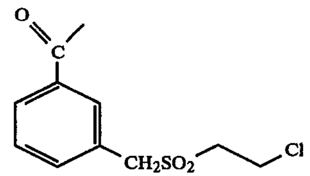 | 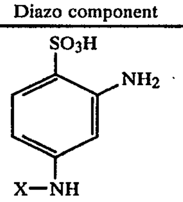 | 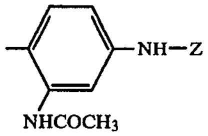 | 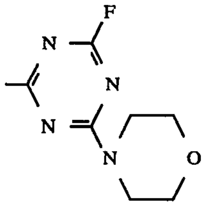 | Golden yellow |
| 153 | 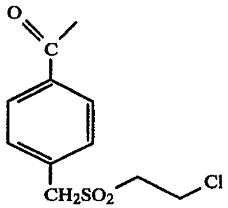 | 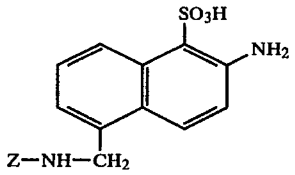 | 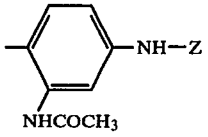 | 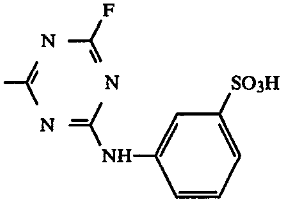 | Golden yellow |
| 154 | " | 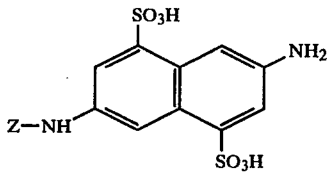 | 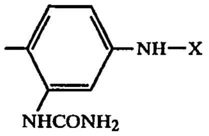 | 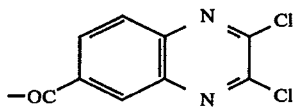 | Reddish-tinged yellow |
| 155 | 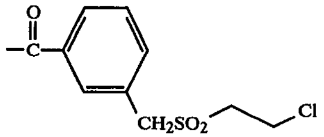 | 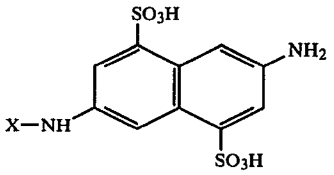 | 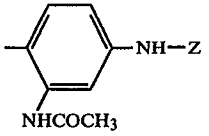 | 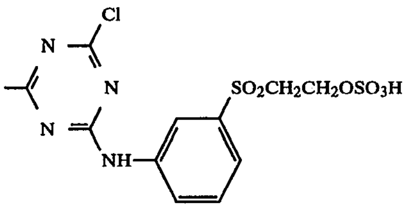 | Reddish-tinged yellow |
| 156 | " | " | 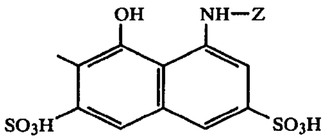 | 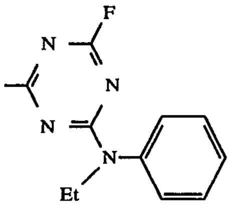 | Bluish-tinged red |

-continued
| Ex. | X | Diazo component | K | Z | Colour shade |
|---|---|---|---|---|---|
| 157 | 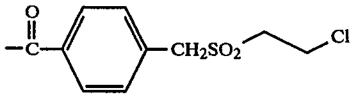 | 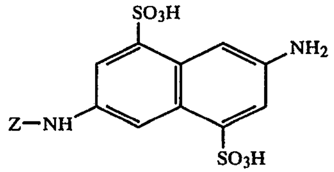 | 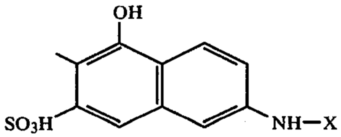 | 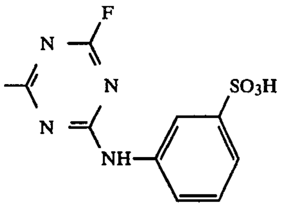 | |
| 158 | 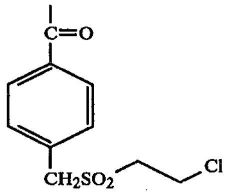 | 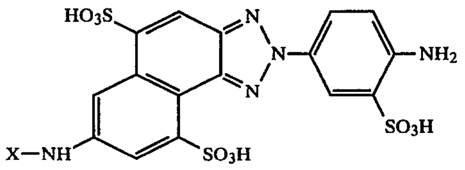 | 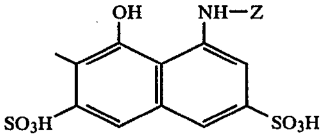 | 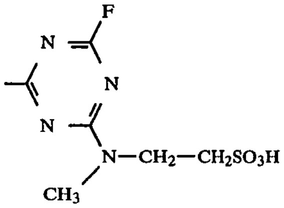 | Violet |
| 159 | " | " | 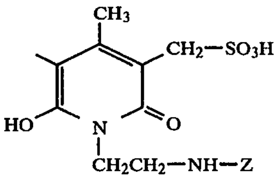 | " | Yellow |
| 160 | " | 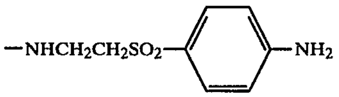 |  | " | Golden yellow |
| 161 | 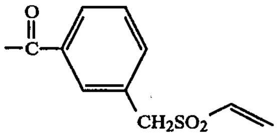 | 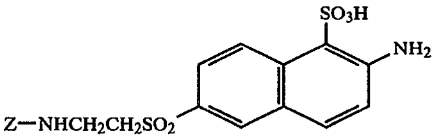 |  | 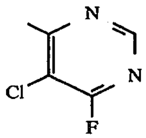 | Golden yellow |

-continued
| Ex. | X | Diazo component | K | Z | Colour shade |
| --- | --- | --- | --- | --- | --- |
| 162 | 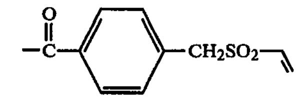 | 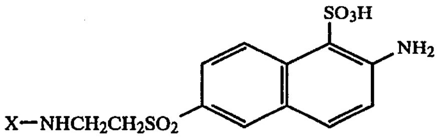 | 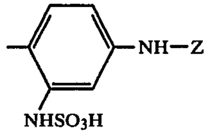 | 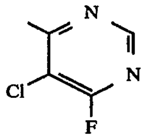 | Golden yellow |
| 163 | 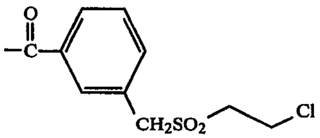 | 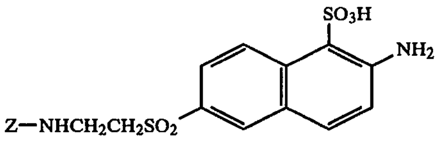 | 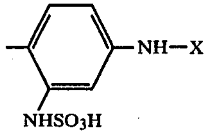 | 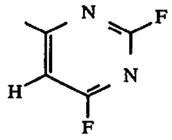 | Golden yellow |

The dyestuffs of Examples 164–189 can be obtained analogously to the preparation processes described above, or by customary processes, using the corresponding starting components.
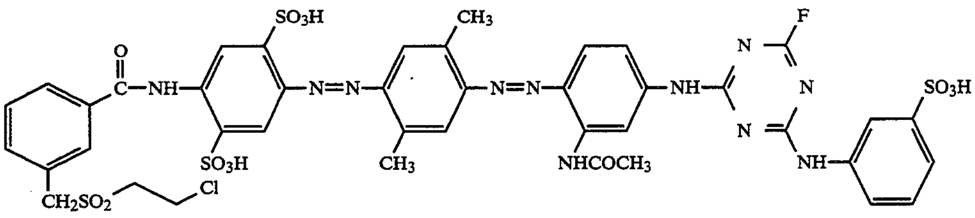
164
Yellow-brown
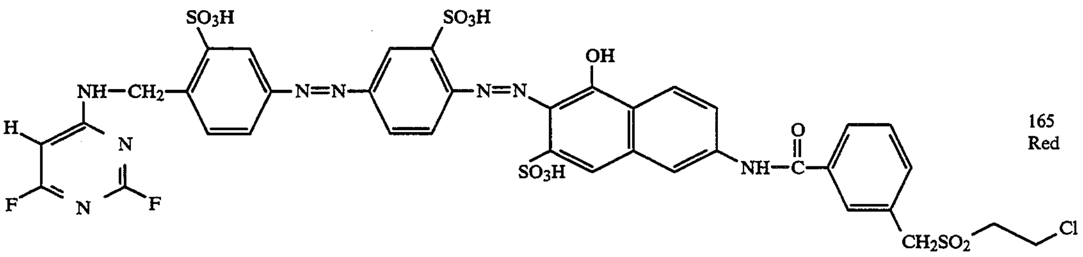
165
Red
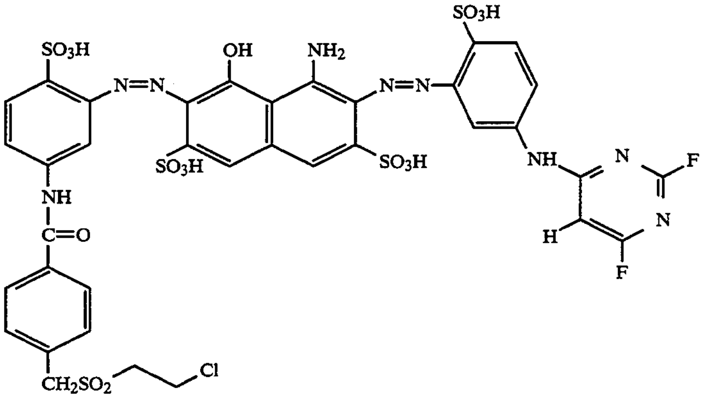
166
Navy blue
or black
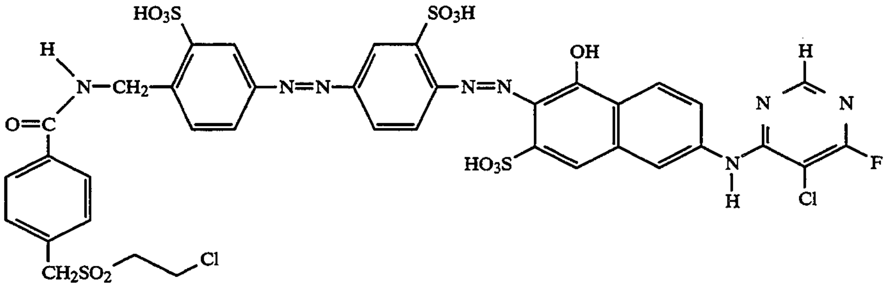
167
Red
168
Red
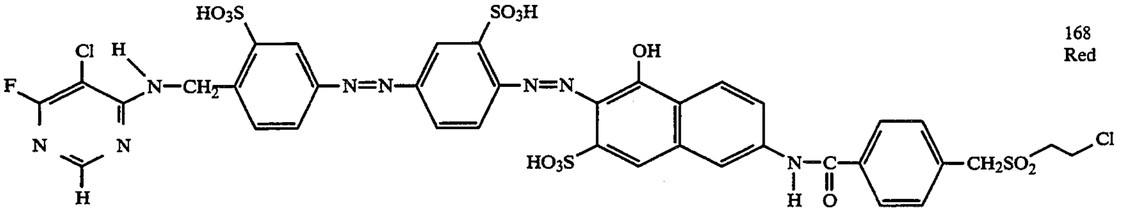

-continued
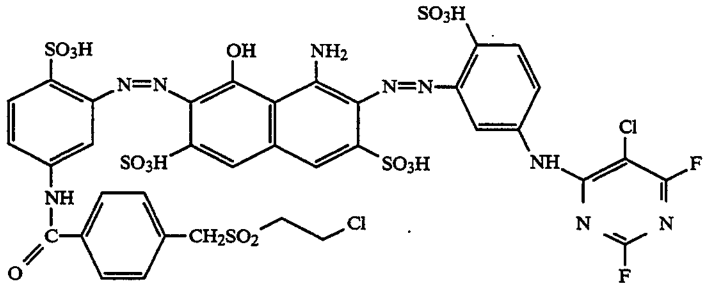
169
Navy blue
or black
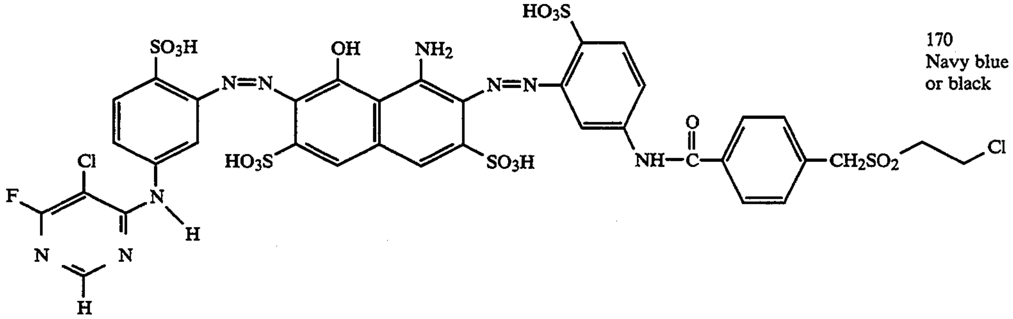
170
Navy blue
or black
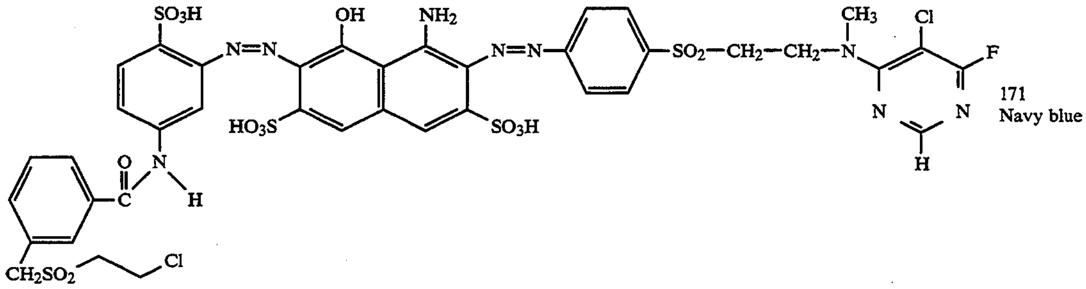
171
Navy blue
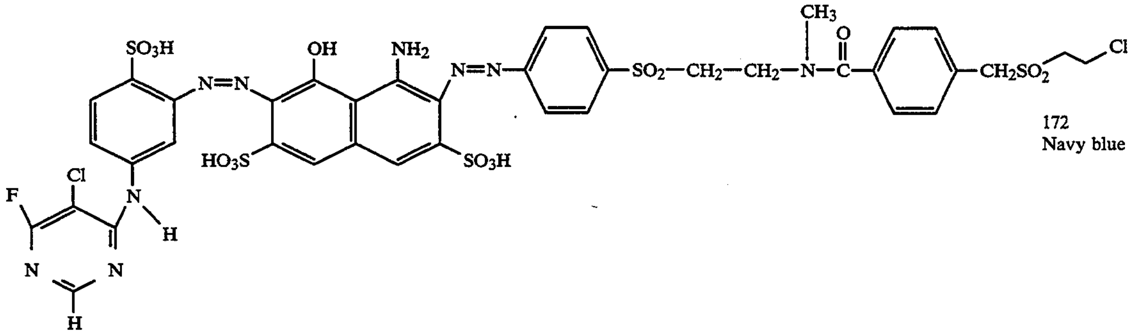
172
Navy blue
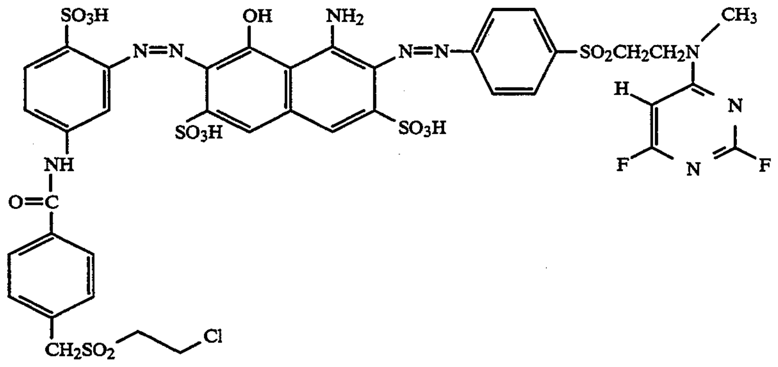
173
Navy blue -continued
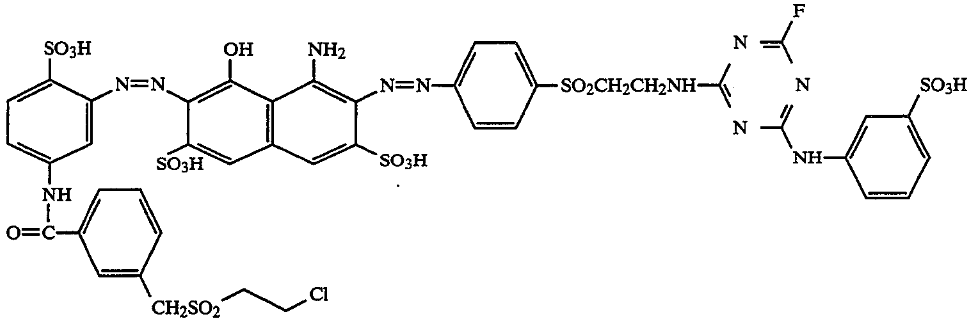
174
Navy blue
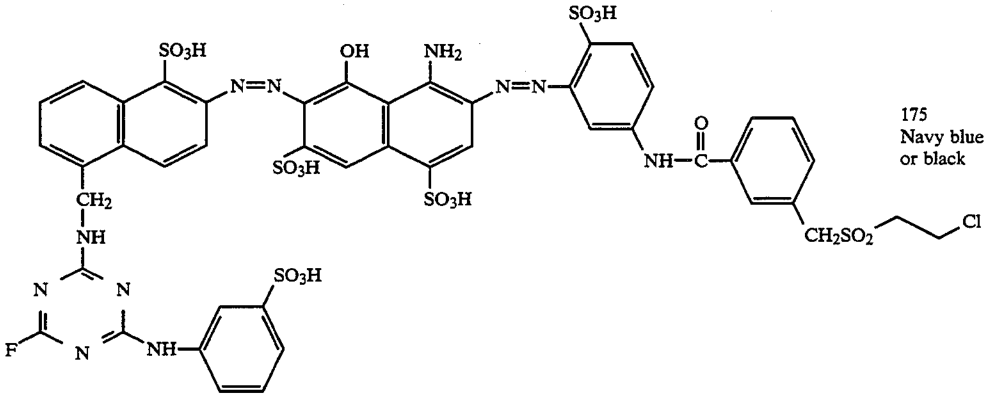
175
Navy blue
or black
176
Black
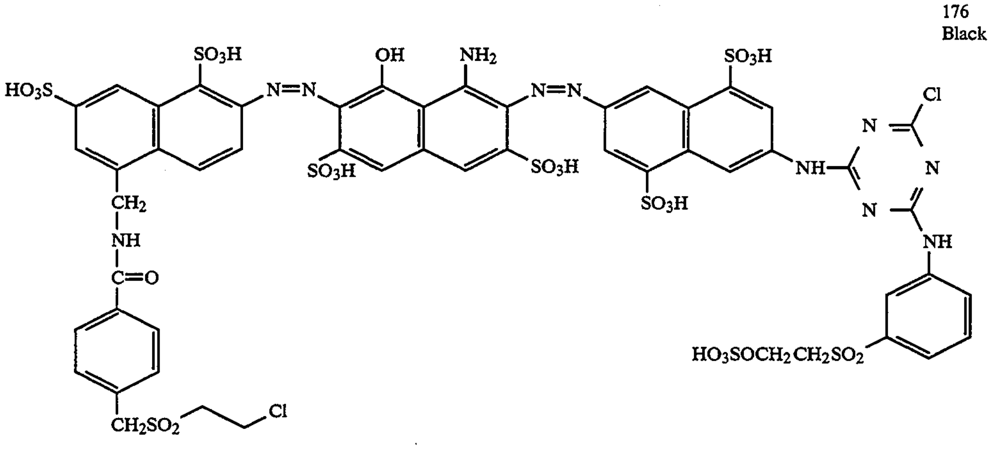
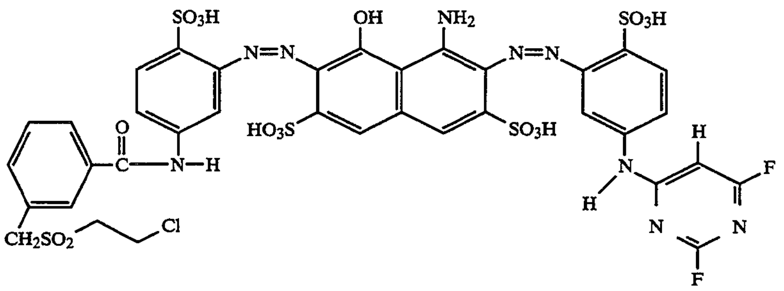
177
Navy blue
or black -continued
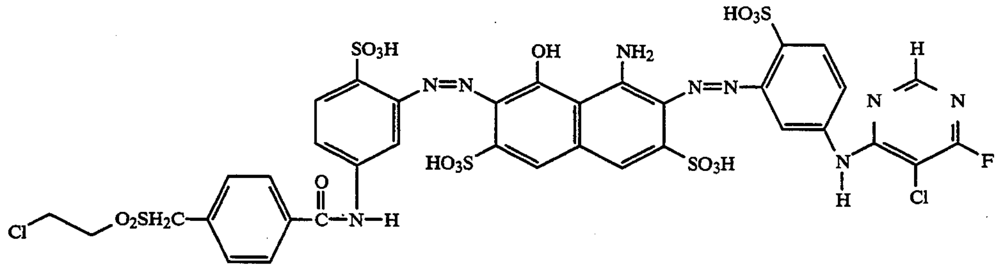
178
Navy blue
or black
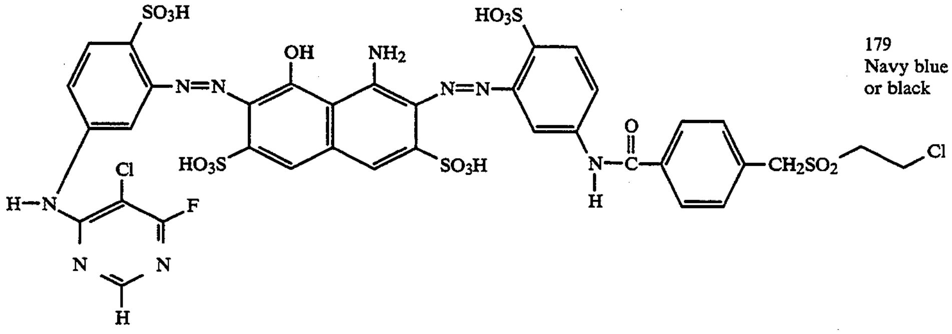
179
Navy blue
or black
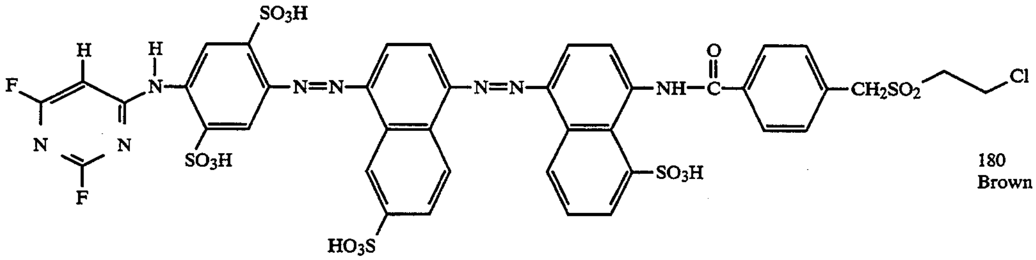
180
Brown
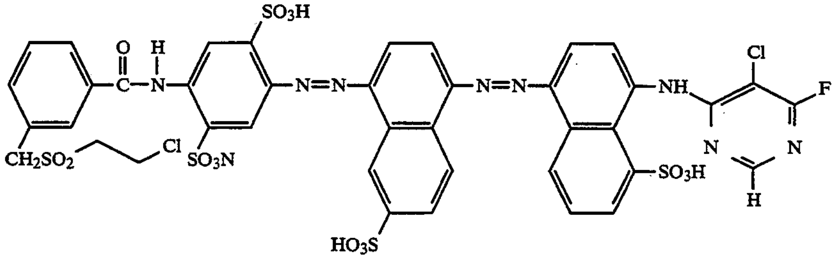
181
Brown
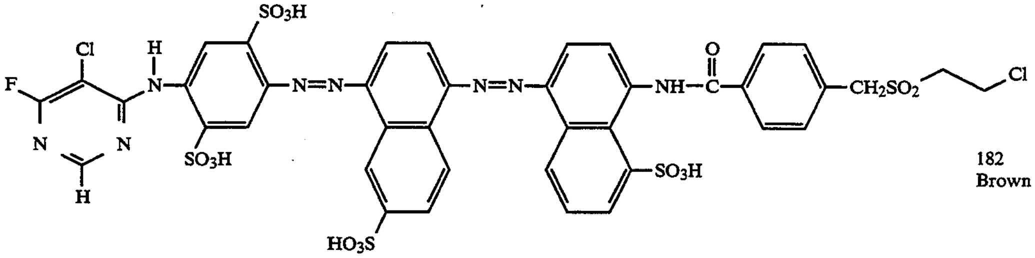
182
Brown
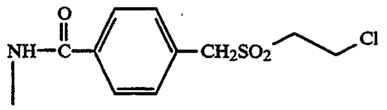

-continued
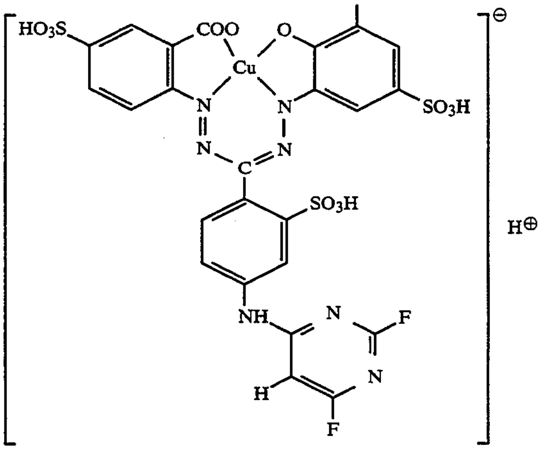
183
Blue
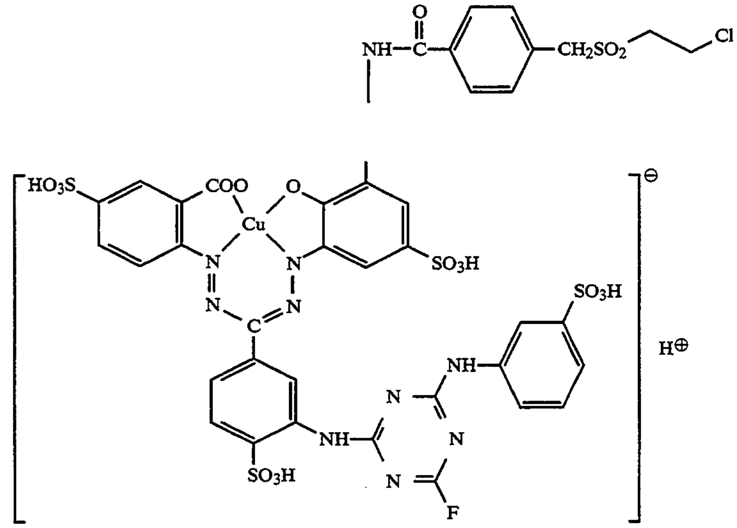
184
Blue
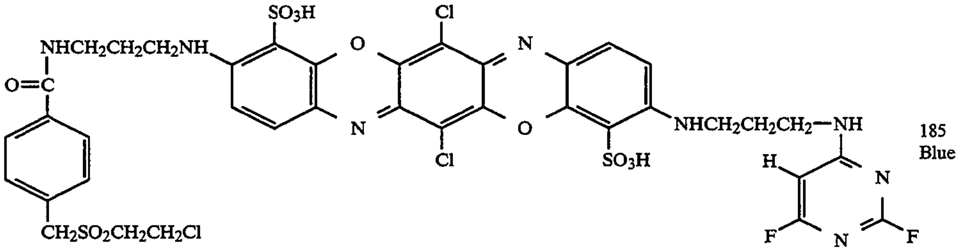
185
Blue
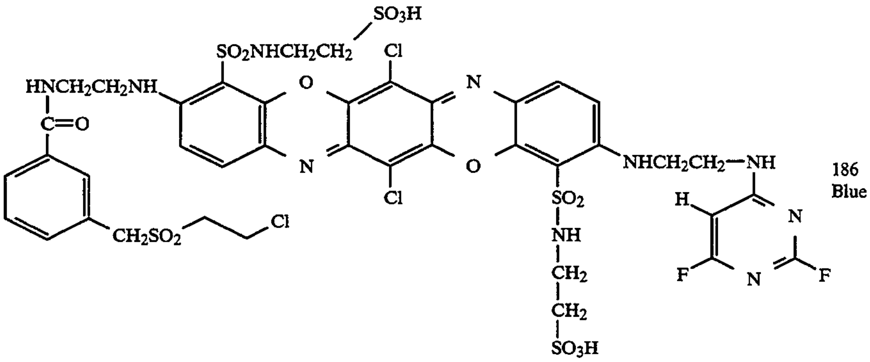
186
Blue -continued

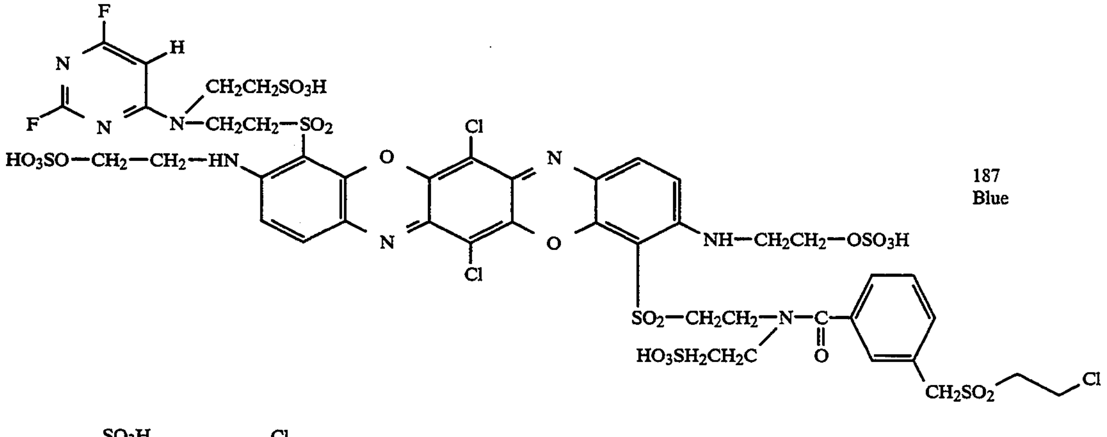

187
Blue

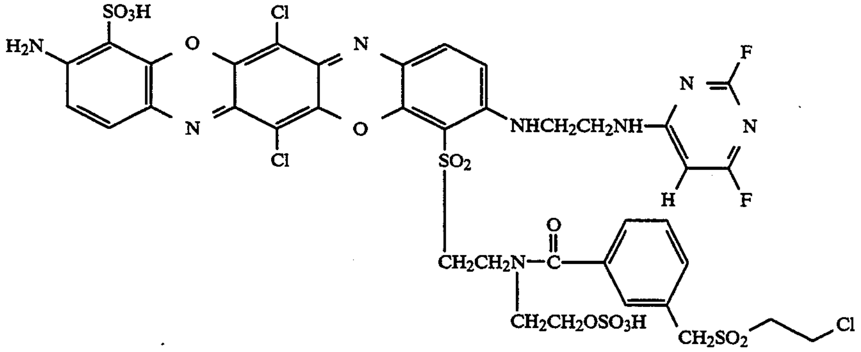

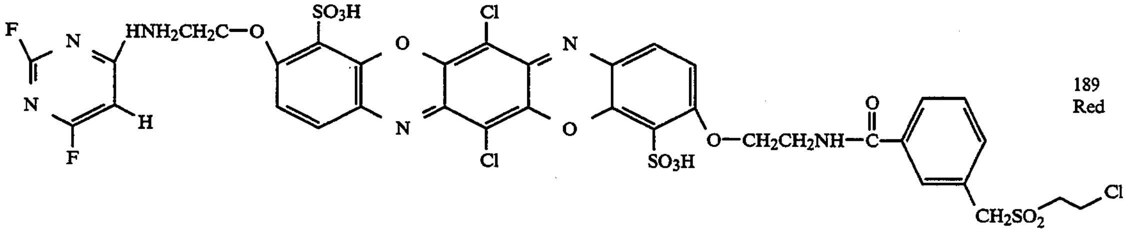

189
Red

We claim:

1. A reactive dyestuff of the formula

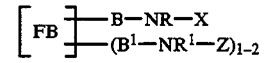

where X=

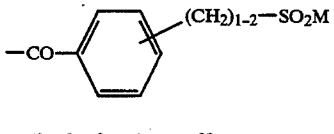

FB=the radical of a dyestuff,

B and $B^1$=identically or differently, a direct bond or a bridge member to a ring C atom of an aromatic-carbocyclic or to a ring C or N atom of an aromatic-heterocyclic ring in FB, M=CH=$CH_2$ or $CH_2CH_2$—V, wherein V=OH or a radical which can be eliminated under alkaline conditions, Z=a heterocyclic fibre-reactive radical without a further chromophoric part and R and $R^1$=independently of one another, H or substituted or unsubstituted $C_1$-$C_6$-alkyl.

2. A dyestuff of claim 1, in which FB is a mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrene-quinone or perylene-tetracarbimide radical.

3. Dyestuff of claim 1, wherein B and $B^1$ are a single bond and

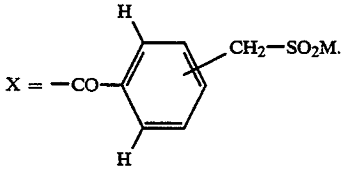

4. Dyestuff of claim 1, of the formula

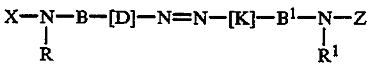

(1b)

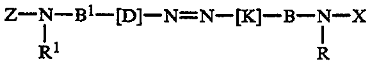

(1c)

-continued

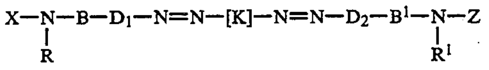

(1d)

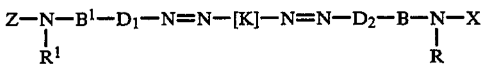

(1e)

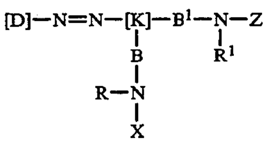

(1f)

wherein -X represents

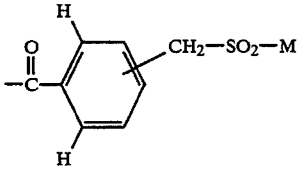

and

D, $D_1$ and $D_2$=independently of one another, the radical of a diazo component of the benzene or naphthalene series and K=the radical of a coupling component of the benzene, naphthalene, acetoacetic acid arylide or heterocyclic series, and in the formulae (1d) and (1e)=the radical of a coupling component with two coupling sites, and wherein M, B and $B^1$ have the meaning given in claim 1.

5. Dyestuff of claim 1, where

Z=a fibre-reactive fluorine-containing 4-pyrimidyl radical, or where Z=

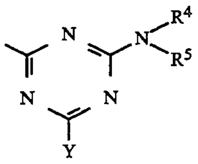

wherein $R^4$ and $R^5$ independently of one another denote hydrogen, $C_{1-4}$-alkyl, which is unsubstituted or substituted by halogen, cyano, $C_{1-4}$-alkoxy, hydroxyl, carboxyl, sulpho or sulphato, benzyl, phenethyl, cyclohexyl, phenyl or $-NHCH_2CH_2OCH_2CH_2-SO_2M$, wherein M has the meaning given in claim 1, phenyl, which is optionally substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or sulpho, or naphthyl, which is optionally substituted by halogen, nitro, $C_{1-4}$-alkoxy, $C_{1-4}$-alkanoylamino, hydroxyl, carboxyl or sulpho, or wherein $R^4$ and $R^5$, together with the amino nitrogen atom, form a morpholino, piperidino or piperazino radical, and wherein Y is Cl, F or an unsubstituted or substituted pyridinium radical.

6. Dyestuff according to claim 1, characterised in that $M=CH=CH_2$ or $CH_2CH_2Cl$.

7. Dyestuff according to claim 1, wherein Z represents

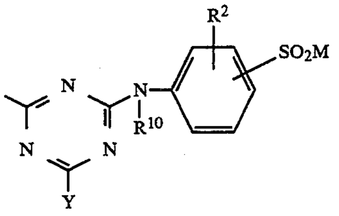

wherein

Y=Cl, F or an unsubstituted or substituted pyridinium radical, $M=CH=CH_2$ or $CH_2CH_2-V$, wherein V=a radical which can be eliminated under alkaline conditions, $R^{10}$=H or unsubstituted or substituted $C_1$-$C_6$-alkyl and $R^2$=H, Cl, Br, $C_1$-$C_4$-alkyl, $C_1$-$C_4$-alkoxy, $CO_2H$ or $SO_3H$.

8. Dyestuff of claim 1, of the formulae

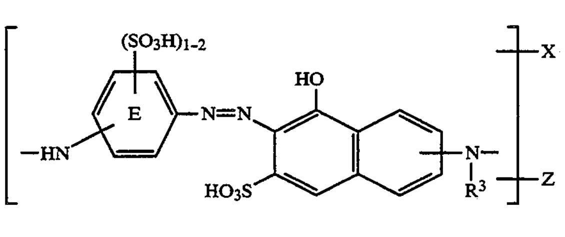

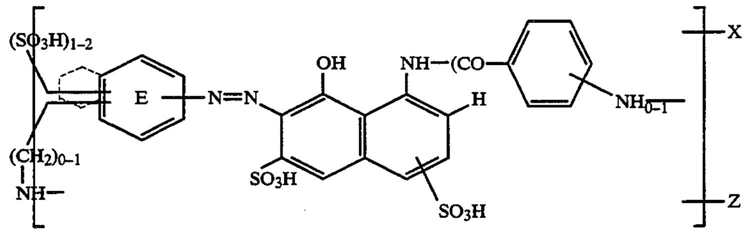

-continued
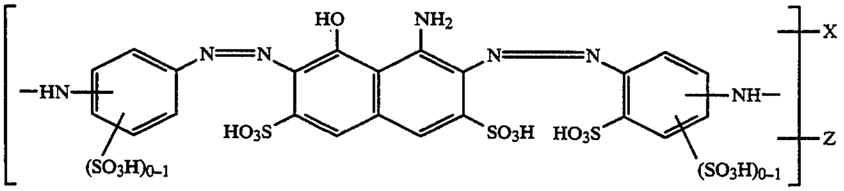
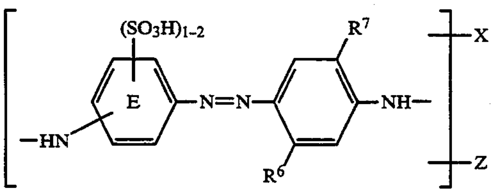
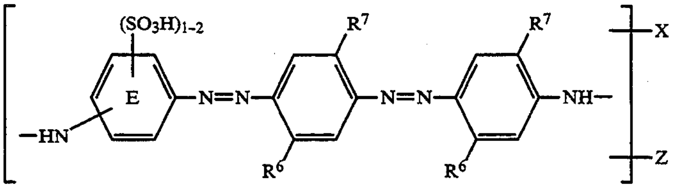
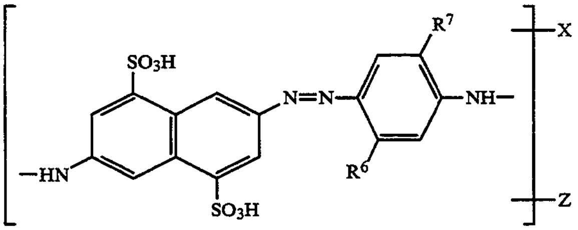
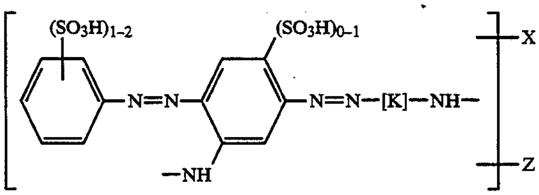
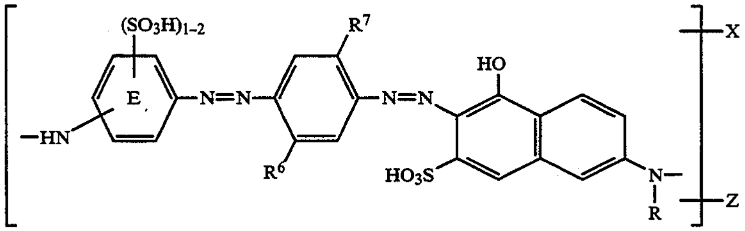
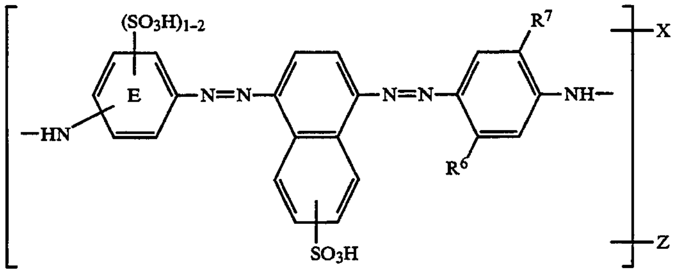

-continued
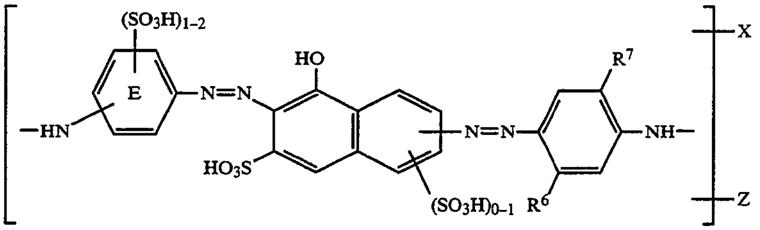
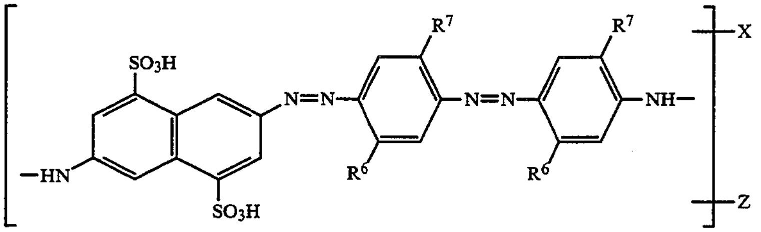
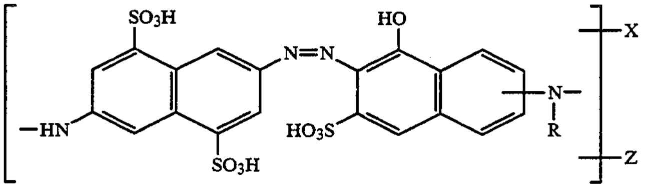
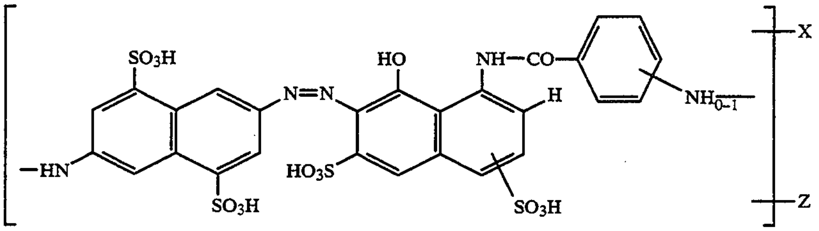
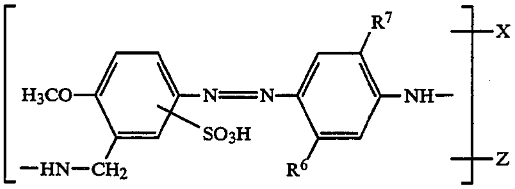
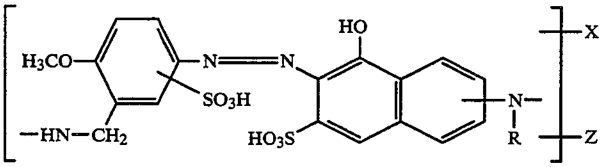
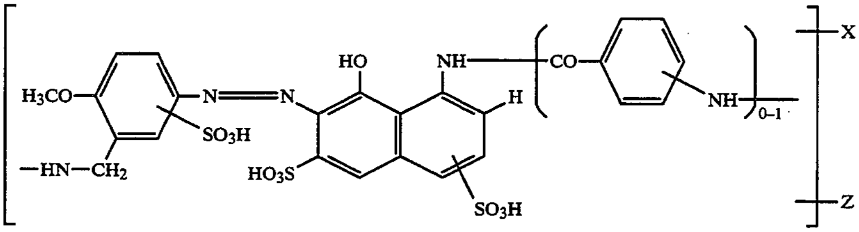

-continued
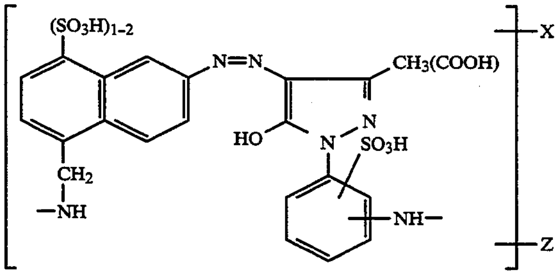
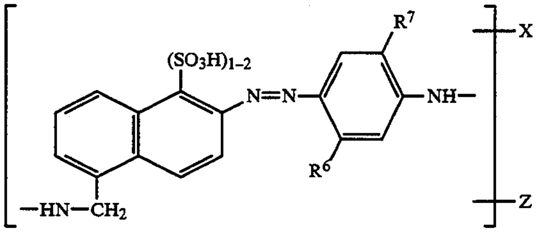
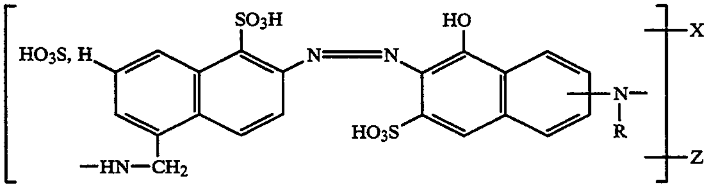
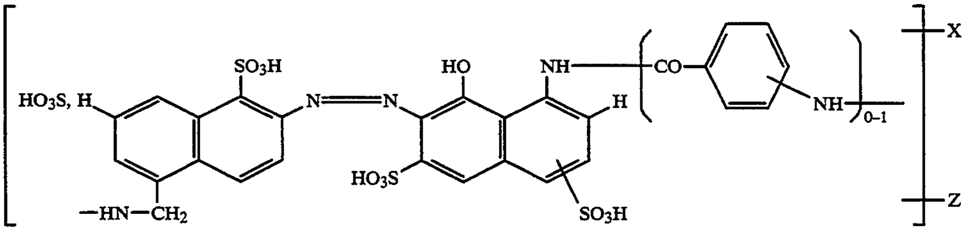
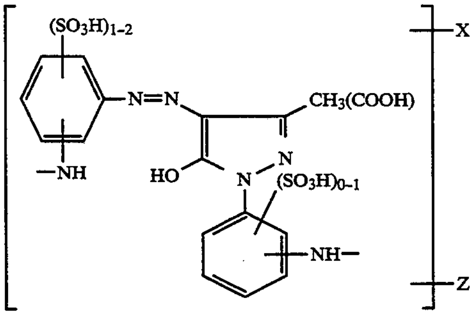
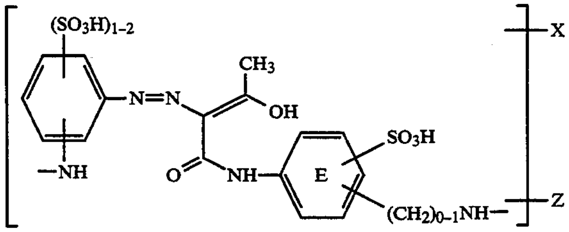

-continued
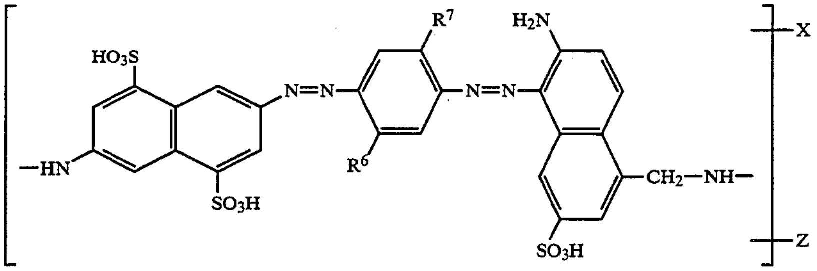
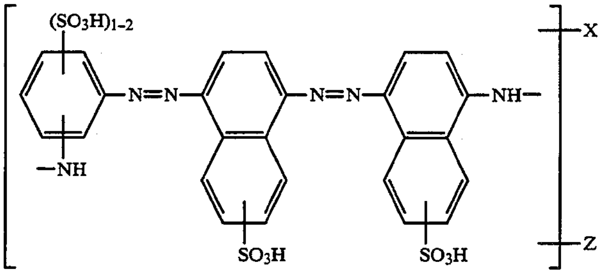
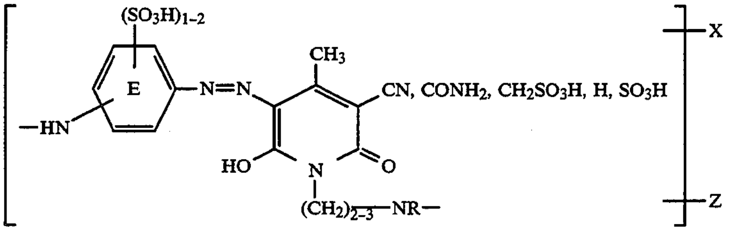
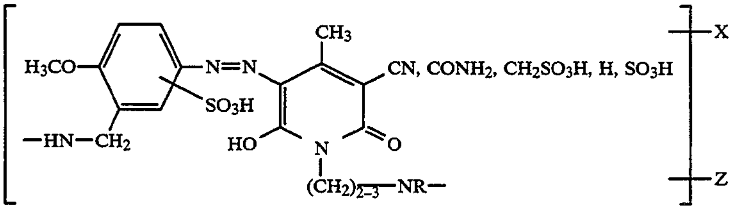
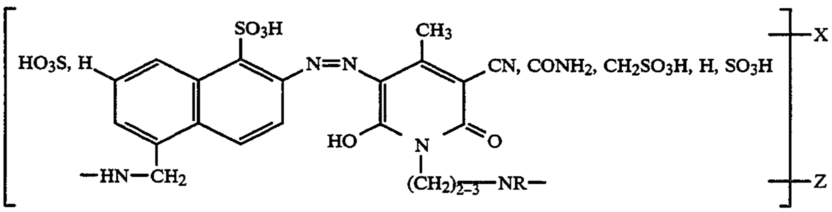
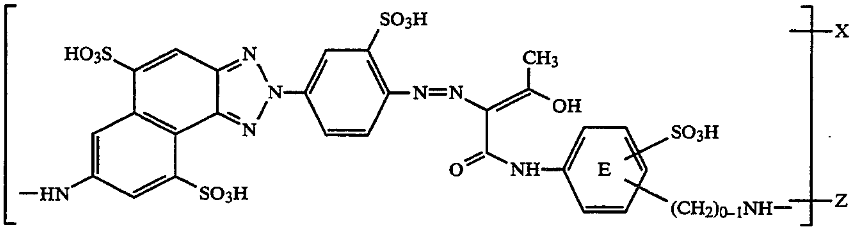

-continued
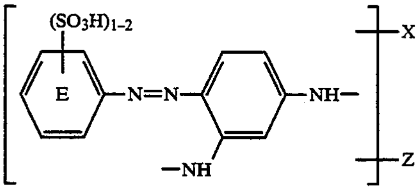
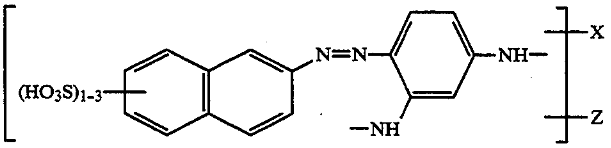
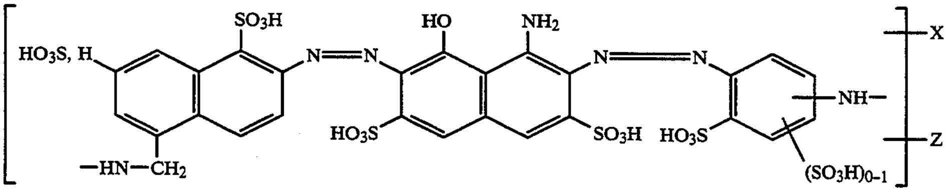
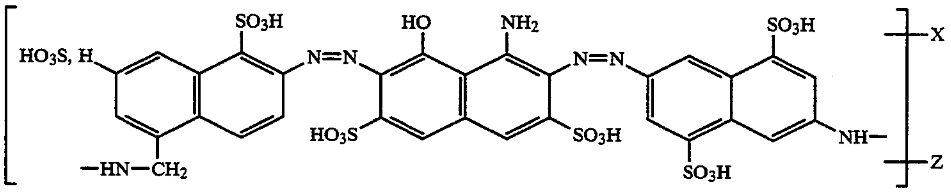
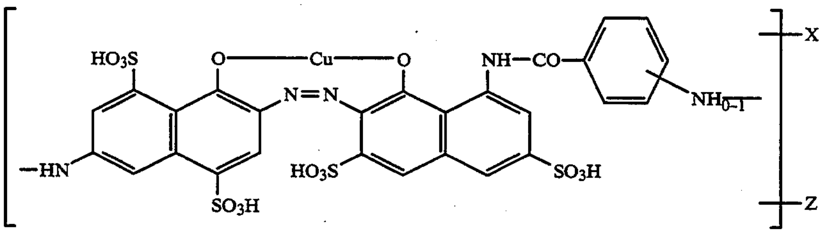
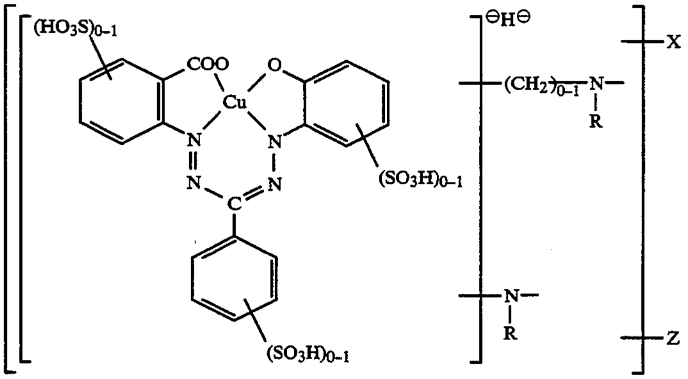

-continued

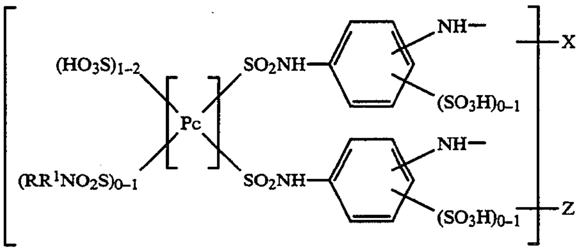

wherein

Pc represents a Cu or Ni phthalocyanine radical and the total number of substituents on the Pc skeleton is not more than 4,

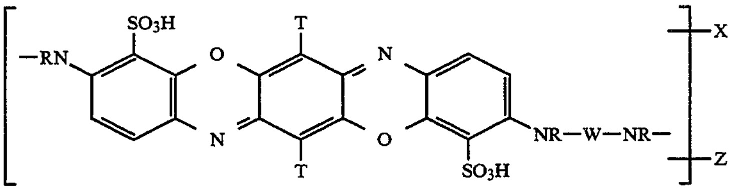

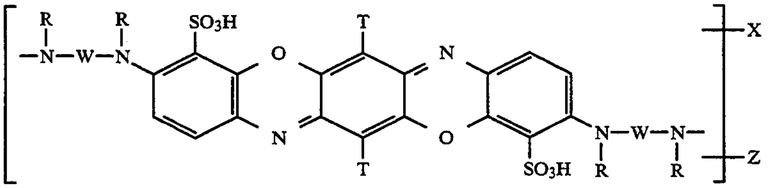

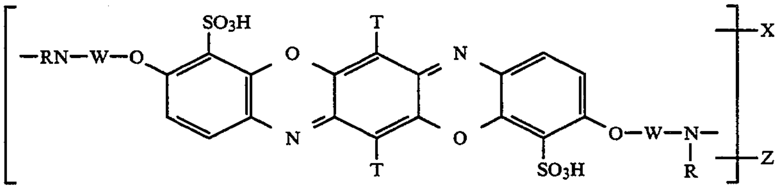

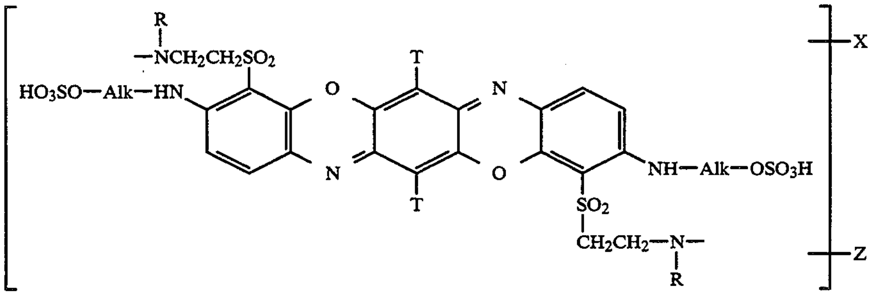

wherein $T=Cl$, Br or $OCH_3$,

R and $R^3=H$, $CH_3$ or $C_2H_5$, $R^6=H$, $C_1$-$C_4$-alkyl, $C_1$-$C_4$-alkoxy, acylamino, $C_1$-$C_4$-alkylsulphonylamino, aminocarbonylamino, phenylcarbonylamino, Cl or Br, $R^7=H$, $C_1$-$C_4$-alkyl, $C_1$-$C_4$-alkoxy, OH or $SO_3H$, K=the radical of a coupling component of the benzene, naphthalene, acetoacetic acid anilide or heterocyclic series, $M=CH{=}CH_2$ or $CH_2CH_2Cl$, Z represents

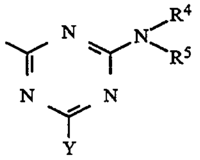

wherein $R^4$ and $R^5$ independently of one another denote hydrogen, $C_{1-4}$-alkyl, which is unsubstituted or substituted by halogen, cyano, $C_{1-4}$-alkoxy, hydroxyl, carboxyl, sulpho or sulphato, benzyl, phenethyl, cyclohexyl, phenyl or $-NHCH_2CH_2OCH_2CH_2-SO_2M$, phenyl, which is optionally substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or sulpho, or naphthyl, which is optionally substituted by halogen, nitro $C_{1-4}$-alkoxy, $C_{1-4}$-alkanoylamino, hydroxyl, carboxyl or sulpho, or wherein $R^4$ and $R^5$, together with the amino nitrogen atom, form a morpholino, piperidino or piperazino radical, and wherein Y is Cl, F or an unsubstituted or substituted pyridinium radical, or Z represents

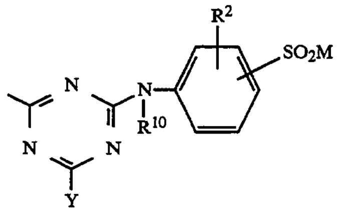

wherein

Y has the aforesaid meaning, $R^{10}$=H or unsubstituted or substituted $C_1$-$C_6$-alkyl, and $R^2$=H, Cl, Br, $C_1$-$C_4$-alkyl, $C_1$-$C_4$-alkoxy, $CO_2H$ or $SO_3H$, W=an aliphatic bridge member and Alk=straight-chain or branched $C_1$-$C_6$-alkylene which is optionally interrupted by hetero atoms or groupings containing hetero atoms selected from the group consisting of NR, O and S, wherein the benzene rings E are substituted by $CH_3$, $C_2H_5$—, $CH_3O$, $C_2H_5O$, halogen, $CO_2H$ or unsubstituted.

9. Dyestuff of claim 1 of the formula

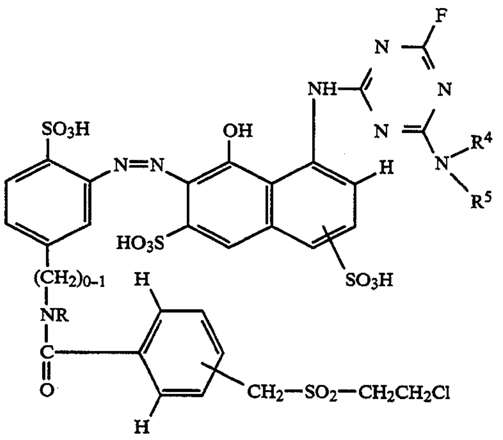

wherein $R^4$ and $R^5$ independently of one another are hydrogen, $C_{1-4}$-alkyl, which is unsubstituted or substituted by halogen, cyano, $C_{1-4}$-alkoxy, hydroxyl, carboxyl, sulpho or sulphato, benzyl, phenethyl, cyclohexyl, phenyl or —$NHCH_2CH_2OCH_2CH_2$—$SO_2M$ (M=—CH=$CH_2$ or —$CH_2CH_2V$, where V=a radical which can be eliminated under alkaline conditions), phenyl, which is unsubstituted or substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or sulpho, or naphthyl, which is optionally substituted by halogen, nitro, $C_{1-4}$-alkoxy, $C_{1-4}$-alkanoylamaino, hydroxyl, carboxyl or sulpho, or wherein $R^4$ and $R^5$, together with the amino nitrogen atom, form a morpholino, piperidino or piperazino radical, and R represents H, $CH_3$ or $C_2H_5$.

10. Dyestuff of claim 1 of the formula

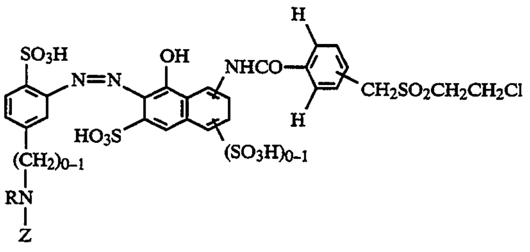

wherein

Z=a fibre-reactive halogen-containing pyrimidinyl radical and

R=H, $CH_3$ or $C_2H_5$.

11. Process for dyeing and printing materials containing hydroxyl groups and materials containing amide groups, by applying thereto a dyestuff of claim 1.

* * * * *